United States Patent
Bossen

(10) Patent No.: US 12,413,786 B2
(45) Date of Patent: Sep. 9, 2025

(54) SYSTEMS AND METHODS FOR REDUCING LATENCY IN DECODING OF CODED VIDEO DATA

(71) Applicant: Sharp Kabushiki Kaisha, Sakai (JP)

(72) Inventor: Frank Bossen, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/714,209

(22) PCT Filed: Nov. 28, 2022

(86) PCT No.: PCT/JP2022/043662
§ 371 (c)(1),
(2) Date: May 29, 2024

(87) PCT Pub. No.: WO2023/100781
PCT Pub. Date: Jun. 8, 2023

(65) Prior Publication Data
US 2025/0024082 A1  Jan. 16, 2025

Related U.S. Application Data

(60) Provisional application No. 63/288,114, filed on Dec. 10, 2021, provisional application No. 63/285,601, filed on Dec. 3, 2021.

(51) Int. Cl.
*H04N 19/70* (2014.01)
*H04N 19/169* (2014.01)
*H04N 19/174* (2014.01)

(52) U.S. Cl.
CPC ........... *H04N 19/70* (2014.11); *H04N 19/174* (2014.11); *H04N 19/188* (2014.11)

(58) Field of Classification Search
CPC ..... H04N 19/70; H04N 19/177; H04N 19/186
See application file for complete search history.

(56) References Cited

PUBLICATIONS

Bross et al., "Versatile Video Coding Editorial Refinements on Draft 10", Joint Video Experts Team (JVET) of ITU-T SG 16 WP 3 and ISO/IEC JTC 1/SC 29, JVET-T2001-v2, Oct. 7-16, 2020, pp. 1-512.
Bross, "Versatile Video Coding (Draft 1)", Joint Video Experts Team (JVET) of ITU-T SG 16 WP 3 and ISO/IEC JTC 1/SC 29/WG 11, JVET-J1001-v2, Apr. 10-20, 2018, 43 pages.
Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, JVET-G1001-v1, Jul. 13-21, 2017, 51 pages.

*Primary Examiner* — Justin W Rider
(74) *Attorney, Agent, or Firm* — Keating & Bennett, LLP

(57) ABSTRACT

A method of signaling parameters for video data is disclosed. The method comprising: signaling a syntax element indicating a size constraint for subsets of a network abstraction layer unit including a slice of video data.

9 Claims, 7 Drawing Sheets

SYSTEMS AND METHODS FOR REDUCING LATENCY IN DECODING OF CODED VIDEO DATA

CROSS REFERENCE

This Nonprovisional application claims priority under 35 U.S.C. § 119 on provisional Application No. 63/285,601 on Dec. 3, 2021, No. 63/288,114 on Dec. 10, 2021, the entire contents of which are hereby incorporated by reference.

TECHNICAL FIELD

This disclosure relates to video coding and more particularly to techniques for reducing latency in decoding of coded video.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate reconstructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. The ITU-T Video Coding Experts Group (VCEG) and ISO/IEC (Moving Picture Experts Group (MPEG) (collectively referred to as the Joint Video Exploration Team (JVET)) have worked to standardize video coding technology with a compression capability that significantly exceeds that of ITU-T H.265. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that were under coordinated test model study by the JVET as potentially enhancing video coding technology beyond the capabilities of HEVC. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the $10^{th}$ Meeting of ISO/IEC JTC1/SC29/WG11 16-20 Apr. 2018, San Diego, CA. Based on the multiple descriptions of video coding tools, a resulting initial draft text of a video coding specification was developed and is described in "Versatile Video Coding (Draft 1)," $10^{th}$ Meeting of ISO/IEC JTC1/SC29/WG11 16-20 Apr. 2018, San Diego, CA, document JVET-J1001-v2, which is incorporated by reference herein, and referred to as JVET-J1001. The development of the video coding standard by the VCEG and MPEG based on JEM is referred to as the Versatile Video Coding (VVC) project. "Versatile Video Coding (Draft 10)," 20th Meeting of ISO/IEC JTC1/SC29/WG11 7-16 Oct. 2020, Teleconference, document JVET-T2001-v2, which is incorporated by reference herein, and referred to as JVET-T2001, represents the current iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream.

SUMMARY OF INVENTION

In one example, a method of signaling parameters for video data, the method comprising: signaling a syntax element indicating a size constraint for subsets of a network abstraction unit including a slice of video data.

In one example, a method of decoding video data, the method comprising: receiving a general constraint information syntax structure; parsing a syntax element from the general constraint information syntax structure indicating a size constraint for subsets of a network abstraction unit including a slice of video data; and performing video decoding based on the size constraint.

DESCRIPTION OF EMBODIMENTS

Figure 1:
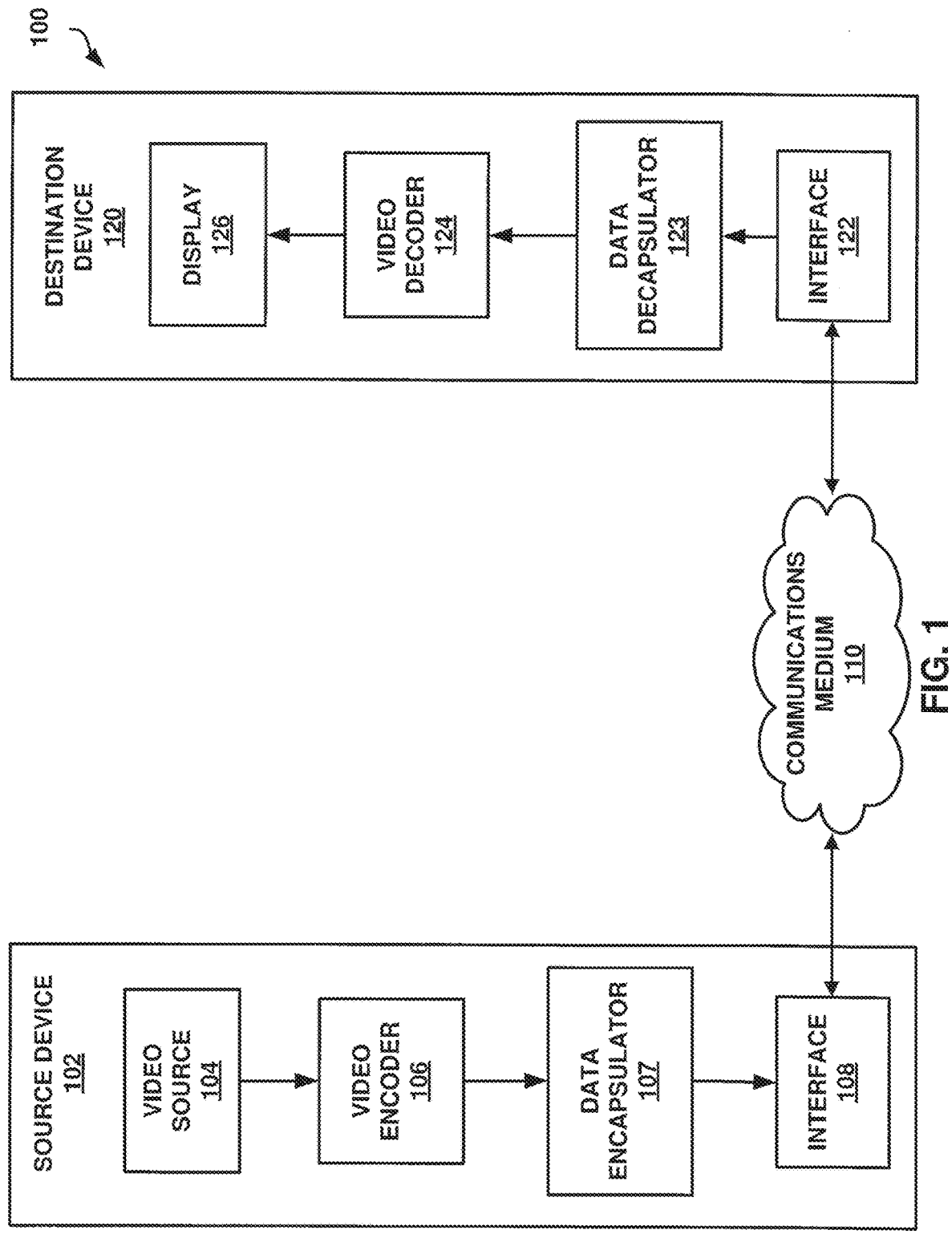
FIG. 1 is a block diagram illustrating an example of a system that may be configured to encode and decode video data according to one or more techniques of this disclosure.

In general, this disclosure describes various techniques for coding video data. In particular, this disclosure describes techniques for enabling the latency for decoding coded video data to be reduced. It should be noted that although techniques of this disclosure are described with respect to ITU-T H.264, ITU-T H.265, JEM, and JVET-T2001, the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.265, JEM, and JVET-T2001. Thus, reference to ITU-T H.264, ITU-T H.265, JEM, and/or JVET-T2001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of signaling parameters for video data comprises signaling a syntax element indicating a size constraint for subsets of a network abstraction unit including a slice of video data.

In one example, a device comprises one or more processors configured to signal a syntax element indicating a size constraint for subsets of a network abstraction unit including a slice of video data.

In one example, a non-transitory computer-readable storage medium comprises instructions stored thereon that, when executed, cause one or more processors of a device to signal a syntax element indicating a size constraint for subsets of a network abstraction unit including a slice of video data.

In one example, an apparatus comprises means for signaling a syntax element indicating a size constraint for subsets of a network abstraction unit including a slice of video data.

In one example, a method of decoding video data comprises receiving a general constraint information syntax structure, parsing a syntax element from the general constraint information syntax structure indicating a size constraint for subsets of a network abstraction unit including a slice of video data and performing video decoding based on the size constraint.

In one example, a device comprises one or more processors configured to receive a general constraint information syntax structure, parse a syntax element from the general constraint information syntax structure indicating a size constraint for subsets of a network abstraction unit including a slice of video data and perform video decoding based on the size constraint.

In one example, a non-transitory computer-readable storage medium comprises instructions stored thereon that, when executed, cause one or more processors of a device to receive a general constraint information syntax structure, parse a syntax element from the general constraint information syntax structure indicating a size constraint for subsets of a network abstraction unit including a slice of video data and perform video decoding based on the size constraint.

In one example, an apparatus comprises means for receiving a general constraint information syntax structure, means for parsing a syntax element from the general constraint information syntax structure indicating a size constraint for subsets of a network abstraction unit including a slice of video data and means for performing video decoding based on the size constraint.

The details of one or more examples are set forth in the accompanying drawings and the description below. Other features, objects, and advantages will be apparent from the description and drawings, and from the claims.

Video content includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit structure having its root at the CU. In ITU-T H.265, prediction unit structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may be halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-T2001, CTUs are partitioned according a quadtree plus multi-type tree (QTMT or QT+MTT) structure. The QTMT in JVET-T2001 is similar to the QTBT in JEM. However, in JVET-T2001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge.

As described above, each video frame or picture may be divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice.

With respect to JVET-T2001, slices are required to consist of an integer number of complete tiles or an integer number of consecutive complete CTU rows within a tile, instead of only being required to consist of an integer number of CTUs. It should be noted that in JVET-T2001, the slice design does not include slice segments (i.e., no independent/dependent slice segments). Thus, in JVET-T2001, a picture may include a single tile, where the single tile is contained within a single slice or a picture may include multiple tiles where the multiple tiles (or CTU rows thereof) may be contained within one or more slices. In JVET-T2001, the partitioning of a picture into tiles is specified by specifying respective heights for tile rows and respective widths for tile columns. Thus, in JVET-T2001 a tile is a rectangular region of CTUs within a particular tile row and a particular tile column position. Further, it should be noted that JVET-T2001 provides where a picture may be partitioned into subpictures, where a subpicture is a rectangular region of a CTUs within a picture. The top-left CTU of a subpicture may be located at any CTU position within a picture with subpictures being constrained to include one or more slices Thus, unlike a tile, a subpicture is not necessarily limited to a particular row and column position. It should be noted that subpictures may be useful for encapsulating regions of interest within a picture and a sub-bitstream extraction process may be used to only decode and display a particular region of interest. That is, as described in further detail below, a bitstream of coded video data includes a sequence of network abstraction layer (NAL) units, where a NAL unit encapsulates coded video data, (i.e., video data corresponding to a slice of picture) or a NAL unit encapsulates metadata used for decoding video data (e.g., a parameter set) and a sub-bitstream extraction process forms a new bitstream by removing one or more NAL units from a bitstream.

Figure 2:
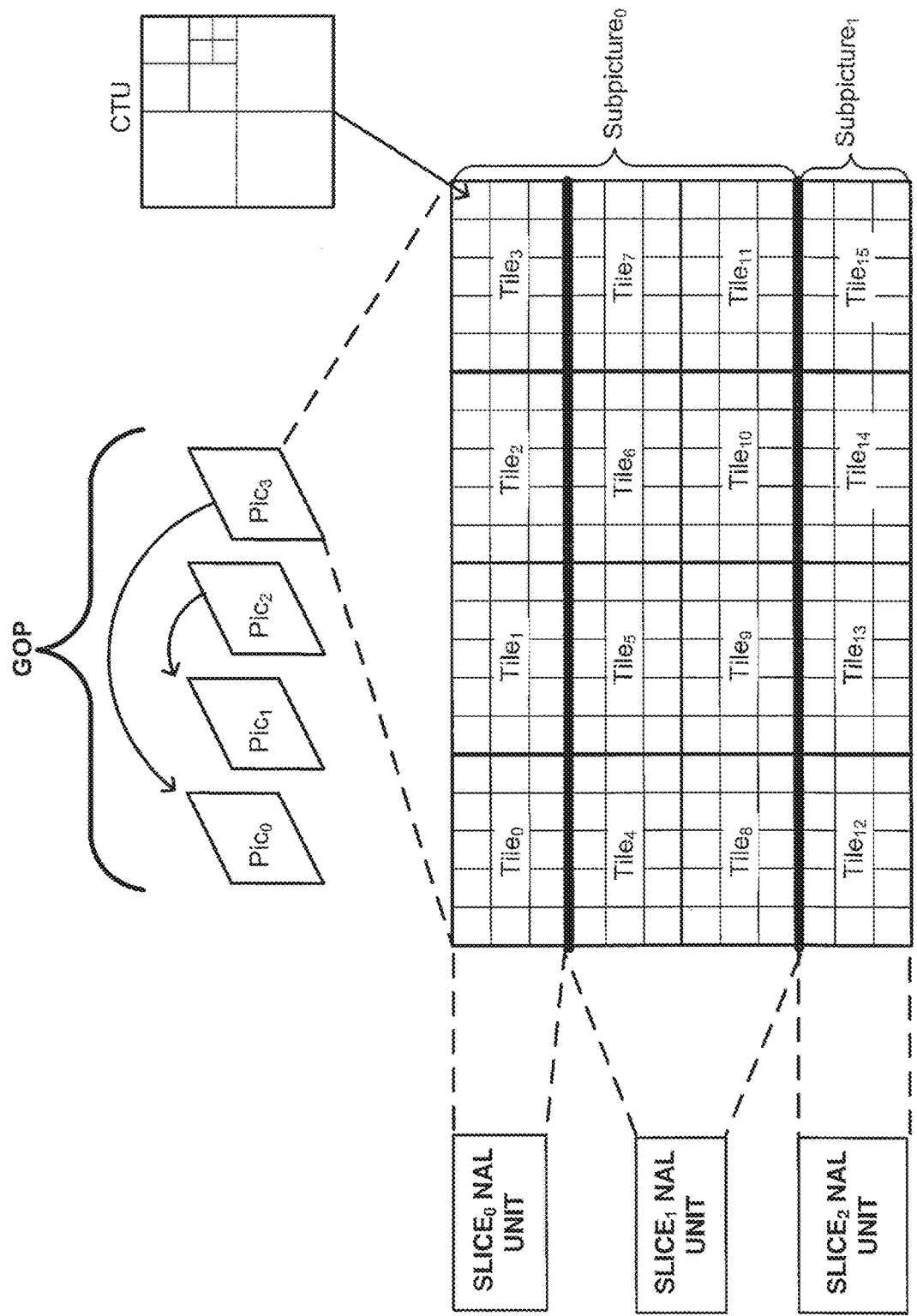
FIG. 2 is a conceptual diagram illustrating coded video data and corresponding data structures according to one or more techniques of this disclosure.

FIG. 2 is a conceptual diagram illustrating an example of a picture within a group of pictures partitioned according to tiles, slices, and subpictures. It should be noted that the techniques described herein may be applicable to tiles, slices, subpictures, sub-divisions thereof and/or equivalent structures thereto. That is, the techniques described herein may be generally applicable regardless of how a picture is partitioned into regions. For example, in some cases, the techniques described herein may be applicable in cases where a tile may be partitioned into so-called bricks, where a brick is a rectangular region of CTU rows within a particular tile. Further, for example, in some cases, the techniques described herein may be applicable in cases where one or more tiles may be included in so-called tile groups, where a tile group includes an integer number of adjacent tiles. In the example illustrated in FIG. 2, $Pic_3$ is illustrated as including 16 tiles (i.e., $Tile_0$ to $Tile_{15}$) and three slices (i.e., $Slice_0$ to $Slice_2$). In the example illustrated in FIG. 2, $Slice_0$ includes four tiles (i.e., $Tile_0$ to $Tile_3$), $Slice_1$ includes eight tiles (i.e., $Tile_4$ to $Tile_{11}$), and $Slice_2$ includes four tiles (i.e., $Tile_{12}$ to $Tile_{15}$). Further, as illustrated in the example of FIG. 2, $Pic_3$ is illustrated as including two subpictures (i.e., $Subpicture_0$ and $Subpicture_1$), where $Subpicture_0$ includes $Slice_0$ and $Slice_1$ and where $Subpicture_1$ includes $Slice_2$. As described above, subpictures may be useful for encapsulating regions of interest within a picture and a sub-bitstream extraction process may be used in order to selectively decode (and display) a region interest. For example, referring to FIG. 2, $Subpicture_0$ may corresponding to an action portion of a sporting event presentation (e.g., a view of the field) and Subpicture$_1$ may corresponding to a scrolling banner displayed during the sporting event presentation. By using organizing a picture into subpictures in this manner, a viewer may be able to disable the display of the scrolling banner. That is, through a sub-bitstream extraction process Slice$_2$ NAL unit may be removed from a bitstream (and thus not decoded and/or displayed) and Slice$_0$ NAL unit and Slice$_1$ NAL unit may be decoded and displayed. The encapsulation of slices of a picture into respective NAL unit data structures and sub-bitstream extraction are described in further detail below.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list, RefPicList0 and for a B slice, there may be a second independent reference picture list, RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded pictures stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 2, Pic$_2$ is illustrated as referencing Pic$_1$. Similarly, Pic$_3$ is illustrated as referencing Pic$_0$. With respect to FIG. 2, assuming the picture number corresponds to the decoding order, the DPB would be populated as follows: after decoding Pic$_0$, the DPB would include {Pic$_0$}; at the onset of decoding Pic$_1$, the DPB would include {Pic$_0$}; after decoding Pic$_1$, the DPB would include {Pic$_0$, Pic$_1$}; at the onset of decoding Pic$_2$, the DPB would include {Pic$_0$, Pic$_1$}. Pic$_2$ would then be decoded with reference to Pic$_1$ and after decoding Pic$_2$, the DPB would include {Pic$_0$, Pic$_1$, Pic$_2$}. At the onset of decoding Pic$_3$, pictures Pic$_0$ and Pic$_1$ would be marked for removal from the DPB, as they are not needed for decoding Pic$_3$ (or any subsequent pictures, not shown) and assuming Pic$_1$ and Pic$_2$ have been output, the DPB would be updated to include {Pic$_0$}. Pic$_3$ would then be decoded by referencing Pic$_0$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-T2001, a CU is associated with a transform tree structure having its root at the CU level. The transform tree is partitioned into one or more transform units (TUs). That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and subsequent secondary transforms may be applied (in the video encoder) to generate transform coefficients. For a video decoder, the order of transforms is reversed.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

With respect to the equations used herein, the following arithmetic operators may be used:

+ Addition

− Subtraction

\* Multiplication, including matrix multiplication $x^y$ Exponentiation. Specifies x to the power of y. In other contexts, such notation is used for superscripting not intended for interpretation as exponentiation.

/ Integer division with truncation of the result toward zero. For example, 7/4 and −7/−4 are truncated to 1 and −7/4 and 7/−4 are truncated to −1.

÷ Used to denote division in mathematical equations where no truncation or rounding is intended.

x/y Used to denote division in mathematical equations where no truncation or rounding is intended.

Further, the following mathematical functions may be used:

Log 2(x) the base-2 logarithm of x;

$$\text{Min}(x, y) = \begin{cases} x & ; \ x <= y \\ y & ; \ x > y \end{cases};$$

$$\text{Max}(x, y) = \begin{cases} x & ; \ x >= y \\ y & ; \ x > y \end{cases}$$

Ceil(x) the smallest integer greater than or equal to x.

With respect to the example syntax used herein, the following definitions of logical operators may be applied:

x && y Boolean logical "and" of x and y x||y Boolean logical "or" of x and y

! Boolean logical "not"

x?y:z If x is TRUE or not equal to 0, evaluates to the value of y; otherwise, evaluates to the value of z.

Further, the following relational operators may be applied:
> Greater than
>= Greater than or equal to
< Less than
<= Less than or equal to
== Equal to
!= Not equal to Further, it should be noted that in the syntax descriptors used herein, the following descriptors may be applied:

b(8): byte having any pattern of bit string (8 bits). The parsing process for this descriptor is specified by the return value of the function read_bits(8).

f(n): fixed-pattern bit string using n bits written (from left to right) with the left bit first. The parsing process for this descriptor is specified by the return value of the function read_bits(n).

se(v): signed integer 0-th order Exp-Golomb-coded syntax element with the left bit first.

tb(v): truncated binary using up to maxVal bits with maxVal defined in the semantics of the symtax element.

tu(v): truncated unary using up to maxVal bits with maxVal defined in the semantics of the symtax element.

u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.

ue(v): unsigned integer 0-th order Exp-Golomb-coded syntax element with the left bit first.

As described above, video content includes video sequences comprised of a series of pictures and each picture may be divided into one or more regions. In JVET-T2001, a coded representation of a picture comprises VCL NAL units of a particular layer within an AU and contains all CTUs of the picture. For example, referring again to FIG. 2, the coded representation of $Pic_3$ is encapsulated in three coded slice NAL units (i.e., $Slice_0$ NAL unit, $Slice_1$ NAL unit, and $Slice_2$ NAL unit). It should be noted that the term video coding layer (VCL) NAL unit is used as a collective term for coded slice NAL units, i.e., VCL NAL is a collective term which includes all types of slice NAL units. As described above, and in further detail below, a NAL unit may encapsulate metadata used for decoding video data. A NAL unit encapsulating metadata used for decoding a video sequence is generally referred to as a non-VCL NAL unit. Thus, in JVET-T2001, a NAL unit may be a VCL NAL unit or a non-VCL NAL unit. It should be noted that a VCL NAL unit includes slice header data, which provides information used for decoding the particular slice. Thus, in JVET-T2001, information used for decoding video data, which may be referred to as metadata in some cases, is not limited to being included in non-VCL NAL units. JVET-T2001 provides where a picture unit (PU) is a set of NAL units that are associated with each other according to a specified classification rule, are consecutive in decoding order, and contain exactly one coded picture and where an access unit (AU) is a set of PUs that belong to different layers and contain coded pictures associated with the same time for output from the DPB. JVET-T2001 further provides where a layer is a set of VCL NAL units that all have a particular value of a layer identifier and the associated non-VCL NAL units. Further, in JVET-T2001, a PU consists of zero or one PH NAL units, one coded picture, which comprises of one or more VCL NAL units, and zero or more other non-VCL NAL units.

Further, in JVET-T2001, a coded video sequence (CVS) is a sequence of AUs that consists, in decoding order, of a CVSS AU, followed by zero or more AUs that are not CVSS AUs, including all subsequent AUs up to but not including any subsequent AU that is a CVSS AU, where a coded video sequence start (CVSS) AU is an AU in which there is a PU for each layer in the CVS and the coded picture in each present picture unit is a coded layer video sequence start (CLVSS) picture. In JVET-T2001, a coded layer video sequence (CLVS) is a sequence of PUs within the same layer that consists, in decoding order, of a CLVSS PU, followed by zero or more PUs that are not CLVSS PUs, including all subsequent PUs up to but not including any subsequent PU that is a CLVSS PU. This is, in JVET-T2001, a bitstream may be described as including a sequence of AUs forming one or more CVSs.

Multi-layer video coding enables a video presentation to be decoded/displayed as a presentation corresponding to a base layer of video data and decoded/displayed one or more additional presentations corresponding to enhancement layers of video data. For example, a base layer may enable a video presentation having a basic level of quality (e.g., a High Definition rendering and/or a 30 Hz frame rate) to be presented and an enhancement layer may enable a video presentation having an enhanced level of quality (e.g., an Ultra High Definition rendering and/or a 60 Hz frame rate) to be presented. An enhancement layer may be coded by referencing a base layer. That is, for example, a picture in an enhancement layer may be coded (e.g., using inter-layer prediction techniques) by referencing one or more pictures (including scaled versions thereof) in a base layer. It should be noted that layers may also be coded independent of each other. In this case, there may not be inter-layer prediction between two layers. Each NAL unit may include an identifier indicating a layer of video data the NAL unit is associated with. As described above, a sub-bitstream extraction process may be used to only decode and display a particular region of interest of a picture. Further, a sub-bitstream extraction process may be used to only decode and display a particular layer of video. Sub-bitstream extraction may refer to a process where a device receiving a compliant or conforming bitstream forms a new compliant or conforming bitstream by discarding and/or modifying data in the received bitstream. For example, sub-bitstream extraction may be used to form a new compliant or conforming bitstream corresponding to a particular representation of video (e.g., a high quality representation).

In JVET-T2001, each of a video sequence, a GOP, a picture, a slice, and CTU may be associated with metadata that describes video coding properties and some types of metadata an encapsulated in non-VCL NAL units. JVET-T2001 defines parameters sets that may be used to describe video data and/or video coding properties. In particular, JVET-T2001 includes the following four types of parameter sets: video parameter set (VPS), sequence parameter set (SPS), picture parameter set (PPS), and adaption parameter set (APS), where a SPS applies to apply to zero or more entire CVSs, a PPS applies to zero or more entire coded pictures, a APS applies to zero or more slices, and a VPS may be optionally referenced by a SPS. A PPS applies to an individual coded picture that refers to it. In JVET-T2001, parameter sets may be encapsulated as a non-VCL NAL unit and/or may be signaled as a message. JVET-T2001 also includes a picture header (PH) which is encapsulated as a non-VCL NAL unit. In JVET-T2001, a picture header applies to all slices of a coded picture. JVET-T2001 further enables decoding capability information (DCI) and supplemental enhancement information (SEI) messages to be signaled. In JVET-T2001, DCI and SEI messages assist in processes related to decoding, display or other purposes, however, DCI and SEI messages may not be required for constructing the luma or chroma samples according to a decoding process. In JVET-T2001, DCI and SEI messages may be signaled in a bitstream using non-VCL NAL units. Further, DCI and SEI messages may be conveyed by some mechanism other than by being present in the bitstream (i.e., signaled out-of-band).

Figure 3:
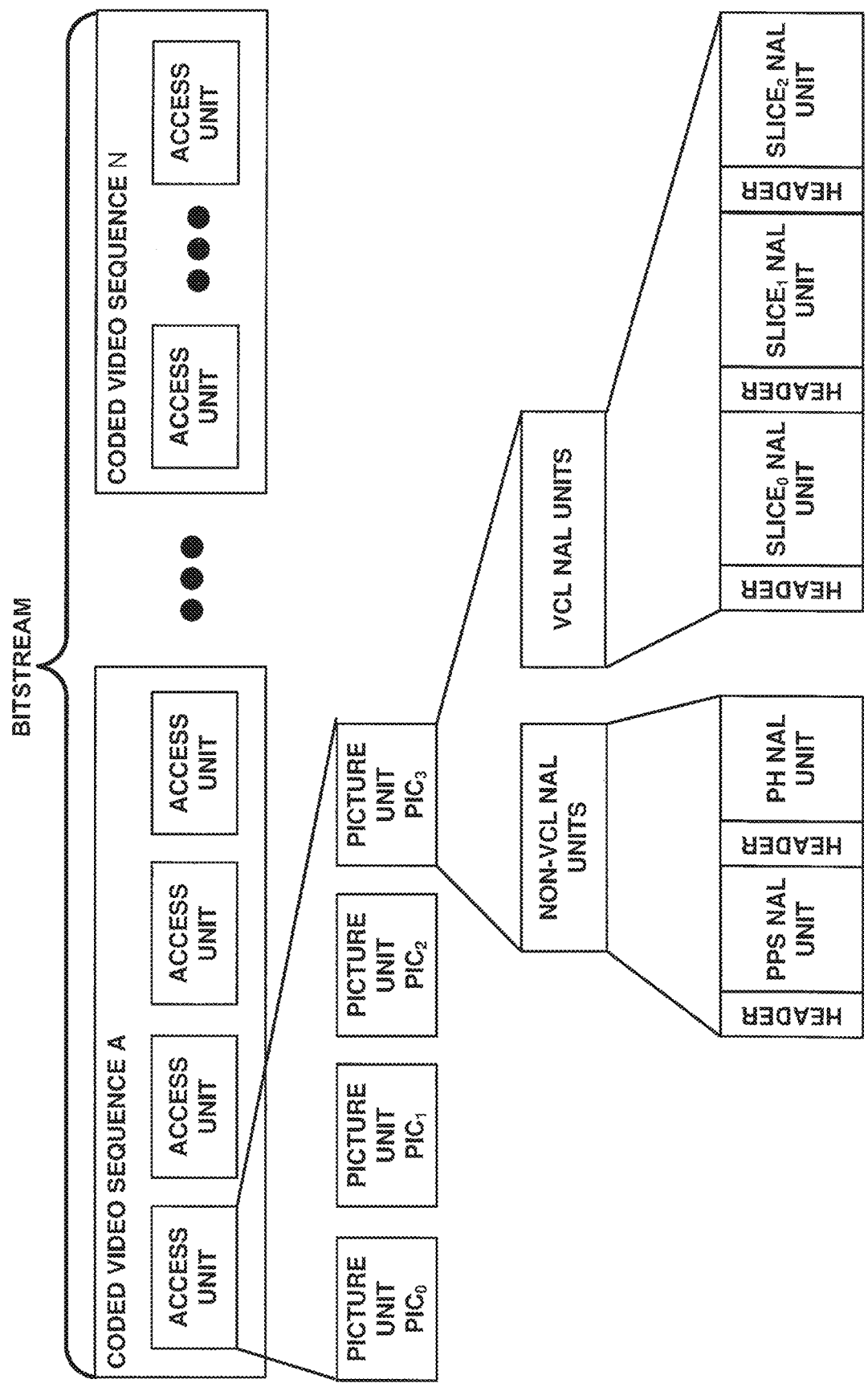
FIG. 3 is a conceptual diagram illustrating a data structure encapsulating coded video data and corresponding metadata according to one or more techniques of this disclosure.

FIG. 3 illustrates an example of a bitstream including multiple CVSs, where a CVS includes AUs, and AUs include picture units. The example illustrated in FIG. 3 corresponds to an example of encapsulating the slice NAL units illustrated in the example of FIG. 2 in a bitstream. In the example illustrated in FIG. 3, the corresponding picture unit for $Pic_3$ includes the three VCL NAL coded slice NAL units, i.e., $Slice_0$ NAL unit, $Slice_1$ NAL unit, and $Slice_2$ NAL unit and two non-VCL NAL units, i.e., a PPS NAL Unit and a PH NAL unit. It should be noted that in FIG. 3, HEADER is a NAL unit header (i.e., not to be confused with a slice header). Further, it should be noted that in FIG. 3, other non-VCL NAL units, which are not illustrated may be included in the CVSs, e.g., SPS NAL units, VPS NAL units, SEI message NAL units, etc. Further, it should be noted that in other examples, a PPS NAL Unit used for decoding $Pic_3$ may be included elsewhere in the bitstream, e.g., in the picture unit corresponding to $Pic_0$ or may be provided by an external mechanism.

bytes containing that data in the form of an RBSP interspersed as necessary with emulation prevention bytes.

picture unit (PU): A set of NAL units that are associated with each other according to a specified classification rule, are consecutive in decoding order, and contain exactly one coded picture.

profile: A specified subset of the syntax of JVET-T2001.

raw byte sequence payload (RBSP): A syntax structure containing an integer number of bytes that is encapsulated in a NAL unit and is either empty or has the form of a string of data bits containing syntax elements followed by an RBSP stop bit and zero or more subsequent bits equal to 0.

slice: An integer number of complete tiles or an integer number of consecutive complete CTU rows within a tile of a picture that are exclusively contained in a single NAL unit.

tier: A specified category of level constraints imposed on values of the syntax elements in the bitstream, where the level constraints are nested within a tier and a decoder conforming to a certain tier and level would be capable of decoding all bitstreams that conform to the same tier or the lower tier of that level or any level below it.

tile: A rectangular region of CTUs within a particular tile column and a particular tile row in a picture.

As described above, a bitstream of coded video data includes a sequence of NAL units. Table 1 illustrates the NAL unit syntax structure provided in JVET-T2001.

TABLE 1

|  | Descriptor |
|---|---|
| nal_unit( NumBytesInNalUnit ) { | |
|   nal_unit_header( ) | |
|   NumBytesInRbsp = 0 | |
|   for( i = 2; i < NumBytesInNalUnit; i++ ) | |
|     if( i + 2 < NumBytesInNalUnit && next_bits( 24 ) == 0x000003 ) { | |
|       rbsp_byte[ NumBytesInRbsp++ ] | b(8) |
|       rbsp_byte[ NumBytesInRbsp++ ] | b(8) |
|       i += 2 | |
|       emulation_prevention_three_byte /* equal to 0x03 */ | f(8) |
|     } else | |
|       rbsp_byte[ NumBytesInRbsp++ ] | b(8) |
| } | |

It should be noted that JVET-T2001 provides the following definitions:

access unit (AU): A set of PUs that belong to different layers and contain coded pictures associated with the same time for output from the DPB.

coded picture: A coded representation of a picture comprising VCL NAL units with a particular value of nuh_layer_id within an AU and containing all CTUs of the picture.

layer: A set of VCL NAL units that all have a particular value of nuh_layer_id and the associated non-VCL NAL units.

level: A defined set of constraints on the values that may be taken by the syntax elements and variables of JVET-T2001, or the value of a transform coefficient prior to scaling.

NOTE—The same set of levels is defined for all profiles, with most aspects of the definition of each level being in common across different profiles. Individual implementations could, within the specified constraints, support a different level for each supported profile.

network abstraction layer (NAL) unit: A syntax structure containing an indication of the type of data to follow and With respect to Table 1, JVET-T2001 provides the following semantics:

NumBytesInNalUnit specifies the size of the NAL unit in bytes. This value is required for decoding of the NAL unit. Some form of demarcation of NAL unit boundaries is necessary to enable inference of NumBytesInNalUnit. One such demarcation method is specified in Annex B (of JVET-T2001) for the byte stream format. Other methods of demarcation could be specified outside of this Specification.

NOTE—The video coding layer (VCL) is specified to efficiently represent the content of the video data. The NAL is specified to format that data and provide header information in a manner appropriate for conveyance on a variety of communication channels or storage media. All data are contained in NAL units, each of which contains an integer number of bytes. A NAL unit specifies a generic format for use in both packet-oriented and bitstream systems. The format of NAL units for both packet-oriented transport and byte stream is identical except that each NAL unit can be preceded by a start code prefix and extra padding bytes in the byte stream format specified in Annex B (of JVET T2001).

rbsp_byte[i] is the i-th byte of an RBSP. An RBSP is specified as an ordered sequence of bytes as follows:

The RBSP contains a string of data bits (SODB) as follows:

If the SODB is empty (i.e., zero bits in length), the RBSP is also empty.

Otherwise, the RBSP contains the SODB as follows:

1. 1) The first byte of the RBSP contains the first (most significant, left-most) eight bits of the SODB; the next byte of the RBSP contains the next eight bits of the SODB, etc., until fewer than eight bits of the SODB remain.
2. 2) The rbsp_trailing_bits( ) syntax structure is present after the SODB as follows:
    i) The first (most significant, left-most) bits of the final RBSP byte contain the remaining bits of the SODB (if any).
    ii) The next bit consists of a single bit equal to 1 (i.e., rbsp_stop_one_bit).
    iii) When the rbsp_stop_one_bit is not the last bit of a byte-aligned byte, one or more zero-valued bits (i.e., instances of rbsp_alignment_zero_bit) are present to result in byte alignment.
3. 3) One or more rbsp_cabac_zero_word 16-bit syntax elements equal to 0x0000 could be present in some RBSPs after the rbsp_trailing_bits( ) at the end of the RBSP.

Syntax structures having these RBSP properties are denoted in the syntax tables using an "_rbsp" suffix.

These structures are carried within NAL units as the content of the rbsp_byte[i] data bytes. The association of the RBSP syntax structures to the NAL units is as specified in Table 3.

NOTE—When the boundaries of the RBSP are known, the decoder could extract the SODB from the RBSP by concatenating the bits of the bytes of the RBSP and discarding the rbsp_stop_one_bit, which is the last (least significant, right-most) bit equal to 1, and discarding any following (less significant, farther to the right) bits that follow it, which are equal to 0. The data necessary for the decoding process is contained in the SODB part of the RBSP.

emulation_prevention_three_byte is a byte equal to 0x03. When an emulation_prevention_three_byte is present in the NAL unit, it shall be discarded by the decoding process.

The last byte of the NAL unit shall not be equal to 0x00.

Within the NAL unit, the following three-byte sequences shall not occur at any byte-aligned position:

0x000000;
0x000001;
0x000002.

Within the NAL unit, any four-byte sequence that starts with 0x000003 other than the following sequences shall not occur at any byte-aligned position:

0x00000300;
0x00000301;
0x00000302;
0x00000303.

JVET-T2001 defines NAL unit header semantics that specify the type of Raw Byte Sequence Payload (RBSP) data structure included in the NAL unit. Table 2 illustrates the syntax of the NAL unit header provided in JVET-T2001.

TABLE 2

|  | Descriptor |
| --- | --- |
| nal_unit_header( ) { |  |
|   forbidden_zero_bit | f(1) |
|   nuh_reserved_zero_bit | u(1) |
|   nuh_layer_id | u(6) |
|   nal_unit_type | u(5) |
|   nuh_temporal_id_plus1 | u(3) |
| } |  |

JVET-T2001 provides the following definitions for the respective syntax elements illustrated in Table 2.

forbidden_zero_bit shall be equal to 0.

nuh_reserved_zero_bit shall be equal to 0. The value 1 of nuh_reserved_zero_bit could be specified in the future by ITU-T|ISO/IEC. Although the value of nuh_reserved_zero_bit is required to be equal to 0 in this version of this Specification, decoders conforming to this version of this Specification shall allow the value of nuh_reserved_zero_bit equal to 1 to appear in the syntax and shall ignore (i.e. remove from the bitstream and discard) NAL units with nuh_reserved_zero_bit equal to 1.

nuh_layer_id specifies the identifier of the layer to which a VCL NAL unit belongs or the identifier of a layer to which a non-VCL NAL unit applies. The value of nuh_layer_id shall be in the range of 0 to 55, inclusive. Other values for nuh_layer_id are reserved for future use by ITU-T|ISO/IEC. Although the value of nuh_layer_id is required to be the range of 0 to 55, inclusive, in this version of this Specification, decoders conforming to this version of this Specification shall allow the value of nuh_layer_id to be greater than 55 to appear in the syntax and shall ignore (i.e. remove from the bitstream and discard) NAL units with nuh_layer_id greater than 55.

The value of nuh_layer_id shall be the same for all VCL NAL units of a coded picture. The value of nuh_layer_id of a coded picture or a PU is the value of the nuh_layer_id of the VCL NAL units of the coded picture or the PU.

When nal_unit_type is equal to PH_NUT, or FD_NUT, nuh_layer_id shall be equal to the nuh_layer_id of associated VCL NAL unit.

When nal_unit_type is equal to EOS_NUT, nuh_layer_id shall be equal to one of the nuh_layer_id values of the layers present in the CVS.

NOTE—The value of nuh_layer_id for DCI, OPI, VPS, AUD, and EOB NAL units is not constrained.

nuh_temporal_id_plus1 minus 1 specifies a temporal identifier for the NAL unit.

The value of nuh_temporal_id_plus1 shall not be equal to 0.

The variable TemporalId is derived as follows:

$$TemporalId = \text{nuh\_temporaml\_id\_plus1} - 1$$

When nal_unit_type is in the range of IDR_W_RADL to RSV_IRAP_11, inclusive, TemporalId shall be equal to 0.

When nal_unit_type is equal to STSA_NUT and vps_independent_layer_flag[GeneralLayerIdx[nuh_layer_id]] is equal to 1, TemporalId shall be greater than 0.

The value of TemporalId shall be the same for all VCL NAL units of an AU. The value of TemporalId of a coded picture, a PU, or an AU is the value of the TemporalId of the VCL NAL units of the coded picture, PU, or AU. The value of TemporalId of a sublayer representation is the greatest value of TemporalId of all VCL NAL units in the sublayer representation.

The value of TemporalId for non-VCL NAL units is constrained as follows:

If nal_unit_type is equal to DCI_NUT, OPI_NUT, VPS_NUT, or SPS_NUT, TemporalId shall be equal to 0 and the TemporalId of the AU containing the NAL unit shall be equal to 0.

Otherwise, if nal_unit_type is equal to PH_NUT, TemporalId shall be equal to the TemporalId of the PU containing the NAL unit.

Otherwise, if nal_unit_type is equal to EOS_NUT or EOB_NUT, TemporalId shall be equal to 0.

Otherwise, if nal_unit_type is equal to AUD_NUT, FD_NUT, PREFIX_SEI_NUT, or SUFFIX_SEI_NUT, TemporalId shall be equal to the TemporalId of the AU containing the NAL unit.

Otherwise, when nal_unit_type is equal to PPS_NUT, PREFIX_APS_NUT, or SUFFIX_APS_NUT, TemporalId shall be greater than or equal to the TemporalId of the PU containing the NAL unit.

NOTE—When the NAL unit is a non-VCL NAL unit, the value of TemporalId is equal to the minimum value of the TemporalId values of all AUs to which the non-VCL NAL unit applies. When nal_unit_type is equal to PPS_NUT, PREFIX_APS_NUT, or SUFFIX_APS_NUT, TemporalId could be greater than or equal to the TemporalId of the containing AU, as all PPSs and APSs could be included in the beginning of the bitstream (e.g., when they are transported out-of-band, and the receiver places them at the beginning of the bitstream), wherein the first coded picture has TemporalId equal to 0.

nal_unit_type specifies the NAL unit type, i.e., the type of RBSP data structure contained in the NAL unit as specified in Table 3.

NAL units that have nal_unit_type in the range of UNSPEC28 . . . UNSPEC31, inclusive, for which semantics are not specified, shall not affect the decoding process specified in this Specification.

NOTE—NAL unit types in the range of UNSPEC_28 . . . UNSPEC_31 could be used as determined by the application. No decoding process for these values of nal_unit_type is specified in this Specification. Since different applications might use these NAL unit types for different purposes, particular care is expected to be exercised in the design of encoders that generate NAL units with these nal_unit_type values, and in the design of decoders that interpret the content of NAL units with these nal_unit_type values. This Specification does not define any management for these values. These nal_unit_type values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed.

For purposes other than determining the amount of data in the DUs of the bitstream (as specified in Annex C (of JVET-T2001)), decoders shall ignore (remove from the bitstream and discard) the contents of all NAL units that use reserved values of nal_unit_type. NOTE—This requirement allows future definition of compatible extensions to this Specification.

TABLE 3

| nal_unit_type | Name of nal_unit_type | Content of NAL unit and RBSP syntax structure | NAL unit type class |
|---|---|---|---|
| 0 | TRAIL_NUT | Coded slice of a trailing picture or subpicture* slice_layer_rbsp( ) | VCL |
| 1 | STSA_NUT | Coded slice of an STSA picture or subpicture* slice_layer_rbsp( ) | VCL |
| 2 | RADL_NUT | Coded slice of a RADL picture or subpicture* slice_layer_rbsp( ) | VCL |
| 3 | RASL_NUT | Coded slice of a RASL picture or subpicture* slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | Coded slice of an IDR picture or subpicture* slice_layer_rbsp( ) | VCL |
| 8 | IDR_N_LP | | |
| 9 | CRA_NUT | Coded slice of a CRA picture or subpicture* slice_layer_rbsp( ) | VCL |
| 10 | GDR_NUT | Coded slice of a GDR picture or subpicture* slice_layer_rbsp( ) | VCL |
| 11 | RSV_IRAP_11 | Reserved IRAP VCL NAL unit type | VCL |
| 12 | OPI_NUT | Operating point information operating_point_information_rbsp( ) | non-VCL |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |

TABLE 3-continued

| nal_unit_type | Name of nal_unit_type | Content of NAL unit and RBSP syntax structure | NAL unit type class |
|---|---|---|---|
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | non-VCL |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 ... 31 | UNSPEC_28 ... UNSPEC_31 | Unspecified non-VCL NAL unit types | non-VCL |

*indicates a property of a picture when pps_mixed_nalu_types_in_pic_flag is equal to 0 and a property of the subpicture when pps_mixed_nalu_types_in_pic_flag is equal to 1.

NOTE—A clean random access (CRA) picture may have associated RASL or RADL pictures present in the bitstream.

NOTE—An instantaneous decoding refresh (IDR) picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

The value of nal_unit_type shall be the same for all VCL NAL units of a subpicture. A subpicture is referred to as having the same NAL unit type as the VCL NAL units of the subpicture.

For VCL NAL units of any particular picture, the following applies:
  If pps_mixed_nalu_types_in_pic_flag is equal to 0, the value of nal_unit_type shall be the same for all VCL NAL units of a picture, and a picture or a PU is referred to as having the same NAL unit type as the coded slice NAL units of the picture or PU.
  Otherwise (pps_mixed_nalu_types_in_pic_flag is equal to 1), all of the following constraints apply:
    The picture shall have at least two subpictures.
    VCL NAL units of the picture shall have two or more different nal_unit_type values.
    There shall be no VCL NAL unit of the picture that has nal_unit_type equal to GDR_NUT.
    When a VCL NAL unit of the picture has nal_unit_type equal to nalUnitTypeA that is equal to IDR_W_RADL, IDR_N_LP, or CRA_NUT, other VCL NAL units of the picture shall all have nal_unit_type equal to nalUnitTypeA or TRAIL_NUT.

The value of nal_unit_type shall be the same for all pictures in an IRAP or GDR AU.

When sps_video_parameter_set_id is greater than 0, vps_max_tid_il_ref_pics_plus1[i][j] is equal to 0 for j equal to GeneralLayerIdx[nuh_layer_id] and any value of i in the range of j+1 to vps_max_layers_minus1, inclusive, and pps_mixed_nalu_types_in_pic_flag is equal to 1, the value of nal_unit_type shall not be equal to IDR_W_RADL, IDR_N_LP, or CRA_NUT.

It is a requirement of bitstream conformance that the following constraints apply:
  When a picture is a leading picture of an IRAP picture, it shall be a RADL or RASL picture.
  When a subpicture is a leading subpicture of an IRAP subpicture, it shall be a RADL or RASL subpicture.
  When a picture is not a leading picture of an IRAP picture, it shall not be a RADL or RASL picture.
  When a subpicture is not a leading subpicture of an IRAP subpicture, it shall not be a RADL or RASL subpicture.
  No RASL pictures shall be present in the bitstream that are associated with an IDR picture.
  No RASL subpictures shall be present in the bitstream that are associated with an IDR subpicture.
  No RADL pictures shall be present in the bitstream that are associated with an IDR picture having nal_unit_type equal to IDR_N_LP.
    NOTE—It is possible to perform random access at the position of an IRAP AU by discarding all PUs before the IRAP AU (and to correctly decode the non-RASL pictures in the IRAP AU and all the subsequent AUs in decoding order), provided each parameter set is available (either in the bitstream or by external means not specified in this Specification) when it is referenced.
  No RADL subpictures shall be present in the bitstream that are associated with an IDR subpicture having nal_unit_type equal to IDR_N_LP.
  Any picture, with nuh_layer_id equal to a particular value layerId, that precedes an IRAP picture with nuh_layer_id equal to layerId in decoding order shall precede the IRAP picture in output order and shall precede any RADL picture associated with the IRAP picture in output order.
  Any subpicture, with nuh_layer_id equal to a particular value layerId and subpicture index equal to a particular value subpicIdx, that precedes, in decoding order, an IRAP subpicture with nuh_layer_id equal to layerId and subpicture index equal to subpicIdx shall precede, in output order, the IRAP subpicture and all its associated RADL subpictures.
  Any picture, with nuh_layer_id equal to a particular value layerId, that precedes a recovery point picture with nuh_layer_id equal to layerId in decoding order shall precede the recovery point picture in output order.
  Any subpicture, with nuh_layer_id equal to a particular value layerId and subpicture index equal to a particular value subpicIdx, that precedes, in decoding order, a subpicture with nuh_layer_id equal to layerId and subpicture index equal to subpicIdx in a recovery point picture shall precede that subpicture in the recovery point picture in output order.
  Any RASL picture associated with a CRA picture shall precede any RADL picture associated with the CRA picture in output order.
  Any RASL subpicture associated with a CRA subpicture shall precede any RADL subpicture associated with the CRA subpicture in output order.
  Any RASL picture, with nuh_layer_id equal to a particular value layerId, associated with a CRA picture shall follow, in output order, any IRAP or GDR picture with nuh_layer_id equal to layerId that precedes the CRA picture in decoding order.

Any RASL subpicture, with nuh_layer_id equal to a particular value layerId and subpicture index equal to a particular value subpicIdx, associated with a CRA subpicture shall follow, in output order, any IRAP or GDR subpicture, with nuh_layer_id equal to layerId and subpicture index equal to subpicIdx, that precedes the CRA subpicture in decoding order.

If sps_field_seq_flag is equal to 0, the following applies: when the current picture, with nuh_layer_id equal to a particular value layerId, is a leading picture associated with an IRAP picture, it shall precede, in decoding order, all non-leading pictures that are associated with the same IRAP picture. Otherwise (sps_field_seq_flag is equal to 1), let picA and picB be the first and the last leading pictures, in decoding order, associated with an IRAP picture, respectively, there shall be at most one non-leading picture with nuh_layer_id equal to layerId preceding picA in decoding order, and there shall be no non-leading picture with nuh_layer_id equal to layerId between picA and picB in decoding order.

If sps_field_seq_flag is equal to 0, the following applies: when the current subpicture, with nuh_layer_id equal to a particular value layerId and subpicture index equal to a particular value subpicIdx, is a leading subpicture associated with an IRAP subpicture, it shall precede, in decoding order, all non-leading subpictures that are associated with the same IRAP subpicture. Otherwise (sps_field_seq_flag is equal to 1), let subpicA and subpicB be the first and the last leading subpictures, in decoding order, associated with an IRAP subpicture, respectively, there shall be at most one non-leading subpicture with nuh_layer_id equal to layerId and subpicture index equal to subpicIdx preceding subpicA in decoding order, and there shall be no non-leading picture with nuh_layer_id equal to layerId and subpicture index equal to subpicIdx between picA and picB in decoding order.

It should be noted that generally, an Intra Random Access Point (IRAP) picture is a picture that does not refer to any pictures other than itself for prediction in its decoding process. In JVET-T2001, an IRAP picture may be a clean random access (CRA) picture or an instantaneous decoder refresh (IDR) picture. In JVET-T2001, the first picture in the bitstream in decoding order must be an IRAP or a gradual decoding refresh (GDR) picture. JVET-T2001 describes the concept of a leading picture, which is a picture that precedes the associated IRAP picture in output order. JVET-T2001 further describes the concept of a trailing picture which is a non-IRAP picture that follows the associated IRAP picture in output order. Trailing pictures associated with an IRAP picture also follow the IRAP picture in decoding order. For IDR pictures, there are no trailing pictures that require reference to a picture decoded prior to the IDR picture. JVET-T2001 provides where a CRA picture may have leading pictures that follow the CRA picture in decoding order and contain inter picture prediction references to pictures decoded prior to the CRA picture. Thus, when the CRA picture is used as a random access point these leading pictures may not be decodable and are identified as random access skipped leading (RASL) pictures. The other type of picture that can follow an IRAP picture in decoding order and precede it in output order is the random access decodable leading (RADL) picture, which cannot contain references to any pictures that precede the IRAP picture in decoding order. A GDR picture, is a picture for which each VCL NAL unit has nal_unit_type equal to GDR_NUT. If the current picture is a GDR picture that is associated with a picture header which signals a syntax element recovery_poc_cnt and there is a picture picA that follows the current GDR picture in decoding order in the CLVS and that has PicOrderCntVal equal to the PicOrderCntVal of the current GDR picture plus the value of recovery_poc_cnt, the picture picA is referred to as the recovery point picture.

As provided in Table 3 and described above, a NAL unit may include a VCL slice. Tables 5-7 illustrate the syntax structure of a VCL slice, including a slice header and slice trailing bits. It should be noted that although not illustrated below slice data includes coding tree unit syntax structure, i.e., syntax elements for the CTUs included in a slice.

TABLE 4

|  | Descriptor |
| --- | --- |
| slice_layer_rbsp( ) {<br>  slice_header( )<br>  slice_data( )<br>  rbsp_slice_trailing_bits( )<br>} |  |

TABLE 5

|  | Descriptor |
| --- | --- |
| rbsp_slice_trailing_bits( ) {<br>  rbsp_trailing_bits( )<br>  while( more_rbsp_trailing_data( ) )<br>    rbsp_cabac_zero_word /* equal to 0x0000 */<br>} | <br><br><br>f(16) |

TABLE 6

|  | Descriptor |
| --- | --- |
| slice_header( ) {<br>  sh_picture_header_in_slice_header_flag<br>  if( sh_picture_header_in_slice_header_flag )<br>    picture_header_structure( )<br>  if( sps_subpic_info_present_flag )<br>    sh_subpic_id<br>  if( ( pps_rect_slice_flag && NumSlicesInSubpic[ CurrSubpicIdx ] > 1 ) \|\|<br>    ( !pps_rect_slice_flag && NumTilesInPic > 1 ) )<br>    sh_slice_address<br>    for( i = 0; i < NumExtraShBits; i++ )<br>      sh_extra_bit[ i ] | <br>u(1)<br><br><br><br>u(v)<br><br><br>u(v)<br><br>u(1) |

TABLE 6-continued

| | Descriptor |
|---|---|
| if( !pps_rect_slice_flag && NumTilesInPic − sh_slice_address > 1 ) | |
|   sh_num_tiles_in_slice_minus1 | ue(v) |
| if( ph_inter_slice_allowed_flag ) | |
|   sh_slice_type | ue(v) |
| if( nal_unit_type == IDR_W_RADL \|\| nal_unit_type == IDR_N_LP \|\| | |
|     nal_unit_type == CRA_NUT \|\| nal_unit_type == GDR_NUT ) | |
|   sh_no_output_of_prior_pics_flag | u(1) |
| if( sps_alf_enabled_flag && !pps_alf_info_in_ph_flag ) { | |
|   sh_alf_enabled_flag | u(1) |
|   if( sh_alf_enabled_flag ) { | |
|     sh_num_alf_aps_ids_luma | u(3) |
|     for( i = 0; i < sh_num_alf_aps_ids_luma; i++ ) | |
|       sh_alf_aps_id_luma[ i ] | u(3) |
|     if( sps_chroma_format_idc != 0 ) { | |
|       sh_alf_cb_enabled_flag | u(1) |
|       sh_alf_cr_enabled_flag | u(1) |
|     } | |
|     if( sh_alf_cb_enabled_flag \|\| sh_alf_cr_enabled_flag ) | |
|       sh_alf_aps_id_chroma | u(3) |
|     if( sps_ccalf_enabled_flag ) { | |
|       sh_alf_cc_cb_enabled_flag | u(1) |
|       if( sh_alf_cc_cb_enabled_flag ) | |
|         sh_alf_cc_cb_aps_id | u(3) |
|       sh_alf_cc_cr_enabled_flag | u(1) |
|       if( sh_alf_cc_cr_enabled_flag ) | |
|         sh_alf_cc_cr_aps_id | u(3) |
|     } | |
|   } | |
| } | |
| if( ph_lmcs_enabled_flag && !sh_picture_header_in_slice_header_flag ) | |
|   sh_lmcs_used_flag | u(1) |
| if( ph_explicit_scaling_list_enabled_flag && !sh_picture_header_in_slice_header_flag ) | |
|   sh_explicit_scaling_list_used_flag | u(1) |
| if( !pps_rpl_info_in_ph_flag && ( ( nal_unit_type != IDR_W_RADL && | |
|     nal_unit_type != IDR_N_LP ) \|\| sps_idr_rpl_present_flag ) ) | |
|   ref_pic_lists( ) | |
| if( ( sh_slice_type != I && num_ref_entries[ 0 ][ RplsIdx[ 0 ] ] > 1 ) \|\| | |
|     ( sh_slice_type == B && num_ref_entries[ 1 ][ RplsIdx[ 1 ] ] > 1 ) ) { | |
|   sh_num_ref_idx_active_override_flag | u(1) |
|   if( sh_num_ref_idx_active_override_flag ) | |
|     for( i = 0; i < ( sh_slice_type == B ? 2: 1 ); i++ ) | |
|       if( num_ref_entries[ i ][ RplsIdx[ i ] ] > 1 ) | |
|         sh_num_ref_idx_active_minus1[ i ] | ue(v) |
| } | |
| if( sh_slice_type != I ) { | |
|   if( pps_cabac_init_present_flag ) | |
|     sh_cabac_init_flag | u(1) |
|   if( ph_temporal_mvp_enabled_flag && !pps_rpl_info_in_ph_flag ) { | |
|     if( sh_slice_type == B ) | |
|       sh_collocated_from_l0_flag | u(1) |
|     if( ( sh_collocated_from_l0_flag && NumRefIdxActive[ 0 ] > 1 ) \|\| | |
|       ( ! sh_collocated_from_l0_flag && NumRefIdxActive[ 1 ] > 1 ) ) | |
|       sh_collocated_ref_idx | ue(v) |
|   } | |
|   if( !pps_wp_info_in_ph_flag && | |
|     ( ( pps_weighted_pred_flag && sh_slice_type P ) \|\| | |
|     ( pps_weighted_bipred_flag && sh_slice_type == B ) ) ) | |
|     pred_weight_table( ) | |
| } | |
| if( !pps_qp_delta_info_in_ph_flag ) | |
|   sh_qp_delta | se(v) |
| if( pps_slice_chroma_qp_offsets_present_flag ) { | |
|   sh_cb_qp_offset | se(v) |
|   sh_cr_qp_offset | se(v) |
|   if( sps_joint_cbcr_enabled_flag ) | |
|     sh_joint_cbcr_qp_offset | se(v) |
| } | |
| if( pps_cu_chroma_qp_offset_list_enabled_flag ) | |
|   sh_cu_chroma_qp_offset_enabled_flag | u(1) |
| if( sps_sao_enabled_flag && !pps_sao_info_in_ph_flag ) { | |
|   sh_sao_luma_used_flag | u(1) |
|   if( sps_chroma_format_idc != 0 ) | |
|     sh_sao_chroma_used_flag | u(1) |
| } | |

TABLE 6-continued

| | Descriptor |
|---|---|
| if( pps_deblocking_filter_override_enabled_flag && !pps_dbf_info_in_ph_flag ) | |
|    sh_deblocking_params_present_flag | u(1) |
| if( sh_deblocking_params_present_flag ) { | |
|   if( !pps_deblocking_filter_disabled_flag ) | |
|     sh_deblocking_filter_disabled_flag | u(1) |
|   if( !sh_deblocking_filter_disabled_flag ) { | |
|     sh_luma_beta_offset_div2 | se(v) |
|     sh_luma_tc_offset_div2 | se(v) |
|     if( pps_chroma_tool_offsets_present_flag ) { | |
|       sh_cb_beta_offset_div2 | se(v) |
|       sh_cb_tc_offset_div2 | se(v) |
|       sh_cr_beta_offset_div2 | se(v) |
|       sh_cr_tc_offset_div2 | se(v) |
|     } | |
|   } | |
| } | |
| if( sps_dep_quant_enabled_flag ) | |
|   sh_dep_quant_used_flag | u(1) |
| if( sps_sign_data_hiding_enabled_flag && !sh_dep_quant_used_flag ) | |
|   sh_sign_data_hiding_used_flag | u(1) |
| if( sps_transform_skip_enabled_flag && !sh_dep_quant_used_flag && | |
|     !sh_sign_data_hiding_used_flag ) | |
|   sh_ts_residual_coding_disabled_flag | u(1) |
| if( pps_slice_header_extension_present_flag ) { | |
|   sh_slice_header_extension_length | ue(v) |
|   for( i = 0; i < sh_slice_header_extension_length; i++ ) | |
|     sh_slice_header_extension_data_byte[ i ] | u(8) |
| } | |
| if( NumEntryPoints > 0 ) { | |
|   sh_entry_offset_len_minus1 | ue(v) |
|   for( i = 0; i < NumEntryPoints; i++ ) | |
|     sh_entry_point_offset_minus1[ i ] | u(v) |
| } | |
| byte_alignment( ) | |
| } | |

With respect to Tables 4-6, JVET-T2001 provides the following semantics:

rbsp_cabac_zero_word is a byte-aligned sequence of two bytes equal to 0x0000.

Let the variable NumBytesInPicVclNalUnits be the sum of the values of NumBytesInNalUnit for all VCL NAL units of a coded picture.

Let the variable BinCountsInPicNalUnits be the number of times that the parsing process function DecodeBin( ), specified in clause 9.3.4.3.1 (of JVET-T2001) is invoked to decode the contents of all VCL NAL units of a coded picture.

Let the variable RawMinCuBits be derived as follows:

$$RawMinCuBits = MinCbSizeY * MinCbSizeY *$$
$$(BitDepth + 2 * BitDepth/(SubWidthC * SubHeightC))$$

Let the variable vclByteScaleFactor be derived to be equal to (32+4*general_tier_flag)÷3.

The value of BinCountsInPicNalUnits shall be less than or equal to vclByteScaleFactor*NumBytesInPicVcl-NalUnits+(RawMinCuBits*PicSizeInMinCbsY)÷32.

NOTE—The constraint on the maximum number of bins resulting from decoding the contents of the coded slice NAL units could be met by inserting a number of rbsp_cabac_zero_word syntax elements to increase the value of NumBytesInPicVclNalUnits. Each rbsp_cabac_zero_word is represented in a NAL unit by the three-byte sequence 0x000003 (as a result of the constraints on NAL unit contents that result in requiring inclusion of an emulation_prevention_three_byte for each rbsp_cabac_zero_word).

Let the variable NumBytesInSubpicVclNalUnits be the sum of the values NumBytesInNalUnit for all VCL NAL units of a subpicture with subpicture index subpicIdxA.

Let the variable BinCountsInSubpicNalUnits be the number of times that the parsing process function DecodeBin( ), specified in clause 9.3.4.3.1 (of JVET-T2001), is invoked to decode the contents of all VCL NAL units of a subpicture with subpicture index subpicIdxA.

The variable subpicSizeInMinCbsY for the subpicture with subpicture index subpicIdxA is derived to be equal to ((sps_subpic_width_minus1[subpicIdxA]+1)*CtbSizeY/ MinCbSizeY*(sps_subpic_height_minus1[subpicIdxA]+ 1)* CtbSizeY/MinCbSizeY).

For each subpicture with subpicture index subpicIdxA for which sps_subpic_treated_as_pic_flag[subpicIdxA] is equal to 1, the value of BinCountsInSubpicNalUnits shall be less than or equal to vclByteScaleFactor*NumBytesIn-SubpicVclNalUnits+(RawMinCuBits*subpicSizeIn-MinCbsY)÷32.

The variable CuQpDeltaVal, specifying the difference between a luma quantization parameter for the coding unit containing cu_qp_delta_abs and its prediction, is set equal to 0. The variables $CuQpOffset_{Cb}$, $CuQpOffset_{Cr}$, and $CuQpOffset_{CbCr}$, specifying values to be used when determining the respective values of the $Qp'_{Cb}$, $Qp'_{Cr}$, and $Qp'_{CbCr}$ quantization parameters for the coding unit containing cu_chroma_qp_offset_flag, are all set equal to 0.

sh_picture_header_in_slice_header_flag equal to 1 specifies that the PH syntax structure is present in the slice header. sh_picture_header_in_slice_header_flag equal to 0 specifies that the PH syntax structure is not present in the slice header.

It is a requirement of bitstream conformance that the value of sh_picture_header_in_slice_header_flag shall be the same in all coded slices in a CLVS.

When sh_picture_header_in_slice_header_flag is equal to 1 for a coded slice, it is a requirement of bitstream conformance that no NAL unit with nal_unit_type equal to PH_NUT shall be present in the CLVS.

When sh_picture_header_in_slice_header_flag is equal to 0, all coded slices in the current picture shall have sh_picture_header_in_slice_header_flag equal to 0, and the current PU shall have a PH NAL unit.

When any of the following conditions is true, the value of sh_picture_header_in_slice_header_flag shall be equal to 0:
  The value of sps_subpic_info_present_flag is equal to 1.
  The value of pps_rect_slice_flag is equal to 0.
  The value of pps_rpl_info_in_ph_flag, pps_dbf_info_in_ph_flag, pps_sao_info_in_ph_flag, pps_alf_info_in_ph_flag, pps_wp_info_in_ph_flag, or pps_qp_delta_info_in_ph_flag is equal to 1.

sh_subpic_id specifies the subpicture ID of the subpicture that contains the slice. If sh_subpic_id is present, the value of the variable CurrSubpicIdx is derived to be such that SubpicIdVal[CurrSubpicIdx] is equal to sh_subpic_id. Otherwise (sh_subpic_id is not present), CurrSubpicIdx is derived to be equal to 0. The length of sh_subpic_id is sps_subpic_id_len_minus1+1 bits.

sh_slice_address specifies the slice address of the slice. When not present, the value of sh_slice_address is inferred to be equal to 0.

If pps_rect_slice_flag is equal to 0, the following applies:
  The slice address is the raster scan tile index of the first tile in the slice.
  The length of sh_slice_address is Ceil(Log 2(NumTilesInPic)) bits.
  The value of sh_slice_address shall be in the range of 0 to NumTilesInPic−1, inclusive.

Otherwise (pps_rect_slice_flag is equal to 1), the following applies:
  The slice address is the subpicture-level slice index of the current slice, i.e., SubpicLevelSliceIdx[j], where j is the picture-level slice index of the current slice.
  The length of sh_slice_address is Ceil(Log 2(NumSlicesInSubpic[CurrSubpicIdx])) bits.
  The value of sh_slice_address shall be in the range of 0 to NumSlicesInSubpic[CurrSubpicIdx]−1, inclusive.

It is a requirement of bitstream conformance that the following constraints apply:
  If pps_rect_slice_flag is equal to 0 or sps_subpic_info_present_flag is equal to 0, the value of sh_slice_address shall not be equal to the value of sh_slice_address of any other coded slice NAL unit of the same coded picture.
  Otherwise, the pair of sh_subpic_id and sh_slice_address values shall not be equal to the pair of sh_subpic_id and sh_slice_address values of any other coded slice NAL unit of the same coded picture.
  The shapes of the slices of a picture shall be such that each CTU, when decoded, shall have its entire left boundary and entire top boundary consisting of a picture boundary dr consisting of boundaries of previously decoded CTU(s).

sh_extra_bit[i] could have any value. Decoders conforming to this version of this Specification shall ignore the presence and value of sh_extra_bit[i]. Its value does not affect the decoding process specified in this version of this Specification.

sh_num_tiles_in_slice_minus1 plus 1, when present, specifies the number of tiles in the slice. The value of sh_num_tiles_in_slice_minus1 shall be in the range of 0 to NumTilesInPic−1, inclusive. When not present, the value of sh_num_tiles_in_slice_minus1 shall be inferred to be equal to 0.

The variable NumCtusInCurrSlice, which specifies the number of CTUs in the current slice, and the list CtbAddrInCurrSlice[i], for i ranging from 0 to NumCtusInCurrSlice−1, inclusive, specifying the picture raster scan address of the i-th CTB within the slice, are derived as follows:

```
if( pps_rect_slice_flag ) {
    picLevelSliceIdx = sh_slice_address
    for( j = 0; j < CurrSubpicIdx; j++ )
        picLevelSliceIdx += NumSlicesInSubpic[ j ]
    NumCtusInCurrSlice = NumCtusInSlice[ picLevelSliceIdx ]
    for( i = 0; i < NumCtusInCurrSlice; i++ )
        CtbAddrInCurrSlice[ i ] = CtbAddrInSlice[ picLevelSliceIdx ][ i ]
} else {
    NumCtusInCurrSlice = 0
    for( tileIdx = sh_slice_address; tileIdx <=
sh_slice_address + sh_num_tiles_in_slice_minus1; tileIdx++ ) {
        tileX = tileIdx % NumTileColumns
        tileY = tileIdx / NumTileColumns
        for( ctbY = TileRowBdVal[ tileY ]; ctbY < TileRowBdVal[ tileY + 1 ]; ctbY++ ) {
            for( ctbX = TileColBdVal[ tileX ]; ctbX < TileColBdVal[ tileX + 1 ]; ctbX++ ) {
                CtbAddrInCurrSlice[ NumCtusInCurrSlice ] = ctbY * PicWidthInCtbsY + ctbX
                NumCtusInCurrSlice++
            }
        }
    }
}
```

The variables SubpicLeftBoundaryPos, SubpicTopBoundaryPos, SubpicRightBoundaryPos, and SubpicBotBoundaryPos are derived as follows:

```
if( sps_subpic_treated_as_pic_flag[ CurrSubpicIdx ] ) {
    SubpicLeftBoundaryPos = sps_subpic_ctu_top_left_x[
CurrSubpicIdx ] * CtbSizeY
    SubpicRightBoundaryPos = Min(
pps_pic_width_in_luma_samples − 1,
        ( sps_subpic_ctu_top_left_x[ CurrSubpicIdx ] +
sps_subpic_width_minus1[ CurrSubpicIdx ] + 1 ) *
        CtbSizeY − 1 )
```

-continued

```
SubpicTopBoundaryPos = sps_subpic_ctu_top_left_y[
CurrSubpicIdx ] *CtbSizeY
SubpicBotBoundaryPos = Min( pps_pic_height_in_luma_samples −
1,
  ( sps_subpic_ctu_top_left_y[ CurrSubpicIdx ] +
  sps_subpic_height_minus1[ CurrSubpicIdx ] + 1 ) *
  CtbSizeY − 1 )
}
``` sh_slice_type specifies the coding type of the slice according to Table 7.

TABLE 7

| sh_slice_type | Name of sh_slice_type |
|---|---|
| 0 | B (B slice) |
| 1 | P (P slice) |
| 2 | I (I slice) |

When not present, the value of sh_slice_type is inferred to be equal to 2.

When ph_intra_slice_allowed_flag is equal to 0, the value of sh_slice_type shall be equal to 0 or 1.

When both of the following conditions are true, the value of sh_slice_type shall be equal to 2:
  The value of nal_unit_type is in the range of IDR_W_RADL to CRA_NUT, inclusive.
  The value of vps_independent_layer_flag[GeneralLayerIdx[nuh_layer_id]] is equal to 1 or the current picture is the first picture in the current AU.

When sps_subpic_treated_as_pic_flag[CurrSubpicIdx] is equal to 0, pps_mixed_nalu_types_in_pic_flag is equal to 1 (i.e., there are at least two subpictures in the current picture having different NAL unit types), the value of sh_slice_type shall be equal to 2.

NOTE—This constraint is technically equivalent to the following: "When pps_mixed_nalu_types_in_pic_flag for a picture is equal to 1 (i.e., there are at least two subpictures in a picture having different NAL unit types), the value of sps_subpic_treated_as_pic_flag[ ] shall be equal to 1 for all the subpictures that are in the picture and contain at least one P or B slice."

sh_no_output_of_prior_pics_flag affects the output of previously-decoded pictures in the DPB after the decoding of a picture in a CVSS AU that is not the first AU in the bitstream as specified.

It is a requirement of bitstream conformance that the value of sh_no_output_of_prior_pics_flag shall be the same for all slices in an AU that have sh_no_output_of_prior_pics_flag present in the SHs.

When all slices in an AU have sh_no_output_of_prior_pics_flag present in the SHs, the value of sh_no_output_of_prior_pics_flag in the SHs is also referred to as the value sh_no_output_of_prior_pics_flag of the AU.

The variables MinQt Log 2SizeY, MinQt Log 2SizeC, MinQtSizeY, MinQtSizeC, MaxBtSizeY, MaxBtSizeC, MinBtSizeY, MaxTtSizeY, MaxTtSizeC, MinTtSizeY, MaxMttDepthY and MaxMttDepthC are derived as follows:

If sh_slice_type equal to 2 (I), the following applies:

$MinQtLog2SizeY =$ $\quad MinCbLog21SizeY + ph\_log2\_diff\_min\_qt\_min\_cb\_intra\_slice\_luma$ $MinQtLog2SizeC = MinCbLog21SizeY +$ $\quad ph\_log2\_diff\_min\_qt\_min\_cb\_intra\_slice\_chroma$ $MaxBtSizeY = 1 <<$ $\quad (MinQtLog2SizeY + ph\_log2\_diff\_max\_bt\_min\_qt\_intra\_slice\_luma)$ $MaxBtSizeC = 1 <<$ $\quad (MinQtLog2SizeC + ph\_log2\_diff\_max\_bt\_min\_qt\_intra\_slice\_chroma)$ $MaxTtSizeY = 1 <<$ $\quad (MinQtLog2SizeY + ph\_log2\_diff\_max\_bt\_min\_qt\_intra\_slice\_luma)$ $MaxTtSizeC = 1 <<$ $\quad (MinQtLog2SizeC + ph\_log2\_diff\_max\_bt\_min\_qt\_intra\_slice\_chroma)$ $MaxMttDepthY = ph\_max\_mtt\_hierarchy\_depth\_intra\_slice\_luma$ $MaxMttDepthC = ph\_max\_mtt\_hierarchy\_depth\_intra\_slice\_chroma$ $CuQpDeltaSubdiv = ph\_cu\_qp\_delta\_subdiv\_intra\_slice$ $CuChromaQpOffsetSubdiv = ph\_cu\_chroma\_qp\_offset\_subdiv\_intra\_slice$ Otherwise (sh_slice_type equal to 0 (B) or 1 (P)), the following applies:

$MinQtLog2SizeY =$ $\quad MinCbLog21SizeY + ph\_log2\_diff\_min\_qt\_min\_cb\_intra\_slice\_luma$ $MinQtLog2SizeC = MinCbLog21SizeY +$ $\quad ph\_log2\_diff\_min\_qt\_min\_cb\_intra\_slice\_chroma$ $MaxBtSizeY = 1 <<$ $\quad (MinQtLog2SizeY + ph\_log2\_diff\_max\_bt\_min\_qt\_intra\_slice\_luma)$ $MaxBtSizeC = 1 <<$ $\quad (MinQtLog2SizeC + ph\_log2\_diff\_max\_bt\_min\_qt\_intra\_slice\_chroma)$ $MaxTtSizeY = 1 <<$ $\quad (MinQtLog2SizeY + ph\_log2\_diff\_max\_bt\_min\_qt\_intra\_slice\_luma)$ $MaxTtSizeC = 1 <<$ $\quad (MinQtLog2SizeC + ph\_log2\_diff\_max\_bt\_min\_qt\_intra\_slice\_chroma)$ $MaxMttDepthY = ph\_max\_mtt\_hierarchy\_depth\_intra\_slice\_luma$ $MaxMttDepthC = ph\_max\_mtt\_hierarchy\_depth\_intra\_slice\_chroma$ $CuQpDeltaSubdiv = ph\_cu\_qp\_delta\_subdiv\_intra\_slice$ $CuChromaQpOffsetSubdiv = ph\_cu\_chroma\_qp\_offset\_subdiv\_intra\_slice$ The following applies:

$$MinQtSizeY = 1 << MinQtLog2SizeY$$

$$MinQtSizeC = 1 << MinQtLog2SizeC$$

$$MinBtSizeY = 1 << MinCbLog2SizeY$$

$$MinTtSizeY = 1 << MinCbtLog2SizeY$$

sh_alf_enabled_flag equal to 1 specifies that ALF is enabled for the Y, Cb, or Cr colour component of the current slice. sh_alf_enabled_flag equal to 0 specifies that ALF is disabled for all colour components in the current slice. When not present, the value of sh_alf_enabled_flag is inferred to be equal to ph_alf_enabled_flag.

sh_num_alf_aps_ids_luma specifies the number of ALF APSs that the slice refers to. When sh_alf_enabled_flag is equal to 1 and sh_num_alf_aps_ids_luma is not present, the value of sh_num_alf_aps_ids_luma is inferred to be equal to the value of ph_num_alf_aps_ids_luma.

sh_alf_aps_id_luma[i] specifies the aps_adaptation_parameter_set_id of the i-th ALF APS that the luma component of the slice refers to. When sh_alf_enabled_flag is equal to 1 and sh_alf_aps_id_luma[i] is not present, the value of sh_alf_aps_id_luma[i] is inferred to be equal to the value of ph_alf_aps_id_luma[i]. When sh_alf_aps_id_luma[i] is present, the following applies:

The TemporalId of the APS NAL unit having aps_params_type equal to ALF_APS and aps_adaptation_parameter_set_id equal to sh_alf_aps_id_luma[i] shall be less than or equal to the TemporalId of the coded slice NAL unit.

The value of alf_luma_filter_signal_flag of the APS NAL unit having aps_params_type equal to ALF_APS and aps_adaptation_parameter_set_id equal to sh_alf_aps_id_luma[i] shall be equal to 1.

When sps_chroma_format_idc is equal to 0, the value of aps_chroma_present_flag of the APS NAL unit having aps_params_type equal to ALF APS and aps_adaptation_parameter_set_id equal to sh_alf_aps_id_luma[i] shall be equal to 0.

When sps_ccalf_enabled_flag is equal to 0, the values of alf_cc_cb_filter_signal_flag and alf_cc_cr_filter_signal_flag of the APS NAL unit having aps_params_type equal to ALF_APS and aps_adaptation_parameter_set_id equal to sh_alf_aps_id_luma[i] shall be equal to 0.

sh_alf_cb_enabled_flag equal to 1 specifies that ALF is enabled for the Cb colour component of the current slice. sh_alf_cb_enabled_flag equal to 0 specifies that ALF is disabled for the Cb colour component of the current slice. When sh_alf_cb_enabled_flag is not present, it is inferred to be equal to ph_alf_cb_enabled_flag.

sh_alf_cr_enabled_flag equal to 1 specifies that ALF is enabled for the Cr colour component of the current slice. sh_alf_cr_enabled_flag equal to 0 specifies that ALF is disabled for the Cr colour component of the current slice. When sh_alf_cr_enabled_flag is not present, it is inferred to be equal to ph_alf_cr_enabled_flag.

sh_alf_aps_id_chroma specifies the aps_adaptation_parameter_set_id of the ALF APS that the chroma component of the slice refers to. When sh_alf_enabled_flag is equal to 1 and sh_alf_aps_id_chroma is not present, the value of sh_alf_aps_id_chroma is inferred to be equal to the value of ph_alf_aps_id_chroma. When sh_alf_aps_id_chroma is present, the following applies:

The TemporalId of the APS NAL unit having aps_params_type equal to ALF_APS and aps_adaptation_parameter_set_id equal to sh_alf_aps_id_chroma shall be less than or equal to the TemporalId of the coded slice NAL unit.

The value of alf_chroma_filter_signal_flag of the APS NAL unit having aps_params_type equal to ALF_APS and aps_adaptation_parameter_set_id equal to sh_alf_aps_id_chroma shall be equal to 1.

When sps_ccalf_enabled_flag is equal to 0, the values of alf_cc_cb_filter_signal_flag and alf_cc_cr_filter_signal_flag of the APS NAL unit having aps_params_type equal to ALF_APS and aps_adaptation_parameter_set_id equal to sh_alf_aps_id_chroma shall be equal to 0.

sh_alf_cc_cb_enabled_flag equal to 1 specifies that CCALF is enabled for the Cb colour component. sh_alf_cc_cb_enabled_flag equal to 0 specifies that CCALF is disabled for the Cb colour component. When sh_alf_cc_cb_enabled_flag is not present, it is inferred to be equal to ph_alf_cc_cb_enabled_flag.

sh_alf_cc_cb_aps_id specifies the aps_adaptation_parameter_set_id that the Cb colour component of the slice refers to.

The TemporalId of the APS NAL unit having aps_params_type equal to ALF_APS and aps_adaptation_parameter_set_id equal to sh_alf_cc_cb_aps_id shall be less than or equal to the TemporalId of the coded slice NAL unit. When sh_alf_cc_cb_enabled_flag is equal to 1 and sh_alf_cc_cb_aps_id is not present, the value of sh_alf_cc_cb_aps_id is inferred to be equal to the value of ph_alf_cc_cb_aps_id.

The value of alf_cc_cb_filter_signal_flag of the APS NAL unit having aps_params_type equal to ALF_APS and aps_adaptation_parameter_set_id equal to sh_alf_cc_cb_aps_id shall be equal to 1. sh_alf_cc_cr_enabled_flag equal to 1 specifies that CCALF is enabled for the Cr colour component of the current slice. sh_alf_cc_cr_enabled_flag equal to 0 specifies that CCALF is disabled for the Cr colour component. When sh_alf_cc_cr_enabled_flag is not present, it is inferred to be equal to ph_alf_cc_cr_enabled_flag.

sh_alf_cc_cr_aps_id specifies the aps_adaptation_parameter_set_id that the Cr colour component of the slice refers to. The TemporalId of the APS NAL unit having aps_params_type equal to ALF_APS and aps_adaptation_parameter_set_id equal to sh_alf_cc_cr_aps_id shall be less than or equal to the TemporalId of the coded slice NAL unit. When sh_alf_cc_cr_enabled_flag is equal to 1 and sh_alf_cc_cr_aps_id is not present, the value of sh_alf_cc_cr_aps_id is inferred to be equal to the value of ph_alf_cc_cr_aps_id.

The value of alf_cc_cr_filter_signal_flag of the APS NAL unit having aps_params_type equal to ALF_APS and aps_adaptation_parameter_set_id equal to sh_alf_cc_cr_aps_id shall be equal to 1.

sh_lmcs_used_flag equal to 1 specifies that luma mapping is used for the current slice and chroma scaling could be used for the current slice (depending on the value of ph_chroma_residual_scale_flag). sh_lmcs_used_flag equal to 0 specifies that luma mapping with chroma scaling is not used for the current slice. When sh_lmcs_used_flag is not present, it is inferred to be equal to sh_picture_header_in_slice_header_flag?ph_lmcs_enabled_flag: 0.

sh_explicit_scaling_list_used_flag equal to 1 specifies that the explicit scaling list is used in the scaling process for transform coefficients when decoding the current slice.

sh_explicit_scaling_list_used_flag equal to 0 specifies that the explicit scaling list is not used in the scaling process for transform coefficients when decoding the current slice. When not present, the value of sh_explicit_scaling_list_used_flag is inferred to be equal to sh_picture_header_in_slice_header_flag?ph_explicit_scaling_list_enabled_flag: 0.

sh_num_ref_idx_active_override_flag equal to 1 specifies that the syntax element sh_num_ref_idx_active_minus1[0] is present for P and B slices when num_ref_entries[0][RplsIdx[0]] is greater than 1 and the syntax element sh_num_ref_idx_active_minus1[1] is present for B slices when num_ref_entries[1][RplsIdx[1]] is greater than 1. sh_num_ref_idx_active_override_flag equal to 0 specifies that the syntax elements sh_num_ref_idx_active_minus1[0] and sh_num_ref_idx_active_minus1[1] are not present. When not present, the value of sh_num_ref_idx_active_override_flag is inferred to be equal to 1.

sh_num_ref_idx_active_minus1[i] is used for the derivation of the variable NumRefIdxActive[i] as specified by the Equation below. The value of sh_num_ref_idx_active_minus1[i] shall be in the range of 0 to 14, inclusive.

For i equal to 0 or 1, when the current slice is a B slice, sh_num_ref_idx_active_override_flag is equal to 1, and sh_num_ref_idx_active_minus1[i] is not present, sh_num_ref_idx_active_minus1[i] is inferred to be equal to 0.

When the current slice is a P slice, sh_num_ref_idx_active_override_flag is equal to 1, and sh_num_ref_idx_active_minus1[0] is not present, sh_num_ref_idx_active_minus1[0] is inferred to be equal to 0.

The variable NumRefIdxActive[i] is derived as follows:

```
for( i = 0; i < 2; i++ ) {
    if( sh_slice_type = = B | | ( sh_slice_type = = P && i = = 0 ) ) {
        if( sh_num_ref_idx_active_override_flag )
            NumRefIdxActive[ i ] =
            sh_num_ref_idx_active_minus1[ i ] + 1
        else {
            if( num_ref_entries[ i ][ RplsIdx[ i ] ] >=
pps_num_ref_idx_default_active_minus1[ i ] + 1 )
                NumRefIdxActive[ i ] =
                pps_num_ref_idx_default_active_minus1 [ i ] + 1
            else
                NumRefIdxActive[ i ] =
                num_ref_entries[ i ][ RplsIdx[ i ] ]
        }
    } else /* sh_slice_type = = I | | ( sh_slice_type = = P && i = = 1 ) */
        NumRefIdxActive[ i ] = 0
}
```

The value of NumRefIdxActive[i]−1 specifies the maximum reference index for RPL i that may be used to decode the slice. When the value of NumRefIdxActive[i] is equal to 0, no reference index for RPL i is used to decode the slice.

When the current slice is a P slice, the value of NumRefIdxActive[0] shall be greater than 0.

When the current slice is a B slice, both NumRefIdxActive[0] and NumRefIdxActive[1] shall be greater than 0.

sh_cabac_init_flag specifies the method for determining the initialization table used in the initialization process for context variables. When sh_cabac_init_flag is not present, it is inferred to be equal to 0.

sh_collocated_from_l0_flag equal to 1 specifies that the collocated picture used for temporal motion vector prediction is derived from RPL 0. sh_collocated_from_l0_flag equal to 0 specifies that the collocated picture used for temporal motion vector prediction is derived from RPL 1.

When sh_slice_type is equal to B or P, ph_temporal_mvp_enabled_flag is equal to 1, and sh_collocated_from_l0_flag is not present, the following applies:
  If sh_slice_type is equal to B, sh_collocated_from_l0_flag is inferred to be equal to ph_collocated_from_l0_flag.
  Otherwise (sh_slice_type is equal to P), the value of sh_collocated_from_l0_flag is inferred to be equal to 1.

sh_collocated_ref_idx specifies the reference index of the collocated picture used for temporal motion vector prediction.

When sh_slice_type is equal to P or when sh_slice_type is equal to B and sh_collocated_from_l0_flag is equal to 1, sh_collocated_ref_idx refers to an entry in RPL 0, and the value of sh_collocated_ref_idx shall be in the range of 0 to NumRefIdxActive[0]−1, inclusive.

When sh_slice_type is equal to B and sh_collocated_from_l0_flag is equal to 0, sh_collocated_ref_idx refers to an entry in RPL 1, and the value of sh_collocated_ref_idx shall be in the range of 0 to NumRefIdxActive[1]−1, inclusive.

When sh_collocated_ref_idx is not present, the following applies:
  If pps_rpl_info_in_ph_flag is equal to 1, the value of sh_collocated_ref_idx is inferred to be equal to ph_collocated_ref_idx.
  Otherwise (pps_rpl_info_in_ph_flag is equal to 0), the value of sh_collocated_ref_idx is inferred to be equal to 0.

Let colPicList be set equal to sh_collocated_from_l0_flag?0:1. It is a requirement of bitstream conformance that the picture referred to by sh_collocated_ref_idx shall be the same for all non-I slices of a coded picture, the value of RprConstraintsActiveFlag[colPicList][sh_collocated_ref_idx] shall be equal to 0, and the value of sps_log 2_ctu_size_minus5 for the picture referred to by sh_collocated_ref_idx shall be equal to the value of sps_log 2_ctu_size_minus5 for the current picture.

NOTE—The collocated picture has the same spatial resolution, the same scaling window offsets, the same number of subpictures, and the same CTU size as the current picture.

sh_qp_delta specifies the initial value of $Qp_Y$ to be used for the coding blocks in the slice until modified by the value of CuQpDeltaVal in the coding unit layer.

When pps_qp_delta_info_in_ph_flag is equal to 0, the initial value of the $Qp_Y$ quantization parameter for the slice, $SliceQp_Y$, is derived as follows:

$$SliceQpy = 26 + pps\_init\_qp\_minus26 + sh\_qp\_delta$$

The value of $SliceQp_Y$ shall be in the range of −QpBdOffset to +63, inclusive.

When either of the following conditions is true, the value of NumRefIdxActive[0] shall be less than or equal to the value of NumWeightsL0:
  The value of pps_wp_info_in_ph_flag is equal to 1, pps_weighted_pred_flag is equal to 1, and sh_slice_type is equal to P.
  The value of pps_wp_info_in_ph_flag is equal to 1, pps_weighted_bipred_flag is equal to 1, and sh_slice_type is equal to B.

When pps_wp_info_in_ph_flag is equal to 1, pps_weighted_bipred_flag is equal to 1, and sh_slice_type is equal to B, the value of NumRefIdxActive[1] shall be less than or equal to the value of NumWeightsL1.

When either of the following conditions is true, for each value of i in the range of 0 to NumRefIdxActive[0]−1, inclusive, the values of luma_weight_l0_flag[i] and chroma_weight_l0_flag[i] are both inferred to be equal to 0:
  The value of pps_wp_info_in_ph_flag is equal to 1, pps_weighted_pred_flag is equal to 0, and sh_slice_type is equal to P.
  The value of pps_wp_info_in_ph_flag is equal to 1, pps_weighted_bipred_flag is equal to 0, and sh_slice_type is equal to B.

sh_cb_qp_offset specifies a difference to be added to the value of pps_cb_qp_offset when determining the value of the $Qp'_{Cb}$ quantization parameter. The value of sh_cb_qp_offset shall be in the range of −12 to +12, inclusive. When sh_cb_qp_offset is not present, it is inferred to be equal to 0. The value of pps_cb_qp_offset+sh_cb_qp_offset shall be in the range of −12 to +12, inclusive.

sh_cr_qp_offset specifies a difference to be added to the value of pps_cr_qp_offset when determining the value of the $Qp'_{Cr}$ quantization parameter. The value of sh_cr_qp_offset shall be in the range of −12 to +12, inclusive. When sh_cr_qp_offset is not present, it is inferred to be equal to 0. The value of pps_cr_qp_offset+sh_cr_qp_offset shall be in the range of −12 to +12, inclusive.

sh_joint_cbcr_qp_offset specifies a difference to be added to the value of pps_joint_cbcr_qp_offset_value when determining the value of the $Qp'_{CbCr}$. The value of sh_joint_cbcr_qp_offset shall be in the range of −12 to +12, inclusive. When sh_joint_cbcr_qp_offset is not present, it is inferred to be equal to 0. The value of pps_joint_cbcr_qp_offset_value+sh_joint_cbcr_qp_offset shall be in the range of −12 to +12, inclusive.

sh_cu_chroma_qp_offset_enabled_flag equal to 1 specifies that the cu_chroma_qp_offset_flag could be present in the transform unit and palette coding syntax of the current slice. sh_cu_chroma_qp_offset_enabled_flag equal to 0 specifies that the cu_chroma_qp_offset_flag is not present in the transform unit or palette coding syntax of the current slice. When not present, the value of sh_cu_chroma_qp_offset_enabled_flag is inferred to be equal to 0.

sh_sao_luma_used_flag equal to 1 specifies that SAO is used for the luma component in the current slice. sh_sao_luma_used_flag equal to 0 specifies that SAO is not used for the luma component in the current slice. When sh_sao_luma_used_flag is not present, it is inferred to be equal to ph_sao_luma_enabled_flag.

sh_sao_chroma_used_flag equal to 1 specifies that SAO is used for the chroma component in the current slice. sh_sao_chroma_used_flag equal to 0 specifies that SAO is not used for the chroma component in the current slice. When sh_sao_chroma_used_flag is not present, it is inferred to be equal to ph_sao_chroma_enabled_flag.

sh_deblocking_params_present_flag equal to 1 specifies that the deblocking parameters could be present in the slice header. sh_deblocking_params_present_flag equal to 0 specifies that the deblocking parameters are not present in the slice header. When not present, the value of sh_deblocking_params_present_flag is inferred to be equal to 0.

sh_deblocking_filter_disabled_flag equal to 1 specifies that the deblocking filter is disabled for the current slice. sh_deblocking_filter_disabled_flag equal to 0 specifies that the deblocking filter is enabled for the current slice.

When sh_deblocking_filter_disabled_flag is not present, it is inferred as follows:
  If pps_deblocking_filter_disabled_flag and sh_deblocking_params_present_flag are both equal to 1, the value of sh_deblocking_filter_disabled_flag is inferred to be equal to 0.
  Otherwise (pps_deblocking_filter_disabled_flag or sh_deblocking_params_present_flag is equal to 0), the value of sh_deblocking_filter_disabled_flag is inferred to be equal to ph_deblocking_filter_disabled_flag.

sh_luma_beta_offset_div2 and sh_luma_tc_offset_div2 specify the deblocking parameter offsets for β and tC (divided by 2) that are applied to the luma component for the current slice. The values of sh_luma_beta_offset_div2 and sh_luma_tc_offset_div2 shall both be in the range of −12 to 12, inclusive. When not present, the values of sh_luma_beta_offset_div2 and sh_luma_tc_offset_div2 are inferred to be equal to ph_luma_beta_offset_div2 and ph_luma_tc_offset_div2, respectively.

sh_cb_beta_offset_div2 and sh_cb_tc_offset_div2 specify the deblocking parameter offsets for β and tC (divided by 2) that are applied to the Cb component for the current slice. The values of sh_cb_beta_offset_div2 and sh_cb_tc_offset_div2 shall both be in the range of −12 to 12, inclusive.

When not present, the values of sh_cb_beta_offset_div2 and sh_cb_tc_offset_div2 are inferred as follows:
  If pps_chroma_tool_offsets_present_flag is equal to 1, the values of sh_cb_beta_offset_div2 and sh_cb_tc_offset_div2 are inferred to be equal to ph_cb_beta_offset_div2 and ph_cb_tc_offset_div2, respectively.
  Otherwise (pps_chroma_tool_offsets_present_flag is equal to 0), the values of sh_cb_beta_offset_div2 and sh_cb_tc_offset_div2 are inferred to be equal to sh_luma_beta_offset_div2 and sh_luma_tc_offset_div2, respectively.

sh_cr_beta_offset_div2 and sh_cr_tc_offset_div2 specify the deblocking parameter offsets for β and tC (divided by 2) that are applied to the Cr component for the current slice. The values of sh_cr_beta_offset_div2 and sh_cr_tc_offset_div2 shall both be in the range of −12 to 12, inclusive.

When not present, the values of sh_cr_beta_offset_div2 and sh_cr_tc_offset_div2 are inferred as follows:
  If pps_chroma_tool_offsets_present_flag is equal to 1, the values of sh_cr_beta_offset_div2 and sh_cr_tc_offset_div2 are inferred to be equal to ph_cr_beta_offset_div2 and ph_cr_tc_offset_div2, respectively.
  Otherwise (pps_chroma_tool_offsets_present_flag is equal to 0), the values of sh_cr_beta_offset_div2 and sh_cr_tc_offset_div2 are inferred to be equal to sh_luma_beta_offset_div2 and sh_luma_tc_offset_div2, respectively.

sh_dep_quant_used_flag equal to 0 specifies that dependent quantization is not used for the current slice. sh_dep_quant_used_flag equal to 1 specifies that dependent quantization is used for the current slice. When sh_dep_quant_used_flag is not present, it is inferred to be equal to 0.

sh_sign_data_hiding_used_flag equal to 0 specifies that sign bit hiding is not used for the current slice. sh_sign_data_hiding_used_flag equal to 1 specifies that sign bit hiding is used for the current slice. When sh_sign_data_hiding_used_flag is not present, it is inferred to be equal to 0.

sh_ts_residual_coding_disabled_flag equal to 1 specifies that the residual_coding( ) syntax structure is used to parse the residual samples of a transform skip block for the current slice. sh_ts_residual_coding_disabled_flag equal to 0 specifies that the residual_ts_coding( ) syntax structure is used to parse the residual samples of a transform skip block for the current slice. When sh_ts_residual_coding_disabled_flag is not present, it is inferred to be equal to 0.

sh_slice_header_extension_length specifies the length of the slice header extension data in bytes, not including the bits used for signalling sh_slice_header_extension_length itself. When not present, the value of sh_slice_header_extension_length is inferred to be equal to 0. Although sh_slice_header_extension_length is not present in bitstreams conforming to this version of this Specification, some use of sh_slice_header_extension_length could be specified in some future version of this Specification, and decoders conforming to this version of this Specification shall allow sh_slice_header_extension_length to be present and in the range of 0 to 256, inclusive.

sh_slice_header_extension_data_byte[i] could have any value. Its presence and value do not affect the decoding process specified in this version of this Specification. Decoders conforming to this version of this Specification shall ignore the values of all the sh_slice_header_extension_data_byte[i] syntax elements. Its value does not affect the decoding process specified in this version of specification.

The variable NumEntryPoints, which specifies the number of entry points in the current slice, is derived as follows:

```
NumEntryPoints = 0
if( sps_entry_point_offsets_present_flag )
    for( i = 1; i < NumCtusInCurrSlice; i++ ) {
        ctbAddrX = CtbAddrInCurrSlice[ i ] % PicWidthInCtbsY
        ctbAddrY = CtbAddrInCurrSlice[ i ] / PicWidthInCtbsY
        prevCtbAddrX = CtbAddrInCurrSlice[ i − 1 ] % PicWidthInCtbsY
        prevCtbAddrY = CtbAddrInCurrSlice[ i − 1 ] / PicWidthInCtbsY
        if( CtbToTileRowBd[ ctbAddrY ] !=
        CtbToTileRowBd[ prevCtbAddrY ] | |
            CtbToTileColBd[ ctbAddrX ] !=
            CtbToTileColBd[ prevCtbAddrX ] | |
            ( ctbAddrY != prevCtbAddrY &&
            sps_entropy_coding_sync_enabled_flag ) )
            NumEntryPoints++
    }
``` sh_entry_offset_len_minus1 plus 1 specifies the length, in bits, of the sh_entry_point_offset_minus1[i] syntax elements. The value of sh_entry_offset_len_minus1 shall be in the range of 0 to 31, inclusive.

sh_entry_point_offset_minus1[i] plus 1 specifies the i-th entry point offset in bytes, and is represented by sh_entry_offset_len_minus1 plus 1 bits. The slice data that follow the slice header consists of NumEntryPoints+1 subsets, with subset index values ranging from 0 to NumEntryPoints, inclusive. The first byte of the slice data is considered byte 0. When present, emulation prevention bytes that appear in the slice data portion of the coded slice NAL unit are counted as part of the slice data for purposes of subset identification. Subset 0 consists of bytes 0 to sh_entry_point_offset_minus1[0], inclusive, of the coded slice data, subset k, with k in the range of 1 to NumEntryPoints−1, inclusive, consists of bytes firstByte[k] to lastByte[k], inclusive, of the coded slice data with firstByte[k] and lastByte[k] derived as follows:

$$firstByte[k] = \sum_{n=1}^{k} (sh\_entry\_point\_offset\_minus1[n-1]+1)$$

$$lastByte[k] = firstByte[k] + sh\_entry\_point\_offset\_minus1[k]$$

The last subset (with subset index equal to NumEntryPoints) consists of the remaining bytes of the coded slice data.

When sps_entropy_coding_sync_enabled_flag is equal to 0 and the slice contains one or more complete tiles, each subset shall consist of all coded bits of all CTUs in the slice that are within the same tile, and the number of subsets (i.e., the value of NumEntryPoints+1) shall be equal to the number of tiles in the slice. When sps_entropy_coding_sync_enabled_flag is equal to 0 and the slice contains a subset of CTU rows from a single tile, the NumEntryPoints shall be 0, and the number of subsets shall be 1. The subset shall consist of all coded bits of all CTUs in the slice.

When sps_entropy_coding_sync_enabled_flag is equal to 1, each subset k with k in the range of 0 to NumEntryPoints, inclusive, shall consist of all coded bits of all CTUs in a CTU row within a tile, and the number of subsets (i.e., the value of NumEntryPoints+1) shall be equal to the total number of tile-specific CTU rows in the slice.

As provided above, a slice header may include a number of entry points, where an entry point is essentially a pointer to a subset. A subset includes a collection of CTUs. A collection of CTUs may form a complete tile or an integer number of consecutive complete CTU rows within a tile of a picture that may be independently entropy encoded. Thus, entry points enable parallelism in entropy coding of a slice. In particular, JVET-T2001 provides that the initialization process for entropy coding is invoked when starting the parsing of the CTU syntax and one or more of the following conditions are true:

The CTU is the first CTU in a slice.

The CTU is the first CTU in a tile.

The value of sps_entropy_coding_sync_enabled_flag is equal to 1 and the CTU is the first CTU in a CTU row of a tile.

JVET-T2001 further provides the storage process for context variables is applied as follows:

When ending the parsing of the CTU syntax, sps_entropy_coding_sync_enabled_flag is equal to 1, and CtbAddrX is equal to CtbToTileColBd[CtbAddrX], the storage process for context variables is invoked with TableStateIdx0Wpp and TableStateIdx1Wpp as outputs.

When sps_entropy_coding_sync_enabled_flag is equal to 1 and (xNbY>>Ctb Log 2SizeY) is greater than or equal to (xCurr>>Ctb Log 2SizeY)+1, the initialization process for context variables is invoked.

Thus, JVET-T2001 provides where a slice, a tile, or a CTU in a tile row may be independently entropy coded, i.e., initialization occurs a first syntax element in a slice or tile, or a first CTU in a tile row.

As provided above, the number of entry points in a slice is specified according to syntax elements provided in a sequence parameter set (SPS) syntax structure. Table 8 illustrates the sequence parameter set (SPS) syntax structure provided in JVET-T2001.

TABLE 8

| | Descriptor |
|---|---|
| seq_parameter_set_rbsp( ) { | |
|   sps_seq_parameter_set_id | u(4) |
|   sps_video_parameter_set_id | u(4) |
|   sps_max_sublayers_minus1 | u(3) |
|   sps_chroma_format_idc | u(2) |
|   sps_log2_ctu_size_minus5 | u(2) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   sps_gdr_enabled_flag | u(1) |
|   sps_ref_pic_resampling_enabled_flag | u(1) |
|   if( sps_ref_pic_resampling_enabled_flag ) | |
|     sps_res_change_in_clvs_allowed_flag | u(1) |
|   sps_pic_width_max_in_luma_samples | ue(v) |
|   sps_pic_height_max_in_luma_samples | ue(v) |
|   sps_conformance_window_flag | u(1) |
|   if( sps_conformance_window_flag ) { | |
|     sps_conf_win_left_offset | ue(v) |
|     sps_conf_win_right_offset | ue(v) |
|     sps_conf_win_top_offset | ue(v) |
|     sps_conf_win_bottom_offset | ue(v) |
|   } | |
|   sps_subpic_info_present_flag | u(1) |
|   if( sps_subpic_info_present_flag ) { | |
|     sps_num_subpics_minus1 | ue(v) |
|     if( sps_num_subpics_minus1 > 0 ) { | |
|       sps_independent_subpics_flag | u(1) |
|       sps_subpic_same_size_flag | u(1) |
|     } | |
|     for( i = 0; sps_num_subpics_minus1 > 0 && i <= sps_num_subpics_minus1; i++ ) | |
| { | |
|     if( !sps_subpic_same_size_flag || i == 0 ){ | |
|       if( i > 0 && sps_pic_width_max_in_luma_samples > CtbSizeY ) | |
|         sps_subpic_ctu_top_left_x[ i ] | u(v) |
|       if( i > 0 && sps_pic_height_max_in_luma_samples > CtbSizeY ) | |
|         sps_subpic_ctu_top_left_y[ i ] | u(v) |
|       if( i < sps_num_subpics_minus1 && | |
|         sps_pic_width_max_in_luma_samples > CtbSizeY ) | |
|         sps_subpic_width_minus1[ i ] | u(v) |
|       if( i < sps_num_subpics_minus1 && | |
|         sps_pic_height_max_in_luma_samples > CtbSizeY ) | |
|         sps_subpic_height_minus1[ i ] | u(v) |
|     } | |
|     if( !sps_independent_subpics_flag) { | |
|       sps_subpic_treated_as_pic_flag[ i ] | u(1) |
|       sps_loop_filter_across_subpic_enabled_flag[ i ] | u(1) |
|     } | |
|   } | |
|   sps_subpic_id_len_minus1 | ue(v) |
|   sps_subpic_id_mapping_explicitly_signalled_flag | u(1) |
|   if( sps_subpic_id_mapping_explicitly_signalled_flag ) { | |
|     sps_subpic_id_mapping_present_flag | u(1) |
|     if( sps_subpic_id_mapping_present_flag ) | |
|       for( i = 0; i <= sps_num_subpics_minus1; i++ ) | |
|         sps_subpic_id[ i ] | u(v) |
|   } | |
| } | |
|   sps_bitdepth_minus8 | ue(v) |
|   sps_entropy_coding_sync_enabled_flag | u(1) |
|   sps_entry_point_offsets_present_flag | u(1) |
|   sps_log2_max_pic_order_cnt_lsb_minus4 | u(4) |
|   sps_poc_msb_cycle_flag | u(1) |
|   if( sps_poc_msb_cycle_flag ) | |
|     sps_poc_msb_cycle_len_minus1 | ue(v) |
|   sps_num_extra_ph_bytes | u(2) |
|   for( i = 0; i < (sps_num_extra_ph_bytes * 8 ); i++) | |
|     sps_extra_ph_bit_present_flag[ i ] | u(1) |
|   sps_num_extra_sh_bytes | u(2) |
|   for( i = 0; i < (sps_num_extra_sh_bytes * 8 ); i++) | |
|     sps_extra_sh_bit_present_flag[ i ] | u(1) |
|   if( sps_ptl_dpb_hrd_params_present_flag ) { | |
|     if( sps_max_sublayers_minus1 > 0 ) | |
|       sps_sublayer_dpb_params_flag | u(1) |
|     dpb_parameters( sps_max_sublayers_minus1, sps_sublayer_dpb_params_flag ) | |
|   } | |

TABLE 8-continued

| | Descriptor |
|---|---|
| sps_log2_min_luma_coding_block_size_minus2 | ue(v) |
| sps_partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| if( sps_chroma_format_idc != 0 ) | |
|   sps_qtbtt_dual_tree_intra_flag | u(1) |
| if( sps_qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| if( CtbSizeY > 32 ) | |
|   sps_max_luma_transform_size_64_flag | u(1) |
| sps_transform_skip_enabled_flag | u(1) |
| if( sps_transform_skip_enabled_flag ) { | |
|   sps_log2_transform_skip_max_size_minus2 | ue(v) |
|   sps_bdpcm_enabled_flag | u(1) |
| } | |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| sps_lfnst_enabled_flag | u(1) |
| if( sps_chroma_format_idc != 0 ) { | |
|   sps_joint_cbcr_enabled_flag | u(1) |
|   sps_same_qp_table_for_chroma_flag | u(1) |
|   numQpTables = sps_same_qp_table_for_chroma_flag ? 1 : | |
|     ( sps_joint_cbcr_enabled_flag ? 3 : 2 ) | |
|   for( i = 0; i < numQpTables; i++ ) { | |
|     sps_qp_table_start_minus26[ i ] | se(v) |
|     sps_num_points_in_qp_table_minus1[ i ] | ue(v) |
|     for( j = 0; j <= sps_num_points_in_qp_table_minus1[ i ]; j++ ) { | |
|       sps_delta_qp_in_val_minus1[ i ][ j ] | ue(v) |
|       sps_delta_qp_diff_val[ i ][ j ] | ue(v) |
|     } | |
|   } | |
| } | |
| sps_sao_enabled_flag | u(1) |
| sps_alf_enabled_flag | u(1) |
| if( sps_alf_enabled_flag && sps_chroma_format_idc != 0 ) | |
|   sps_ccalf_enabled_flag | u(1) |
| sps_lmcs_enabled_flag | u(1) |
| sps_weighted_pred_flag | u(1) |
| sps_weighted_bipred_flag | u(1) |
| sps_long_term_ref_pics_flag | u(1) |
| if( sps_video_parameter_set_id > 0 ) | |
|   sps_inter_layer_prediction_enabled_flag | u(1) |
| sps_idr_rpl_present_flag | u(1) |
| sps_rpl1_same_as_rpl0_flag | u(1) |
| for( i = 0; i < ( sps_rpl1_same_as_rpl0_flag ? 1 : 2 ); i++ ) { | |
|   sps_num_ref_pic_lists[ i ] | ue(v) |
|   for( j = 0; j < sps_num_ref_pic_lists[ i ]; j++) | |
|     ref_pic_list_struct( i, j ) | |
| } | |
| sps_ref_wraparound_enabled_flag | u(1) |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| if( sps_bdof_enabled_flag ) | |
|   sps_bdof_control_present_in_ph_flag | u(1) |
| sps_smvd_enabled_flag | u(1) |
| sps_dmvr_enabled_flag | u(1) |

TABLE 8-continued

| | Descriptor |
|---|---|
| if( sps_dmvr_enabled_flag) | |
|   sps_dmvr_control_present_in_ph_flag | u(1) |
| sps_mmvd_enabled_flag | u(1) |
| if( sps_mmvd_enabled_flag ) | |
|   sps_mmvd_fullpel_only_enabled_flag | u(1) |
| sps_six_minus_max_num_merge_cand | ue(v) |
| sps_sbt_enabled_flag | u(1) |
| sps_affine_enabled_flag | u(1) |
| if( sps_affine_enabled_flag ) { | |
|   sps_five_minus_max_num_subblock_merge_cand | ue(v) |
|   sps_6param_affine_enabled_flag | u(1) |
|   if( sps_amvr_enabled_flag ) | |
|     sps_affine_amvr_enabled_flag | u(1) |
|   sps_affine_prof_enabled_flag | u(1) |
|   if( sps_affine_prof_enabled_flag ) | |
|     sps_prof_control_present_in_ph_flag | u(1) |
| } | |
| sps_bcw_enabled_flag | u(1) |
| sps_ciip_enabled_flag | u(1) |
| if( MaxNumMergeCand >= 2 ) { | |
|   sps_gpm_enabled_flag | u(1) |
|   if( sps_gpm_enabled_flag && MaxNumMergeCand >= 3 ) | |
|     sps_max_num_merge_cand_minus_max_num_gpm_cand | ue(v) |
| } | |
| sps_log2_parallel_merge_level_minus2 | ue(v) |
| sps_isp_enabled_flag | u(1) |
| sps_mrl_enabled_flag | u(1) |
| sps_mip_enabled_flag | u(1) |
| if( sps_chroma_format_idc != 0 ) | |
|   sps_cclm_enabled_flag | u(1) |
| if( sps_chroma_format_idc == 1 ) { | |
|   sps_chroma_horizontal_collocated_flag | u(1) |
|   sps_chroma_vertical_collocated_flag | u(1) |
| } | |
| sps_palette_enabled_flag | u(1) |
| if( sps_chroma_format_idc == 3 && !sps_max_luma_transform_size_64_flag ) | |
|   sps_act_enabled_flag | u(1) |
| if( sps_transform_skip_enabled_flag \|\| sps_palette_enabled_flag ) | |
|   sps_min_qp_prime_ts | ue(v) |
| sps_ibc_enabled_flag | u(1) |
| if( sps_ibc_enabled_flag ) | |
|   sps_six_minus_max_num_ibc_merge_cand | ue(v) |
| sps_ladf_enabled_flag | u(1) |
| if( sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |
| sps_explicit_scaling_list_enabled_flag | u(1) |
| if( sps_lfnst_enabled_flag && sps_explicit_scaling_list_enabled_flag ) | |
|   sps_scaling_matrix_for_lfnst_disabled_flag | u(1) |
| if( sps_act_enabled_flag && sps_explicit_scaling_list_enabled_flag ) | |
|   sps_scaling_matrix_for_alternative_colour_space_disabled_flag | u(1) |
| if( sps_scaling_matrix_for_alternative_colour_space_disabled_flag ) | |
|   sps_scaling_matrix_designated_colour_space_flag | u(1) |
| sps_dep_quant_enabled_flag | u(1) |
| sps_sign_data_hiding_enabled_flag | u(1) |
| sps_virtual_boundaries_enabled_flag | u(1) |
| if( sps_virtual_boundaries_enabled_flag ) { | |
|   sps_virtual_boundaries_present_flag | u(1) |
|   if( sps_virtual_boundaries_present_flag ) { | |
|     sps_num_ver_virtual_boundaries | ue(v) |
|     for( i = 0; i < sps_num_ver_virtual_boundaries; i++ ) | |
|       sps_virtual_boundary_pos_x_minus1[ i ] | ue(v) |
|     sps_num_hor_virtual_boundaries | ue(v) |
|     for( i = 0; i < sps_num_hor_virtual_boundaries; i++ ) | |
|       sps_virtual_boundary_pos_y_minus1[ i ] | ue(v) |
|   } | |
| } | |

TABLE 8-continued

| | Descriptor |
|---|---|
| if( sps_ptl_dpb_hrd_params_present_flag ) { | |
|   sps_timing_hrd_params_present_flag | u(1) |
|   if( sps_timing_hrd_params_present_flag ) { | |
|     general_timing_hrd_parameters( ) | |
|     if( sps_max_sublayers_minus1 > 0 ) | |
|       sps_sublayer_cpb_params_present_flag | u(1) |
|     firstSubLayer = sps_sublayer_cpb_params_present_flag ? 0 : | |
|       sps_max_sublayers_minus1 | |
|     ols_timing_hrd_parameters( firstSubLayer, sps_max_sublayers_minus1 ) | |
|   } | |
| } | |
| sps_field_seq_flag | u(1) |
| sps_vui_parameters_present_flag | u(1) |
| if( sps_vui_parameters_present_flag ) { | |
|   sps_vui_payload_size_minus1 | ue(v) |
|   while( !byte_aligned( ) ) | |
|     sps_vui_alignment_zero_bit | f(1) |
|   vui_payload( sps_vui_payload_size_minus1 + 1 ) | |
| } | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

With respect to Table 8, JVET-T2001 provides the following semantics:

An SPS RBSP shall be available to the decoding process prior to it being referenced, included in at least one AU with TemporalId equal to 0 or provided through external means.

All SPS NAL units with a particular value of sps_seq_parameter_set_id in a CVS shall have the same content.

sps_seq_parmeter_set_id provides an identifier for the SPS for reference by other syntax elements.

SPS NAL units, regardless of the nuh_layer_id values, share the same value space of sps_seq_parameter_set_id.

Let spsLayerId be the value of the nuh_layer_id of a particular SPS NAL unit, and vclLayerId be the value of the nuh_layer_id of a particular VCL NAL unit. The particular VCL NAL unit shall not refer to the particular SPS NAL unit unless spsLayerId is less than or equal to vclLayerId and all OLSs specified by the VPS that contain the layer with nuh_layer_id equal to vclLayerId also contain the layer with nuh_layer_id equal to spsLayerId.

NOTE—In a CVS that contains only one layer, the nuh_layer_id of referenced SPSs is equal to the nuh_layer_id of the VCL NAL units.

sps_video_parameter_set_id, when greater than 0, specifies the value of vps_video_parameter_set_id for the VPS referred to by the SPS.

When sps_video_parameter_set_id is equal to 0, the following applies:

The SPS does not refer to a VPS, and no VPS is referred to when decoding each CLVS referring to the SPS.

The value of vps_max_layers_minus1 is inferred to be equal to 0.

The CVS shall contain only one layer (i.e., all VCL NAL unit in the CVS shall have the same value of nuh_layer_id).

The value of GeneralLayerIdx[nuh_layer_id] is set equal to 0.

The value of vps_independent_layer_flag[GeneralLayerIdx[nuh_layer_id]] is inferred to be equal to 1.

The value of TotalNumOlss is set equal to 1, the value of NumLayersInOls[0] is set equal to 1, and value of vps_layer_id[0] is inferred to be equal to the value of nuh_layer_id of all the VCL NAL units, and the value of LayerIdInOls[0][0] is set equal to vps_layer_id[0].

NOTE—When sps_video_parameter_set_id is equal to 0, the phrase "layers specified by the VPS" used in the specification refers to tie only present layer that has nuh_layer_id equal to vps_layer_id[0], and the phrase "OLSs specified by the VPS" used in the specification refers to the only present OLS that has OLS index equal to 0 and LayerIdInOls[0][0] equal to vps_layer_id[0].

When vps_independent_layer_flag[GeneralLayerIdx[nuh_layer_id]] is equal to 1, the SPS referred to by a CLVS with a particular nuh_layer_id value nuhLayerId shall have nuh_layer_id equal to nuhLayerId.

The value of sps_video_parameter_set_id shall be the same in all SPSs that are referred to by CLVSs in a CVS.

sps_max_sublayers_minus1 plus 1 specifies the maximum number of temporal sublayers that could be present in each CLVS referring to the SPS.

If sps_video_parameter_set_id is greater than 0, the value of sps_max_sublayers_minus1 shall be in the range of 0 to vps_max_sublayers_minus1, inclusive.

Otherwise (sps_video_parameter_set_id is equal to 0), the following applies:

The value of sps_max_sublayers_minus1 shall be in the range of 0 to 6, inclusive.

The value of vps_max_sublayers_minus1 is inferred to be equal to sps_max_sublayers_minus1.

The value of NumSubLayersInLayerInOLS[0][0] is inferred to be equal to sps_max_sublayers_minus1+1.

The value of vps_ols_ptl_idx[0] is inferred to be equal to 0, and the value of vps_ptl_max_tid[vps_ols_ptl_idx[0]], i.e., vps_ptl_max_tid[0], is inferred to be equal to sps_max_sublayers_minus1.

sps_chroma_format_idc specifies the chroma sampling relative to the luma sampling as specified in subclause 6.2.

When sps_video_parameter_set_id is greater than 0 and the SPS is referenced by a layer that is included in the i-th multi-layer OLS specified by the VPS for any i in the range of 0 to NumMultiLayerOlss−1, inclusive, it is a requirement of bitstream conformance that the value of sps_chroma_format_idc shall be less than or equal to the value of vps_ols_dpb_chroma_format[i].

sps_log 2_ctu_size_minus5 plus 5 specifies the luma coding tree block size of each CTU. The value of sps_log 2_ctu_size_minus5 shall be in the range of 0 to 2, inclusive. The value 3 for sps_log 2_ctu_size_minus5 is reserved for future use by ITU-T|ISO/IEC. Decoders conforming to this version of this Specification shall ignore the CLVSs with sps_log 2_ctu_size_minus5 equal to 3. The variables Ctb Log 2SizeY and CtbSizeY are derived as follows:

$$CtbLog2SizeY = sps\_log2\_ctu\_size\_minus5 + 5$$

$$CtbSizeY = 1 << CtbLog2SizeY$$

sps_ptl_dpb_hrd_params_present_flag equal to 1 specifies that a profile_tier_level( ) syntax structure and a dpb_parameters( ) syntax structure are present in the SPS, and a general_timing_hrd_parameters( ) syntax structure and an ols_timing_hrd_parameters( ) syntax structure could also be present in the SPS. sps_ptl_dpb_hrd_params_present_flag equal to 0 specifies that none of these four syntax structures is present in the SPS.

When sps_video_parameter_set_id is greater than 0 and there is an OLS that contains only one layer with nuh_layer_id equal to the nuh_layer_id of the SPS, or when sps_video_parameter_set_id is equal to 0, the value of sps_ptl_dpb_hrd_params_present_flag shall be equal to 1.

sps_gdr_enabled_flag equal to 1 specifies that GDR pictures are enabled and could be present in the CLVS. sps_gdr_enabled_flag equal to 0 specifies that GDR pictures are disabled and not present in the CLVS.

sps_ref_pic_resampling_enabled_flag equal to 1 specifies that reference picture resampling is enabled and a current picture referring to the SPS might have slices that refer to a reference picture in an active entry of an RPL that has one or more of the following seven parameters different than that of the current picture: 1) pps_pic_width_in_luma_samples, 2) pps_pic_height_in_luma_samples, 3) pps_scaling_win_left_offset, 4) pps_scaling_win_right_offset, 5) pps_scaling_win_top_offset, 6) pps_scaling_win_bottom_offset, and 7) sps_num_subpics_minus1. sps_ref_pic_resampling_enabled_flag equal to 0 specifies that reference picture resampling is disabled and no current picture referring to the SPS has slices that refer to a reference picture in an active entry of an RPL that has one or more of these seven parameters different than that of the current picture.

NOTE—When sps_ref_pic_resampling_enabled_flag is equal to 1, for a current picture the reference picture that has one or more of these seven parameters different than that of the current picture could either belong to the same layer or a different layer than the layer containing the current picture.

sps_res_change_in_clvs_allowed_flag equal to 1 specifies that the picture spatial resolution might change within a CLVS referring to the SPS. sps_res_change_in_clvs_allowed_flag equal to 0 specifies that the picture spatial resolution does not change within any CLVS referring to the SPS. When not present, the value of sps_res_change_in_clvs_allowed_flag is inferred to be equal to 0.

sps_pic_width_max_in_luma_samples specifies the maximum width, in units of luma samples, of each decoded picture referring to the SPS. sps_pic_width_max_in_luma_samples shall not be equal to 0 and shall be an integer multiple of Max(8, MinCbSizeY).

When sps_video_parameter_set_id is greater than 0 and the SPS is referenced by a layer that is included in the i-th multi-layer OLS specified by the VPS for any i in the range of 0 to NumMultiLayerOlss−1, inclusive, it is a requirement of bitstream conformance that the value of sps_pic_width_max_in_luma_samples shall be less than or equal to the value of vps_ols_dpb_pic_width[i].

sps_pic_height_max_in_luma_samples specifics the maximum height, in units of luma samples, of each decoded picture referring to the SPS. sps_pic_height_max_in_luma_samples shall not be equal to 0 and shall be an integer multiple of Max(8, MinCbSizeY).

When sps_video_parameter_set_id is greater than 0 and the SPS is referenced by a layer that is included in the i-th multi-layer OLS specified by the VPS for any i in the range of 0 to NumMultiLayerOlss−1, inclusive, it is a requirement of bitstream conformance that the value of sps_pic_height_max_in_luma_samples shall be less than or equal to the value of vps_ols_dpb_pic_height[i].

sps_conformance_window_flag equal to 1 indicates that the conformance cropping window offset parameters follow next in the SPS. sps_conformance_window_flag equal to 0 indicates that the conformance cropping window offset parameters are not present in the SPS.

sps_conf_win_left_offset, sps_conf_win_right_offset, sps_conf_win_top_offset, and sps_conf_win_bottom_offset specify the cropping window that is applied to pictures with pps_pic_width_in_luma_samples equal to sps_pic_width_max_in_luma_samples and pps_pic_height_in_luma_samples equal to sps_pic_height_max_in_luma_samples. When sps_conformance_window_flag is equal to 0, the values of sps_conf_win_left_offset, sps_conf_win_right_offset, sps_conf_win_top_offset, and sps_conf_win_bottom_offset are inferred to be equal to 0.

The conformance cropping window contains the luma samples with horizontal picture coordinates from SubWidthC*sps_conf_win_left_offset to sps_pic_width_max_in_luma_samples−(SubWidthC*sps_conf_win_right_offset+1) and vertical picture coordinates from SubHeightC*sps_conf_win_top_offset to sps_pic_height_max_in_luma_samples−(SubHeightC*sps_conf_win_bottom_offset+1), inclusive.

The value of SubWidthC*(sps_conf_win_left_offset+sps_conf_win_right_offset) shall be less than sps_pic_width_max_in_luma_samples, and the value of SubHeightC*(sps_conf_win_top_offset+sps_conf_win_bottom_offset) shall be less than sps_pic_height_max_in_luma_samples.

When sps_chroma_format_idc is not equal to 0, the corresponding specified samples of the two chroma arrays are the samples having picture coordinates (x/SubWidthC, y/SubHeightC), where (x, y) are the picture coordinates of the specified luma samples.

NOTE—The conformance cropping window offset parameters are only applied at the output. All internal decoding processes are applied to the uncropped picture size.

sps_subpic_info_present_flag equal to 1 specifies that subpicture information is present for the CLVS and there might be one or more than one subpicture in each picture of the CLVS. sps_subpic_info_present_flag equal to 0 specifies that subpicture information is not present for the CLVS and there is only one subpicture in each picture of the CLVS.

When sps_res_change_in_clvs_allowed_flag is equal to 1, the value of sps_subpic_info_present_flag shall be equal to 0.

NOTE—When a bitstream is the result of a subpicture sub-bitstream extraction process and contains only a subset of the subpictures of the input bitstream to the subpicture sub-bitstream extraction process, it might be required to set the value of sps_subpic_info_present_flag equal to 1 in the RBSP of the SPSs.

sps_num_subpics_minus1 plus 1 specifies the number of subpictures in each picture in the CLVS. The value of sps_num_subpics_minus1 shall be in the range of 0 to MaxSlicesPerAu−1, inclusive, where MaxSlicesPerAu is specified. When not present, the value of sps_num_subpics_minus1 is inferred to be equal to 0.

sps_independent_subpics_flag equal to 1 specifies that all subpicture boundaries in the CLVS are treated as picture boundaries and there is no loop filtering across the subpicture boundaries. sps_independent_subpics_flag equal to 0 does not impose such a constraint. When not present, the value of sps_independent_subpics_flag is inferred to be equal to 1.

sps_subpic_same_size_flag equal to 1 specifies that all subpictures in the CLVS have the same width specified by sps_subpic_width_minus1[0] and the same height specified by sps_subpic_height_minus1[0]. sps_subpic_same_size_flag equal to 0 does not impose such a constraint. When not present, the value of sps_subpic_same_size_flag is inferred to be equal to 0.

Let the variable tmpWidthVal be set equal to (sps_pic_width_max_in_luma_samples+CtbSizeY−1)/CtbSizeY, and the variable tmpHeightVal be set equal to (sps_pic_height_max_in_luma_samples+CtbSizeY−1)/CtbSizeY.

sps_subpic_ctu_top_left_x[i] specifies horizontal position of top-left CTU of i-th subpicture in unit of CtbSizeY. The length of the syntax element is Ceil(Log 2(tmpWidthVal)) bits.

When not present, the value of sps_subpic_ctu_top_left_x[i] is inferred as follows:
  If sps_subpic_same_size_flag is equal to 0 or i is equal to 0, the value of sps_subpic_ctu_top_left_x[i] is inferred to be equal to 0.
  Otherwise, the value of sps_subpic_ctu_top_left_x[i] is inferred to be equal to (i % numSubpicCols)*(sps_subpic_width_minus1[0]+1).

When sps_subpic_same_size_flag is equal to 1, the variable numSubpicCols, specifying the number of subpicture columns in each picture in the CLVS, is derived as follows:

*numSubpicCols = tmpWidthVal/(sps_subpic_width_minus1[0] + 1)*

When sps_subpic_same_size_flag is equal to 1, the value of numSubpicCols*tmpHeightVal/(sps_subpic_height_minus1[0]+1)−1 shall be equal to sps_num_subpics_minus1.

sps_subpic_ctu_top_left_y[i] specifies vertical position of top-left CTU of i-th subpicture in unit of CtbSizeY. The length of the syntax element is Ceil(Log 2(tmpHeightVal)) bits.

When not present, the value of sps_subpic_ctu_top_left_y[i] is inferred as follows:
  If sps_subpic_same_size_flag is equal to 0 or i is equal to 0, the value of sps_subpic_ctu_top_left_y[i] is inferred to be equal to 0.
  Otherwise, the value of sps_subpic_ctu_top_left_y[i] is inferred to be equal to (i/numSubpicCols)*(sps_subpic_height_minus1[0]+1).

sps_subpic_width_minus1[i] plus 1 specifies the width of the i-th subpicture in units of CtbSizeY. The length of the syntax element is Ceil(Log 2(tmpWidthVal)) bits.

When not present, the value of sps_subpic_width_minus1[i] is inferred as follows:
  If sps_subpic_same_size_flag is equal to 0 or i is equal to 0, the value of sps_subpic_width_minus1[i] is inferred to be equal to tmpWidthVal−sps_subpic_ctu_top_left_x[i]−1.
  Otherwise, the value of sps_subpic_width_minus1[i] is inferred to be equal to sps_subpic_width_minus1[0].

When sps_subpic_same_size_flag is equal to 1, the value of tmpWidthVal % (sps_subpic_width_minus1[0]+1) shall be equal to 0.

sps_subpic_height_minus1[i] plus 1 specifies the height of the i-th subpicture in units of CtbSizeY. The length of the syntax element is Ceil(Log 2(tmpHeightVal)) bits.

When not present, the value of sps_subpic_height_minus1[i] is inferred as follows:
  If sps_subpic_same_size_flag is equal to 0 or i is equal to 0, the value of sps_subpic_height_minus1[i] is inferred to be equal to tmpHeightVal−sps_subpic_ctu_top_left_y[i]−1.
  Otherwise, the value of sps_subpic_height_minus1[i] is inferred to be equal to sps_subpic_height_minus1[0].

When sps_subpic_same_size_flag is equal to 1, the value of tmpHeightVal % (sps_subpic_height_minus1[0]+1) shall be equal to 0.

It is a requirement of bitstream conformance that the shapes of the subpictures shall be such that each subpicture, when decoded, shall have its entire left boundary and entire top boundary consisting of picture boundaries or consisting of boundaries of previously decoded subpictures.

For each subpicture with subpicture index i in the range of 0 to sps_num_subpics_minus1, inclusive, it is a requirement of bitstream conformance that all of the following conditions are true:
  The value of (sps_subpic_ctu_top_left_x[i]*CtbSizeY) shall be less than (sps_pic_width_max_in_luma_samples−sps_conf_win_right_offset*SubWidthC).
  The value of ((sps_subpic_ctu_top_left_x[i]+sps_subpic_width_minus1[i]+1)*CtbSizeY) shall be greater than (sps_conf_win_left_offset*SubWidthC).
  The value of (sps_subpic_ctu_top_left[i]*CtbSizeY) shall be less than (sps_pic_height_max_in_luma_samples−sps_conf_win_bottom_offset*SubHeightC).
  The value of ((sps_subpic_ctu_top_left_y[i]+sps_subpic_height_minus1[i]+1)*CtbSizeY) shall be greater than (sps_conf_win_top_offset*SubHeightC).

sps_subpic_treated_as_pic_flag[i] equal to 1 specifies that the i-th subpicture of each coded picture in the CLVS is treated as a picture in the decoding process excluding in-loop filtering operations. sps_subpic_treated_as_pic_flag[i] equal to 0 specifies that the i-th subpicture of each coded picture in the CLVS is not treated as a picture in the decoding process excluding in-loop filtering operations. When not present, the value of sps_subpic_treated_as_pic_flag[i] is inferred to be equal to 1.

sps_loop_filter_across_subpic_enabled_flag[i] equal to 1 specifies that in-loop filtering operations across subpicture boundaries is enabled and might be performed across the boundaries of the i-th subpicture in each coded picture in the CLVS. sps_loop_filter_across_subpic_enabled_flag[i] equal to 0 specifies that in-loop filtering operations across subpicture boundaries is disabled and are not performed across the boundaries of the i-th subpicture in each coded picture in the CLVS. When not present, the value of sps_loop_filter_across_subpic_enabled_pic_flag[i] is inferred to be equal to 0.

sps_subpic_id_len_minus1 plus 1 specifies the number of bits used to represent the syntax element sps_subpic_id[i], the syntax elements pps_subpic_id[i], when present, and the syntax element sh_subpic_id, when present. The value of sps_subpic_id_len_minus1 shall be in the range of 0 to 15, inclusive. The value of 1<<(sps_subpic_id_len_minus1+1) shall be greater than or equal to sps_num_subpics_minus1+1.

sps_subpic_id_mapping_explicitly_signalled_flag equal to 1 specifies that the subpicture ID mapping is explicitly signalled, either in the SPS or in the PPSs referred to by coded pictures of the CLVS. sps_subpic_id_mapping_explicitly_signalled_flag equal to 0 specifies that the subpicture ID mapping is not explicitly signalled for the CLVS. When not present, the value of sps_subpic_id_mapping_explicitly_signalled_flag is inferred to be equal to 0.

sps_subpic_id_mapping_present_flag equal to 1 specifies that the subpicture ID mapping is signalled in the SPS when sps_subpic_id_mapping_explicitly_signalled_flag is equal to 1. sps_subpic_id_mapping_present_flag equal to 0 specifies that subpicture ID mapping is signalled in the PPSs referred to by coded pictures of the CLVS when sps_subpic_id_mapping_explicitly_signalled_flag is equal to 1.

sps_subpic_id[i] specifies the subpicture ID of the i-th subpicture. The length of the sps_subpic_id[i] syntax element is sps_subpic_id_len_minus1+1 bits.

sps_bitdepth_minus8 specifies the bit depth of the samples of the luma and chroma arrays, BitDepth, and the value of the luma and chroma quantization parameter range offset, QpBdOffset, as follows:

$$ButDepth = 8 + sps\_bitdepth\_minus8$$

$$QpBdOffset = 6 * sps\_bitdepth\_minus8$$

sps_bitdepth_minus8 shall be in the range of 0 to 2, inclusive.

When sps_video_parameter_set_id is greater than 0 and the SPS is referenced by a layer that is included in the i-th multi-layer OLS specified by the VPS for any i in the range of 0 to NumMultiLayerOlss−1, inclusive, it is a requirement of bitstream conformance that the value of sps_bitdepth_minus8 shall be less than or equal to the value of vps_ols_dpb_bitdepth_minus8[i].

sps_entropy_coding_sync_enabled_flag equal to 1 specifies that a specific synchronization process for context variables is invoked before decoding the CTU that includes the first CTB of a row of CTBs in each tile in each picture referring to the SPS, and a specific storage process for context variables is invoked after decoding the CTU that includes the first CTB of a row of CTBs in each tile in each picture referring to the SPS. sps_entropy_coding_sync_enabled_flag equal to 0 specifies that no specific synchronization process for context variables is required to be invoked before decoding the CTU that includes the first CTB of a row of CTBs in each tile in each picture referring to the SPS, and no specific storage process for context variables is required to be invoked after decoding the CTU that includes the first CTB of a row of CTBs in each tile in each picture referring to the SPS.

NOTE—When sps_entropy_coding_sync_enabled_flag is equal to 1, the so-called wavefront parallel processing (WPP) is enabled.

sps_entry_point_offsets_present_flag equal to 1 specifies that signalling for entry point offsets for tiles or tile-specific CTU rows could be present in the slice headers of pictures referring to the SPS. sps_entry_point_offsets_present_flag equal to 0 specifies that signalling for entry point offsets for tiles or tile-specific CTU rows are not present in the slice headers of pictures referring to the SPS.

sps_log 2_max_pic_order_cnt_lsb_minus4 specifies the value of the variable MaxPicOrderCntLsb that is used in the decoding process for picture order count as follows:

$$MaxPicOrderCntLsb = 2^{(sps\_log2\_max\_pic\_order\_cnt\_lsb\_minus4+4)}$$

The value of sps_log 2_max_pic_order_cnt_lsb_minus4 shall be in the range of 0 to 12, inclusive.

sps_poc_msb_cycle_flag equal to 1 specifies that the ph_poc_msb_cycle_present_flag syntax element is present in PH syntax structures referring to the SPS. sps_poc_msb_cycle_flag equal to 0 specifies that the ph_poc_msb_cycle_present_flag syntax element is not present in PH syntax structures referring to the SPS. sps_poc_msb_cycle_len_minus1 plus 1 specifies the length, in bits, of the ph_poc_msb_cycle_val syntax elements, when present in PH syntax structures referring to the SPS. Ile value of sps_poc_msb_cycle_len_minus1 shall be in the range of 0 to 32−sps_log 2_max_pic_order_cnt_lsb_minus4−5, inclusive.

sps_num_extra_ph_bytes specifies the number of bytes of extra bits in the PH syntax structure for coded pictures referring to the SPS. The value of sps_num_extra_ph_bytes shall be equal to 0 in bitstreams conforming to this version of this Specification. Although the value of sps_num_extra_ph_bytes is required to be equal to 0 in this version of this Specification, decoders conforming to this version of this Specification shall allow the value of sps_num_extra_ph_bytes equal to 1 or 2 to appear in the syntax.

sps_extra_ph_bit_present_flag[i] equal to 1 specifies that the i-th extra bit is present in PH syntax structures referring to the SPS. sps_extra_ph_bit_present_flag[i] equal to 0 specifies that the i-th extra bit is not present in PH syntax structures referring to the SPS.

The variable NumExtraPhBits is derived as follows:

```
NumExtraPhBits = 0
for( i = 0; i < ( sps_num_extra_ph_bytes * 8 ); i++ )
    if( sps_extra_ph_bit_present_flag[ i ] )
        NumExtraPhBits++
``` sps_num_extra_sh_bytes specifies the number of bytes of extra bits in the slice headers for coded pictures referring to the SPS. The value of sps_num_extra_sh_bytes shall be equal to 0 in bitstreams conforming to this version of this Specification. Although the value of sps_num_extra_sh_bytes is required to be equal to 0 in this version of this Specification, decoders conforming to this version of this Specification shall allow the value of sps_num_extra_sh_bytes equal to 1 or 2 to appear in the syntax.

sps_extra_sh_bit_present_flag[i] equal to 1 specifies that the i-th extra bit is present in the slice headers of pictures referring to the SPS. sps_extra_sh_bit_present_flag[i] equal to 0 specifics that the i-th extra bit is not present in the slice headers of pictures referring to the SPS.

The variable NumExtraShBits is derived as follows:

```
NumExtraShBits = 0
for( i = 0; i < ( sps_num_extra_sh_bytes * 8 ); i++ )
    if( sps_extra_sh_bit_present_flag[ i ] )
        NumExtraShBits++
``` sps_sublayer_dpb_params_flag is used to control the presence of dpb_max_dec_pic_buffering_minus1[i], dpb_max_num_reorder_pics[i], and dpb_max_latency_increase_plus1[i] syntax elements in the dpb_parameters( ) syntax structure in the SPS for i in range from 0 to sps_max_sublayers_minus1−1, inclusive, when sps_max_sublayers_minus1 is greater than 0. When not present, the value of sps_sublayer_dpb_params_flag is inferred to be equal to 0.

sps_log 2_min_luma_coding_block_size_minus2 plus 2 specifies the minimum luma coding block size. The value range of sps_log 2_min_luma_coding_block_size_minus2 shall be in the range of 0 to Min(4, sps_log 2_ctu_size_minus5+3), inclusive.

The variables MinCb Log 2SizeY, MinCbSizeY, IbcBufWidthY, IbcBufWidthC and Vsize are derived as follows:

$$MinCbLos2SizeY = \text{sps\_log2\_min\_luma\_coding\_block\_size\_minus2} + 2$$

$$MinCbSizeY = 1 << MinCbLog2SizeY$$

$$IdcBufWidthY = 256 * 128/CybSizeY$$

$$IdcBufWidthC = IdcBufWidthY/SubWidthC$$

$$VSize = \text{Min}(64, CtbSizeY)$$

The value of MinCbSizeY shall less than or equal to VSize.

The variables CtbWidthC and CtbHeightC, which specify the width and height, respectively, of the array for each chroma CTB, are derived as follows:
  If sps_chroma_format_idc is equal to 0 (monochrome), CtbWidthC and CtbHeightC are both set equal to 0.
  Otherwise, CtbWidthC and CtbHeightC are derived as follows:

$$CtbWidthC = CtbSizeY/SubWidthC$$

$$CtbHeightC = CtbSizeY/SubHeightC$$

For log 2BlockWidth ranging from 0 to 4 and for log 2BlockHeight ranging from 0 to 4, inclusive, the up-right diagonal scan order army initialization process as specified is invoked with 1<<log 2BlockWidth and 1<<log 2BlockHeight as inputs, and the output is assigned to DiagScanOrder[log 2BlockWidth][log 2BlockHeight].

For log 2BlockWidth ranging from 0 to 6 and for log 2BlockHeight ranging from 0 to 6, inclusive, the horizontal and vertical traverse scan order array initialization process as specified is invoked with 1<<log 2BlockWidth and 1<<log 2BlockHeight as inputs, and the output is assigned to HorTravScanOrder[log 2BlockWidth][log 2BlockHeight] and VerTravScanOrder[log 2BlockWidth][log 2BlockHeight].

sps_partition_constraints_override_enabled_flag equal to 1 specifies the presence of ph_partition_constraints_override_flag in PH syntax structures referring to the SPS. sps_partition_constraints_override_enabled_flag equal to 0 specifies the absence of ph_partition_constraints_override_flag in PH syntax structures referring to the SPS.

sps_log 2_diff_min_qt_min_cb_intra_slice_luma specifies the default difference between the base 2 logarithm of the minimum size in luma samples of a luma leaf block resulting from quadtree splitting of a CTU and the base 2 logarithm of the minimum coding block size in luma samples for luma CUs in slices with sh_slice_type equal to 2 (I) referring to the SPS. When sps_partition_constraints_override_enabled_flag is equal to 1, the default difference can be overridden by ph_log 2_diff_min_qt_min_cb_intra_slice_luma present in PH syntax structures referring to the SPS. The value of sps_log 2_diff_min_qt_min_cb_intra_slice_luma shall be in the range of 0 to Min(6, Ctb Log 2SizeY)−MinCb Log 2SizeY, inclusive. The base 2 logarithm of the minimum size in luma samples of a luma leaf block resulting from quadtree splitting of a CTU is derived as follows:

$$MinQtLog2SizeIntraY = \text{sps\_log2\_diff\_min\_qt\_min\_cb\_intra\_slice\_luma} + \text{:MinCbLog2SizeY}$$

spa_max_mtt_hierarchy_depth_intra_slice_luma specifies the default maximum hierarchy depth for coding units resulting from multi-type tree splitting of a quadtree leaf in slices with sh_slice_type equal to 2 (I) referring to the SPS. When sps_partition_constraints_override_enabled_flag is equal to 1, the default maximum hierarchy depth can be overridden by ph_max_mtt_hierarchy_depth_intra_slice_luma present in PH syntax structures referring to the SPS. The value of sps_max_mtt_hierarchy_depth_intra_slice_luma shall be in the range of 0 to 2*(Ctb Log 2SizeY−MinCb Log 2SizeY), inclusive.

sps_log 2_diff_max_bt_min_qt_intra_slice_luma specifies the default difference between the base 2 logarithm of the maximum size (width or height) in luma samples of a luma coding block that can be split using a binary split and the base 2 logarithm of the minimum size (width or height) in luma samples of a luma leaf block resulting from quadtree splitting of a CTU in slices with sh_slice_type equal to 2 (I) referring to the SPS. When sps_partition_constraints_override_enabled_flag is equal to 1, the default difference can be overridden by ph_log 2_diff_max_bt_min_qt_luma present in PH syntax structures referring to the SPS. The value of sps_log 2_diff_max_bt_min_qt_intra_slice_luma shall be in the range of 0 to Ctb Log 2SizeY−MinQt Log 2SizeIntraY, inclusive. When sps_log 2_diff_max_bt_min_qt_intra_slice_luma is not present, the value of sps_log 2_diff_max_bt_min_qt_intra_slice_luma is inferred to be equal to 0.

sps_log 2_diff_max_tt_min_qt_intra_slice_luma specifies the default difference between the base 2 logarithm of the maximum size (width or height) in luma samples of a luma coding block that can be split using a ternary split and the base 2 logarithm of the minimum size (width or height) in luma samples of a luma leaf block resulting from quadtree splitting of a CTU in slices with sh_slice_type equal to 2 (I) referring to the SPS. When sps_partition_constraints_override_enabled_flag is equal to 1, the default difference can be overridden by ph_log 2_diff_max_tt_min_qt_luma present in PH syntax structures referring to the SPS. The value of sps_log 2_diff_max_tt_min_qt_intra_slice_luma shall be in the range of 0 to Min(6, Ctb Log 2SizeY)−MinQt Log 2SizeIntraY, inclusive. When sps_log 2_diff_max_tt_min_qt_intra_slice_luma is not present, the value of sps_log 2_diff_max_tt_min_qt_intra_slice_luma is inferred to be equal to 0.

sps_qtbtt_dual_tree_intra_flag equal to 1 specifies that, for I slices, each CTU is split into coding units with 64×64 luma samples using an implicit quadtree split, and these coding units are the root of two separate coding_tree syntax structure for luma and chroma. sps_qtbtt_dual_tree_intra_flag equal to 0 specifies separate coding_tree syntax structure is not used for I slices. When sps_qtbtt_dual_tree_intra_flag is not present, it is inferred to be equal to 0. When sps_log 2_diff_max_bt_min_qt_intra_slice_luma is greater than Min(6, Ctb Log 2SizeY)−MinQt Log 2SizeIntraY, the value of sps_qtbtt_dual_tree_intra_flag shall be equal to 0.

sps_log 2_diff_min_qt_min_cb_intra_slice_chroma specifies the default difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with sh_slice_type equal to 2 (I) referring to the SPS. When sps_partition_constraints_override_enabled_flag is equal to 1, the default difference can be overridden by ph_log 2_diff_min_qt_min_cb_chroma present in PH syntax structures referring to the SPS. The value of sps_log 2_diff_min_qt_min_cb_intra_slice_chroma shall be in the range of 0 to Min(6, Ctb Log 2SizeY)−MinCb Log 2SizeY, inclusive. When not present, the value of sps_log 2_diff_min_qt_min_cb_intra_slice_chroma is inferred to be equal to 0. The base 2 logarithm of the minimum size in luma samples of a chroma leaf block resulting from quadtree splitting of a CTU with treeType equal to DUAL_TREE_CHROMA is derived as follows:

$$MinQtLog2SizeIntraC = \\ sps\_log2\_diff\_min\_qt\_min\_cb\_intra\_slice\_chroma + MinCbLog2SizeY$$

sps_max_mtt_hierarchy_depth_intra_slice_chroma specifies the default maximum hierarchy depth for chroma coding units resulting from multi-type tree splitting of a chroma quadtree leaf with treeType equal to DUAL_TREE_CHROMA in slices with sh_slice_type equal to 2 (I) referring to the SPS. When sps_partition_constraints_override_enabled_flag is equal to 1, the default maximum hierarchy depth can be overridden by ph_max_mtt_hierarchy_depth_chroma present in PH syntax structures referring to the SPS. The value of sps_max_mtt_hierarchy_depth_intra_slice_chroma shall be in the range of 0 to 2*(Ctb Log 2SizeY−MinCb Log 2SizeY), inclusive. When not present, the value of sps_max_mtt_hierarchy_depth_intra_slice_chroma is inferred to be equal to 0.

sps_log 2_diff_max_bt_min_qt_intra_slice_chroma specifies the default difference between the base 2 logarithm of the maximum size (width or height) in luma samples of a chroma coding block that can be split using a binary split and the base 2 logarithm of the minimum size (width or height) in luma samples of a chroma leaf block resulting from quadtree splitting of a chroma CTU with treeType equal to DUAL_TREE_CHROMA in slices with sh_slice_type equal to 2 (I) referring to the SPS. When sps_partition_constraints_override_enabled_flag is equal to 1, the default difference can be overridden by ph_log 2_diff_max_bt_min_qt_chroma present in PH syntax structures referring to the SPS. The value of sps_log 2_diff_max_bt_min_qt_intra_slice_chroma shall be in the range of 0 to Min(6, Ctb Log 2SizeY)−MinQt Log 2SizeIntraC, inclusive. When sps_log 2_diff_max_bt_min_qt_intra_slice_chroma is not present, the value of sps_log 2_diff_max_bt_min_qt_intra_slice_chroma is inferred to be equal to 0.

sps_log 2_diff_max_tt_min_qt_intra_slice_chroma specifies the default difference between the base 2 logarithm of the maximum size (width or height) in luma samples of a chroma coding block that can be split using a ternary split and the base 2 logarithm of the minimum size (width or height) in luma samples of a chroma leaf block resulting from quadtree splitting of a chroma CTU with treeType equal to DUAL_TREE_CHROMA in slices with sh_slice_type equal to 2 (I) referring to the SPS. When sps_partition_constraints_override_enabled_flag is equal to 1, the default difference can be overridden by ph_log 2_diff_max_tt_min_qt_chroma present in PH syntax structures referring to the SPS. The value of sps_log 2_diff_max_tt_min_qt_intra_slice_chroma shall be in the range of 0 to Min(6, Ctb Log 2SizeY)−MinQt Log 2SizeIntraC, inclusive. When sps_log 2_diff_max_tt_min_qt_intra_slice_chroma is not present, the value of sps_log 2_diff_max_tt_min_qt_intra_slice_chroma is inferred to be equal to 0.

sps_log 2_diff_min_qt_min_cb_inter_slice specifies the default difference between the base 2 logarithm of the minimum size in luma samples of a luma leaf block resulting from quadtree splitting of a CTU and the base 2 logarithm of the minimum luma coding block size in luma samples for luma CUs in slices with sh_slice_type equal to 0 (B) or 1 (P) referring to the SPS. When sps_partition_constraints_override_enabled_flag is equal to 1, the default difference can be overridden by ph_log 2_diff_min_qt_min_cb_inter_slice present in PH syntax structures referring to the SPS. The value of sps_log 2_diff_min_qt_min_cb_inter_slice shall be in the range of 0 to Min(6, Ctb Log 2SizeY)−MinCb Log 2SizeY, inclusive. The base 2 logarithm of the minimum size in luma samples of a luma leaf block resulting from quadtree splitting of a CTU is derived as follows:

$$MinQtLog2SizeInterY = \\ sps\_log2\_diff\_min\_qt\_min\_cb\_inter\_slice + MinCbLog2SizeY$$

sps_max_mtt_hierarchy_depth_inter_slice specifies the default maximum hierarchy depth for coding units resulting from multi-type tree splitting of a quadtree leaf in slices with sh_slice_type equal to 0 (B) or 1 (P) referring to the SPS. When sps_partition_constraints_override_enabled_flag is equal to 1, the default maximum hierarchy depth can be overridden by ph_max_mtt_hierarchy_depth_inter_slice present in PH syntax structures referring to the SPS. The value of sps_max_mtt_hierarchy_depth_inter_slice shall be in the range of 0 to 2*(Ctb Log 2SizeY−MinCb Log 2SizeY), inclusive.

sps_log 2_diff_max_bt_min_qt_inter_slice specifies the default difference between the base 2 logarithm of the maximum size (width or height) in luma samples of a luma coding block that can be split using a binary split and the base 2 logarithm of the minimum size (width or height) in luma samples of a luma leaf block resulting from quadtree splitting of a CTU in slices with sh_slice_type equal to 0 (B) or 1 (P) referring to the SPS. When sps_partition_constraints_override_enabled_flag is equal to 1, the default difference can be overridden by ph_log 2_diff_max_bt_min_qt_luma present in PH syntax structures referring to the SPS. The value of sps_log 2_diff_max_bt_min_qt_inter_slice shall be in the range of 0 to Ctb Log 2SizeY−MinQt Log 2SizeInterY, inclusive. When sps_log 2_diff_max_bt_min_qt_inter_slice is not present, the value of sps_log 2_diff_max_bt_min_qt_inter_slice is inferred to be equal to 0.

sps_log 2_diff_max_tt_min_qt_inter_slice specifies the default difference between the base 2 logarithm of the maximum size (width or height) in luma samples of a luma coding block that can be split using a ternary split and the base 2 logarithm of the minimum size (width or height) in luma samples of a luma leaf block resulting from quadtree splitting of a CTU in slices with sh_slice_type equal to 0 (B) or 1 (P) referring to the SPS. When sps_partition_constraints_override_enabled_flag is equal to 1, the default difference can be overridden by ph_log 2_diff_max_tt_min_qt_luma present in PH syntax structures referring to the SPS. The value of sps_log 2_diff_max_tt_min_qt_inter_slice shall be in the range of 0 to Min(6, Ctb Log 2SizeY)−MinQt Log 2SizeInterY, inclusive. When sps_log 2_diff_max_tt_min_qt_inter_slice is not present, the value of sps_log 2-diff_max_tt_min_qt_inter_slice is inferred to be equal to 0.

sps_max_luma_transform_size_64_flag equal to 1 specifies that the maximum transform size in luma samples is equal to 64. sps_max_luma_transform_size_64_flag equal to 0 specifies that the maximum transform size in luma samples is equal to 32. When not present, the value of sps_max_luma_transform_size_64_flag is inferred to be equal to 0.

The variables MinTb Log 2SizeY, MaxTb Log 2SizeY, MinTbSizeY, and MaxTbSizeY are derived as follows:

$$MinTbLog2SizeY = 2$$

$$MaxTbLog2SizeY = \text{sps\_max\_luma\_transform\_size\_64\_flag} \;?\; 6{:}5$$

$$MinTbSizeY = 1 << MinTbLog2SizeY$$

$$MaxTbSizeY = 1 << MaxTbLog2SizeY$$

sps_transform_skip_enabled_flag equal to 1 specifies that transform_skip_flag could be present in the transform unit syntax. sps_transform_skip_enabled_flag equal to 0 specifies that transform_skip_flag is not present in the transform unit syntax.

sps_log 2_transform_skip_max_size_minus2 specifies the maximum block size used for transform skip, and shall be in the range of 0 to 3, inclusive.

The variable MaxTsSize is set equal to 1<<(sps_log 2_transform_skip_max_size_minus2+2).

sps_bdpcm_enabled_flag equal to 1 specifies that intra_bdpcm_luma_flag and intra_bdpcm_chroma_flag could be present in the coding unit syntax for intra coding units. sps_bdpcm_enabled_flag equal to 0 specifies that intra_bdpcm_luma_flag and intra_bdpcm_chroma_flag are not present in the coding unit syntax for intra coding units. When not present, the value of sps_bdpcm_enabled_flag is inferred to be equal to 0.

sps_mts_enabled_flag equal to 1 specifies that sps_explicit_mts_intra_enabled_flag and sps_explicit_mts_inter_enabled_flag are present in the SPS. sps_mts_enabled_flag equal to 0 specifies that sps_explicit_mts_intra_enabled_flag and sps_explicit_mts_inter_enabled_flag are not present in the SPS.

sps_explicit_mts_intra_enabled_flag equal to 1 specifies that mts_idx could be present in the intra coding unit syntax of the CLVS. sps_explicit_mts_intra_enabled_flag equal to 0 specifies that mts_idx is not present in the intra coding unit syntax of the CLVS. When not present, the value of sps_explicit_mts_intra_enabled_flag is inferred to be equal to 0.

sps_explicit_mts_inter_enabled_flag equal to 1 specifies that mts_idx could be present in the inter coding unit syntax of the CLVS. sps_explicit_mts_inter_enabled_flag equal to 0 specifies that mts_idx is not present in the inter coding unit syntax of the CLVS. When not present, the value of sps_explicit_mts_inter_enabled_flag is inferred to be equal to 0.

sps_lfnst_enabled_flag equal to 1 specifies that lfnst_idx could be present in intra coding unit syntax. sps_lfnst_enabled_flag equal to 0 specifies that lfnst_idx is not present in intra coding unit syntax.

sps_joint_cbcr_enabled_flag equal to 1 specifies that the joint coding of chroma residuals is enabled for the CLVS. sps_joint_cbcr_enabled_flag equal to 0 specifies that the joint coding of chroma residuals is disabled for the CLVS. When not present, the value of sps_joint_cbcr_enabled_flag is inferred to be equal to 0.

sps_same_qp_table_for_chroma_flag equal to 1 specifies that only one chroma QP mapping table is signalled and this table applies to Cb and Cr residuals and additionally to joint Cb-Cr residuals when sps_joint_cbcr_enabled_flag is equal to 1. sps_same_qp_table_for_chroma_flag equal to 0 specifies that chroma QP mapping tables, two for Cb and Cr, and one additional for joint Cb-Cr when sps_joint_cbcr_enabled_flag is equal to 1, are signalled in the SPS. When not present, the value of sps_same_qp_table_for_chroma_flag is inferred to be equal to 1.

sps_qp_table_start_minus26[i] plus 26 specifies the starting luma and chroma QP used to describe the i-th chroma QP mapping table. The value of sps_qp_table_start_minus26[i] shall be in the range of −26−QpBdOffset to 36 inclusive. When not present, the value of sps_qp_table_start_minus26[i] is inferred to be equal to 0.

sps_num_points_in_qp_table_minus1[i] plus 1 specifies the number of points used to describe the i-th chroma QP mapping table. The value of sps_num_points_in_qp_table_minus1[i] shall be in the range of 0 to 36−sps_qp_table_start_minus26[i], inclusive. When not present, the value of sps_num_points_in_qp_table_minus1[0] is inferred to be equal to 0.

sps_delta_qp_in_val_minus1[i][j] specifies a delta value used to derive the input coordinate of the j-th pivot point of the i-th chroma QP mapping table. When not present, the value of sps_delta_qp_in_val_minus1[0][j] is inferred to be equal to 0.

sps_delta_qp_diff_val[i][j] specifies a delta value used to derive the output coordinate of the j-th pivot point of the i-th chroma QP mapping table.

The i-th chroma QP mapping table ChromaQpTable[i] for i=0 ... numQpTables−1 is derived as follows:

```
qpInVal[ i ][ 0 ] = sps_qp_table_start_minus26[ i ] + 26
qpOutVal[ i ][ 0 ] = qpInVal[ i ][ 0 ]
for( j = 0; j <= sps_num_points_in_qp_table_minus1[ i ]; j++ ) {
    qpInVal[ i ][ j + 1 ] = qpInVal[ i ][ j ] + sps_delta_qp_in_val_minus1[ i ][ j ] + 1
    qpOutVal[ i ][ j + 1 ] = qpOutVal[ i ][ j ] +
        ( sps_delta_qp_in_val_minus1[ i ][ j ] ^ sps_delta_qp_diff_val[ i ][ j ] )
}
```

-continued

```
ChromaQpTable[ i ][ qpInVal[ i ][ 0 ] ] = qpOutVal[ i ][ 0 ]
for( k = qpInVal[ i ][ 0 ] - 1; k >= -QpBdOffset; k - - )
    ChromaQpTable[ i ][ k ] = Clip3( -QpBdOffset, 63, ChromaQpTable[ i ][ k + 1 ] - 1 )
for( j = 0; j <= sps_num_points_in_qp_table_minus1[ i ]; j++ ) {
    sh = ( sps_delta_qp_in_val_minus1[ i ][j ] + 1 ) >> 1
    for( k = qpInVal[ i ][ j ] + 1, m = 1; k <= qpInVal[ i ][ j + 1 ]; k++, m++ )
        ChromaQpTable[ i ][ k ] = ChromaQpTable[ i ][ qpInVal[ i ][ j ] ] +
            ( ( qpOutVal[ i ][j + 1] - qpOutVal[ i ][ j ] ) * m + sh )/
( sps_delta_qp_in_val_minus1[ i ][ j ] + 1 )
}
for( k = qpInVal[ i ][ sps_num_points_in_qp_table_minus1[ i ] + 1 ] + 1; k <= 63; k++ )
    ChromaQpTable[ i ][ k ] = Clip3( -QpBdOffset, 63, ChromaQpTable[ i ][ k - 1 ] + 1 )
```

When sps_same_qp_table_for_chroma_flag is equal to 1, ChromaQpTable[1][k] and ChromaQpTable[2][k] are set equal to ChromaQpTable[0][k] for k in the range of −QpBdOffset to 63, inclusive.

It is a requirement of bitstream conformance that the values of qpInVal[i][j] and qpOutVal[i][j] shall be in the range of −QpBdOffset to 63, inclusive for i in the range of 0 to numQpTables−1, inclusive, and j in the range of 0 to sps_num_points_in_qp_table_minus1[i]+1, inclusive.

sps_sao_enabled_flag equal to 1 specifies that SAO is enabled for the CLVS. sps_sao_enabled_flag equal to 0 specifies that SAO is disabled for the CLVS.

sps_alf_enabled_flag equal to 1 specifies that ALF is enabled for the CLVS. sps_alf_enabled_flag equal to 0 specifies that ALF is disabled for the CLVS.

spa_ccalf_enabled_flag equal to 1 specifies that CCALF is enabled for the CLVS. sps_ccalf_enabled_flag equal to 0 specifies that CCALF is disabled for the CLVS. When not present, the value of sps_ccalf_enabled_flag is inferred to be equal to 0.

sps_lmcs_enabled_flag equal to 1 specifies that LMCS is enabled for the CLVS. sps_lmcs_enabled_flag equal to 0 specifies that LMCS is disabled for the CLVS.

sps_weighted_pred_flag equal to 1 specifies that weighted prediction might be applied to P slices referring to the SPS. sps_weighted_pred_flag equal to 0 specifies that weighted prediction is not applied to P slices referring to the SPS.

sps_weighted_bipred_flag equal to 1 specifies that explicit weighted prediction might be applied to B slices referring to the SPS. sps_weighted_bipred_flag equal to 0 specifies that explicit weighted prediction is not applied to B slices referring to the SPS.

sps_long_term_ref_pics_flag equal to 0 specifies that no LTRP is used for inter prediction of any coded picture in the CLVS. sps_long_term_ref_pics_flag equal to 1 specifies that LTRPs might be used for inter prediction of one or more coded pictures in the CLVS.

sps_inter_layer_prediction_enabled_flag equal to 1 specifies that inter-layer prediction is enabled for the CLVS and ILRPs might be used for inter prediction of one or more coded pictures in the CLVS. sps_inter_layer_prediction_enabled_flag equal to 0 specifies that inter-layer prediction is disabled for the CLVS and no ILRP is used for inter prediction of any coded picture in the CLVS. When sps_video_parameter_set_id is equal to 0, the value of sps_inter_layer_prediction_enabled_flag is inferred to be equal to 0. When vps_independent_layer_flag[GeneralLayerIdx[nuh_layer_id]] is equal to 1, the value of sps_inter_layer_prediction_enabled_flag shall be equal to 0.

sps_idr_rpl_present_flag equal to 1 specifies that RPL syntax elements could be present in slice headers of slices with nal_unit_type equal to IDR_N_LP or IDR_W_RADL. sps_idr_rpl_present_flag equal to 0 specifies that RPL syntax elements are not present in slice headers of slices with nal_unit_type equal to IDR_N_LP or IDR_W_RADL.

sps_rpl1_same_as_rpl0_flag equal to 1 specifies that the syntax element sps_num_ref_pic_lists[1] and the syntax structure ref_pic_list_struct(1, rplsIdx) are not present and the following applies:
  The value of sps_num_ref_pic_lists[1] is inferred to be equal to the value of sps_num_ref_pic_lists[0].
  The value of each of syntax elements in ref_pic_list_struct(1, rplsIdx) is inferred to be equal to the value of corresponding syntax element in ref_pic_list_struct(0, rplsIdx) for rplsIdx ranging from 0 to sps_num_ref_pic_lists[0]−1.

sps_num_ref_pic_lists[i] specifies the number of the ref_pic_list_struct(listIdx, rplsIdx) syntax structures with listIdx equal to i included in the SPS. The value of sps_num_ref_pic_lists[i] shall be in the range of 0 to 64, inclusive.
  NOTE—For each value of listIdx (equal to 0 or 1), a decoder could allocate memory for a total number of sps_num_ref_pic_lists[i]+1 ref_pic_list_struct(listIdx, rplsIdx) syntax structures since there could be one ref_pic_list_struct(listIdx, rplsIdx) syntax structure directly signalled in the picture headers or slice headers of a current picture.

sps_ref_wraparound_enabled_flag equal to 1 specifies that horizontal wrap-around motion compensation is enabled for the CLVS. sps_ref_wraparound_enabled_flag equal to 0 specifies that horizontal wrap-around motion compensation is disabled for the CLVS.

It is a requirement of bitstream conformance that, when there is one or more values of i in the range of 0 to sps_num_subpics_minus1, inclusive, for which sps_subpic_treated_as_pic_flag[i] is equal to 1 and sps_subpic_width_minus1[i] plus 1 is not equal to (sps_pic_width_max_in_luma_samples+CtbSizeY−1)>>Ctb Log 2SizeY), the value of sps_ref_wraparound_enabled_flag shall be equal to 0.

sps_temporal_mvp_enabled_flag equal to 1 specifies that temporal motion vector predictors are enabled for the CLVS. sps_temporal_mvp_enabled_flag equal to 0 specifies that temporal motion vector predictors are disabled for the CLVS.

sps_sbtmvp_enabled_flag equal to 1 specifies that subblock-based temporal motion vector predictors are enabled and might be used in decoding of pictures with all slices having sh_slice_type not equal to I in the CLVS. sps_sbtmvp_enabled_flag equal to 0 specifies that subblock-based temporal motion vector predictors are disabled and not used in decoding of pictures in the CLVS. When sps_sbtmvp_enabled_flag is not present, it is inferred to be equal to 0.

sps_amvr_enabled_flag equal to 1 specifies that adaptive motion vector difference resolution is enabled for the CVLS.

amvr_enabled_flag equal to 0 specifies that adaptive motion vector difference resolution is disabled for the CLVS.

sps_bdof_enabled_flag equal to 1 specifies that the bi-directional optical flow inter prediction is enabled for the CLVS. sps_bdof_enabled_flag equal to 0 specifies that the bi-directional optical flow inter prediction is disabled for the CLVS.

sps_bdof_control_present_in_ph_flag equal to 1 specifies that ph_bdof_disabled_flag could be present in PH syntax structures referring to the SPS. sps_bdof_control_present_in_ph_flag equal to 0 specifies that ph_bdof_disabled_flag is not present in PH syntax structures referring to the SPS. When not present, the value of sps_bdof_control_present_in_ph_flag is inferred to be equal to 0.

sps_smvd_enabled_flag equal to 1 specifies that symmetric motion vector difference is enabled for the CLVS. sps_smvd_enabled_flag equal to 0 specifies that symmetric motion vector difference is disabled for the CLVS.

sps_dmvr_enabled_flag equal to 1 specifies that decoder motion vector refinement based inter bi-prediction is enabled for the CLVS. sps_dmvr_enabled_flag equal to 0 specifies that decoder motion vector refinement based inter bi-prediction is disabled for the CLVS.

sps_dmvr_control_present_in_ph_flag equal to 1 specifies that ph_dmvr_disabled_flag could be present in PH syntax structures referring to the SPS. sps_dmvr_control_present_in_ph_flag equal to 0 specifies that ph_dmvr_disabled_flag is not present in PH syntax structures referring to the SPS. When not present, the value of sps_dmvr_control_present_in_ph_flag is inferred to be equal to 0.

sps_mmvd_enabled_flag equal to 1 specifies that merge mode with motion vector difference is enabled for the CLVS. sps_mmvd_enabled_flag equal to 0 specifies that merge mode with motion vector difference is disabled for the CLVS.

sps_mmvd_fullpel_only_enabled_flag equal to 1 specifies that the merge mode with motion vector difference using only integer sample precision is enabled for the CLVS. sps_mmvd_fullpel_enabled_only_flag equal to 0 specifies that the merge mode with motion vector difference using only integer sample precision is disabled for the CLVS. When not present, the value of sps_mmvd_fullpel_only_enabled_flag is inferred to be equal to 0.

sps_six_minus_max_num_merge_cand specifies the maximum number of merging motion vector prediction (MVP) candidates supported in the SPS subtracted from 6. The value of sps_six_minus_max_num_merge_cand shall be in the range of 0 to 5, inclusive.

The maximum number of merging MVP candidates, MaxNumMergeCand, is derived as follows:

$$MaxNumMergeCand = 6 - sps\_six\_minus\_max\_num\_merge\_cand$$

sps_sbt_enabled_flag equal to 1 specifies that subblock transform for inter-predicted CUs is enabled for the CLVS. sps_sbt_enabled_flag equal to 0 specifies that subblock transform for inter-predicted CUs is disabled for the CLVS.

sps_affine_enabled_flag equal to 1 specifies that the affine model based motion compensation is enabled for the CLVS and inter_affine_flag and cu_affine_type_flag could be present in the coding unit syntax of the CLVS. sps_affine_enabled_flag equal to 0 specifies that the affine model based motion compensation is disabled for the CLVS and inter_affine_flag and cu_affine_type_flag are not present in the coding unit syntax of the CLVS.

sps_five_minus_max_sum_subblock_merge_cand specifies the maximum number of subblock-based merging motion vector prediction candidates supported in the SPS subtracted from 5. The value of sps_five_minus_max_num_subblock_merge_cand shall be in the range of 0 to 5—sps_sbtmvp_enabled_flag, inclusive.

sps_6param_affine_enabled_flag equal to 1 specifies that the 6-parameter affine model based motion compensation is enabled for the CLVS. sps_6param_affine_enabled_flag equal to 0 specifies that the 6-parameter affine model based motion compensation is disabled for the CLVS. When not present, the value of sps_6param_affine_enabled_flag is inferred to be equal to 0.

sps_affine_amvr_enabled_flag equal to 1 specifies that adaptive motion vector difference resolution is enabled for the CLVS. sps_affine_amvr_enabled_flag equal to 0 specifies that adaptive motion vector difference resolution is disabled for the CLVS. When not present, the value of sps_affine_amvr_enabled_flag is inferred to be equal to 0.

sps_affine_prof_enabled_flag equal to 1 specifies that the affine motion compensation refined with optical flow is enabled for the CLVS. sps_affine_prof_enabled_flag equal to 0 specifies that the affine motion compensation refined with optical flow is disabled for the CLVS. When not present, the value of sps_affine_prof_enabled_flag is inferred to be equal to 0.

sp_prof_control_present_in_ph_flag equal to 1 specifies that ph_prof_disabled_flag could be present in PH syntax structures referring to the SPS. sps_prof_control_present_in_ph_flag equal to 0 specifies that ph_prof_disabled_flag is not present in PH syntax structures referring to the SPS. When sps_prof_control_present_in_ph_flag is not present, the value of sps_prof_control_present_in_ph_flag is inferred to be equal to 0.

sps_bcw_enabled_flag equal to 1 specifies that bi-prediction with CU weights is enabled for the CLVS and bcw_idx could be present in the coding unit syntax of the CLVS. sps_bcw_enabled_flag equal to 0 specifies that bi-prediction with CU weights is disabled for the CLVS and bcw_idx is not present in the coding unit syntax of the CLVS.

spa_ciip_enabled_flag equal to 1 specifies that ciip_flag could be present in the coding unit syntax for inter coding units. sps_ciip_enabled_flag equal to 0 specifies that ciip_flag is not present in the coding unit syntax for inter coding units.

sp_gpm_enabled_flag equal to 1 specifies that the geometric partition based motion compensation is enabled for the CLVS and merge_gpm_partition_idx, merge_gpm_idx0, and merge_gpm_idx1 could be present in the coding unit syntax of the CLVS. sps_gpm_enabled_flag equal to 0 specifies that the geometric partition based motion compensation is disabled for the CLVS and merge_gpm_partition_idx, merge_gpm_idx0, and merge_gpm_idx1 are not present in the coding unit syntax of the CLVS. When not present, the value of sps_gpm_enabled_flag is inferred to be equal to 0.

sps_max_num_merge_cand_minus_max_num_gpm_cand specifies the maximum number of geometric partitioning merge mode candidates supported in the SPS subtracted from MaxNumMergeCand. The value of sps_max_num_merge_cand_mimus_max_num_gpm_cand shall be in the range of 0 to MaxNumMergeCand−2, inclusive.

The maximum number of geometric partitioning merge mode candidates, MaxNumGpmMergeCand, is derived as follows:

```
if( sps_gpm_enabled_flag && MaxNumMergeCand >= 3 )
   MaxNumGpmMergeCand = MaxNumMergeCand −
      sps_max_num_merge_cand_minus_max_num_gpm_cand
else if( sps_gpm_enabled_flag && MaxNumMergeCand = = 2 )
   MaxNum GpmMergeCand = 2
else
   MaxNumGpmMergeCand = 0
``` sps_log 2_parallel_merge_level_minus2 plus 2 specifies the value of the variable Log 2ParMrgLevel, which is used in the derivation process for spatial merging candidates as specified, the derivation process for motion vectors and reference indices in subblock merge mode as specified, and to control the invocation of the updating process for the history-based motion vector predictor list. The value of sps_log 2_parallel_merge_level_minus2 shall be in the range of 0 to Ctb Log 2SizeY−2, inclusive. The variable Log 2ParMrgLevel is derived as follows:

$$Log2ParMrgLevel = sp\_log2\_parallel\_merge\_level\_minus2 + 2$$

sps_isp_enabled_flag equal to 1 specifies that intra prediction with subpartitions is enabled for the CLVS. sps_isp_enabled_flag equal to 0 specifies that intra prediction with subpartitions is disabled for the CLVS.

sps_mrl_enabled_flag equal to 1 specifies that intra prediction with multiple reference lines is enabled for the CLVS. sps_mrl_enabled_flag equal to 0 specifies that intra prediction with multiple reference lines is disabled for the CLVS.

sps_mip_enabled_flag equal to 1 specifies that the matrix-based intra prediction is enabled for the CLVS. sps_mip_enabled_flag equal to 0 specifies that the matrix-based intra prediction is disabled for the CLVS.

sps_cclm_enabled_flag equal to 1 specifies that the cross-component linear model intra prediction from luma component to chromia component is enabled for the CLVS. sps_cclm_enabled_flag equal to 0 specifies that the cross-component linear model intra prediction from luma component to chroma component is disabled for the CLVS. When sps_cclm_enabled_flag is not present, it is inferred to be equal to 0.

sps_chroma_horizontal_collocated_flag equal to 1 specifies that prediction processes operate in a manner designed for chroma sample positions that are not horizontally shifted relative to corresponding luma sample positions. sps_chroma_horizontal_collocated_flag equal to 0 specifies that prediction processes operate in a manner designed for chroma sample positions that are shifted to the right by 0.5 in units of luma samples relative to corresponding luma sample positions. When sps_chroma_horizontal_collocated_flag is not present, it is inferred to be equal to 1.

sps_chroma_vertical_collocated_flag equal to 1 specifies that prediction processes operate in a manner designed for chroma sample positions that are not vertically shifted relative to corresponding luma sample positions. sps_chroma_vertical_collocated_flag equal to 0 specifies that prediction processes operate in a manner designed for chroma sample positions that are shifted downward by 0.5 in units of luma samples relative to corresponding luma sample positions. When sps_chroma_vertical_collocated_flag is not present, it is inferred to be equal to 1.

sps_palette_enabled_flag equal to 1 specifies that the palette prediction mode is enabled for the CLVS. sps_palette_enabled_flag equal to 0 specifies that the palette prediction mode is disabled for the CLVS. When sps_palette_enabled_flag is not present, it is inferred to be equal to 0.

sps_act_enabled_flag equal to 1 specifies that the adaptive colour transform is enabled for the CLVS and the cu_act_enabled_flag could be present in the coding unit syntax of the CLVS. sps_act_enabled_flag equal to 0 specifies that the adaptive colour transform is disabled for the CLVS and cu_act_enabled_flag is not present in the coding unit syntax of the CLVS. When sps_act_enabled_flag is not present, it is inferred to be equal to 0.

sps_min_qp_prime_ts specifies the minimum allowed quantization parameter for transform skip mode as follows:

$$QpPrimeTsMin = 4 + 6*sps\_min\_qp\_prime\_ts$$

The value of sps_min_qp_prime_ts shall be in the range of 0 to 8, inclusive.

sps_ibc_enabled_flag equal to 1 specifies that the IBC prediction mode is enabled for the CLVS. sps_ibc_enabled_flag equal to 0 specifies that the IBC prediction mode is disabled for the CLVS. When sps_ibc_enabled_flag is not present, it is inferred to be equal to 0.

sps_six_minus_max_num_ibe_merge_cand, when sps_ibc_enabled_flag is equal to 1, specifies the maximum number of IBC merging block vector prediction (BVP) candidates supported in the SPS subtracted from 6. The value of sps_six_minus_max_num_ibc_merge_cand shall be in the range of 0 to 5, inclusive.

The maximum number of IBC merging BVP candidates, MaxNumIbcMergeCand, is derived as follows:

```
if( sps_ibc_enabled_flag )
   MaxNumIbcMergeCand = 6 − sps_six_minus_max_num_ibc_merge_cand
else
   MaxNumIbcMergeCand = 0
``` sps_ladf_enabled_flag equal to 1 specifies that sps_num_ladf_intervals_minus2, sps_ladf_lowest_interval_qp_offset, sps_ladf_qp_offset[i], and sps_ladf_delta_threshold_minus1[i] are present in the SPS. sps_ladf_enabled_flag equal to 0 specifies that sps_num_ladf_intervals_minus2, sps_ladf_lowest_interval_qp_offset, sps_ladf_qp_offset[i], and sps_ladf_delta_threshold_minus1[i] are not present in the SPS.

sps_num_ladf_intervals_minus2 plus 2 specifies the number of sps_ladf_delta_threshold_minus1[i] and sps_ladf_qp_offset[i] syntax elements that are present in the SPS. The value of sps_num_ladf_intervals_minus2 shall be in the range of 0 to 3, inclusive.

sps_ladf_lowest_interval_qp_offset specifies the offset used to derive the variable qP as specified The value of sps_ladf_lowest_interval_qp_offset shall be in the range of −63 to 63, inclusive.

sps_ladf_qp_offset[i] specifies the offset array used to derive the variable qP as specified. The value of sps_ladf_qp_offset[i] shall be in the range of −63 to 63, inclusive.

sps_ladf_delta_threshold_minus1[i] is used to compute the values of SpsLadfIntervalLowerBound[i], which specifies the lower bound of the i-th luma intensity level interval. The value of sps_ladf_delta_threshold_minus1[i] shall be in the range of 0 to $2^{BitDepth}-3$, inclusive.

The value of SpsLadfIntervalLowerBound[0] is set equal to 0.

For each value of i in the range of 0 to sps_num_ladf_intervals_minus2, inclusive, the variable SpsLadfIntervalLowerBound[i+1] is derived as follows:

$$SpsLadfIntervalLowerBound[i+1] =$$
$$SpsLadfIntervalLowerBound[i] + \text{sps\_ladf\_delta\_threshold\_minus1}[i] + 1$$

sps_explicit_scaling_list_enabled_flag equal to 1 specifies that the use of an explicit scaling list, which is signalled in a scaling list APS, in the scaling process for transform coefficients when decoding a slice is enabled for the CLVS. sps_explicit_scaling_list_enabled_flag equal to 0 specifies that the use of an explicit scaling list in the scaling process for transform coefficients when decoding a slice is disabled for the CLVS.

sps_scaling_matrix_for_lfnst_disabled_flag equal to 1 specifies that scaling matrices are disabled for blocks coded with LFNST for the CLVS. sps_scaling_matrix_for_lfnst_disabled_flag equal to 0 specifies that the scaling matrices is enabled for blocks coded with LFNST for the CLVS.

sps_scaling_matrix_for_alternative_colour_space_disabled_flag equal to 1 specifies, for the CLVS, that scaling matrices are disabled and not applied to blocks of a coding unit when the decoded residuals of the current coding unit are applied using a colour space conversion. sps_scaling_matrix_for_alternative_colour_space_disabled_flag equal to 0 specifies, for the CLVS, that scaling matrices are enabled and could be applied to blocks of a coding unit when the decoded residuals of the current coding unit are applied using a colour space conversion. When not present, the value of sps_scaling_matrix_for_alternative_colour_space_disabled_flag is inferred to be equal to 0.

sps_scaling_matrix_designated_colour_space_flag equal to 1 specifies that the colour space of the scaling matrices is the colour space that does not use a colour space conversion for the decoded residuals. sps_scaling_matrix_designated_colour_space_flag equal to 0 specifies that the designated colour space of the scaling matrices is the colour space that uses a colour space conversion for the decoded residuals.

sps_dep_quant_enabled_flag equal to 1 specifies that dependent quantization is enabled for the CLVS. sps_dep_quant_enabled_flag equal to 0 specifies that dependent quantization is disabled for the CLVS.

sps_sign_data_hiding_enabled_flag equal to 1 specifies that sign bit hiding is enabled for the CLVS. sps_sign_data_hiding_enabled_flag equal to 0 specifies that sign bit hiding is disabled for the CLVS.

sps_virtual_boundaries_enabled_flag equal to 1 specifies that disabling in-loop filtering across virtual boundaries is enabled for the CLVS. sps_virtual_boundaries_enabled_flag equal to 0 specifies that disabling in-loop filtering across virtual boundaries is disabled for the CLVS. In-loop filtering operations include the deblocking filter, sample adaptive offset filter, and adaptive loop filter operations.

sps_virtual_boundaries_present_flag equal to 1 specifies that information of virtual boundaries is signalled in the SPS. sps_virtual_boundaries_present_flag equal to 0 specifies that information of virtual boundaries is not signalled in the SPS. When there is one or more than one virtual boundaries signalled in the SPS, the in-loop filtering operations are disabled across the virtual boundaries in pictures referring to the SPS. In-loop filtering operations include the deblocking filter, sample adaptive offset filter, and adaptive loop filter operations. When not present, the value of sps_virtual_boundaries_present_flag is inferred to be equal to 0. When sps_res_change_in_clvs_allowed_flag is equal to 1, the value of sps_virtual_boundaries_present_flag shall be equal to 0.

When sps_subpic_info_present_flag and sps_virtual_boundaries_enabled_flag are both equal to 1, the value of sps_virtual_boundaries_present_flag shall be equal to 1.

sps_num_ver_virtual_boundaries specifies the number of sps_virtual_boundary_pos_x_minus1[i] syntax elements that are present in the SPS. The value of sps_num_ver_virtual_boundaries shall be in the range of 0 to (sps_pic_width_max_in_luma_samples<=8?0:3), inclusive. When sps_num_ver_virtual_boundaries is not present, it is inferred to be equal to 0.

sps_virtual_boundary_pos_x_minus1[i] plus 1 specifies the location of the i-th vertical virtual boundary in units of luma samples divided by 8. The value of sps_virtual_boundary_pos_x_minus1[i] shall be in the range of 0 to Ceil(sps_pic_width_max_in_luma_samples÷8)−2, inclusive.

sps_num_hor_virtual_boundaries specifies the number of sps_virtual_boundary_pos_y_minus1[i] syntax elements that are present in the SPS. The value of sps_num_hor_virtual_boundaries shall be in the range of 0 to (sps_pic_height_max_in_luma_samples<=8?0:3), inclusive. When sps_num_hor_virtual_boundaries is not present, it is inferred to be equal to 0.

When sps_virtual_boundaries_enabled_flag is equal to 1 and sps_virtual_boundaries_present_flag is equal to 1, the sum of sps_num_ver_virtual_boundaries and sps_num_hor_virtual_boundaries shall be greater than 0. sps_virtual_boundary_pos_y_minus1[i] plus 1 specifies the location of the i-th horizontal virtual boundary in units of luma samples divided by 8. The value of sps_virtual_boundary_pos_y_minus1[i] shall be in the range of 0 to Ceil(sps_pic_height_max_in_luma_samples÷8)−2, inclusive.

sps_timing_hrd_params_present_flag equal to 1 specifies that the SPS contains a general_timing_hrd_parameters( ) syntax structure and an ols_timing_hrd_parameters( ) syntax structure. sps_timing_hrd_params_present_flag equal to 0 specifies that the SPS does not contain a general_timing_hrd_parameters( ) syntax structure or an ols_timing_hrd_parameters( ) syntax structure.

sps_sulayer_cpb_params_present_flag equal to 1 specifies that the ols_timing_hrd_parameters( ) syntax structure in the SPS includes HRD parameters for sublayer representations with TemporalId in the range of 0 to sps_max_sublayers_minus1, inclusive. sps_sublayer_cpb_params_present_flag equal to 0 specifies that the ols_timing_hrd_parameters( ) syntax structure in the SPS includes HRD parameters for the sublayer representation with TemporalId equal to sps_max_sublayers_minus1 only. When sps_max_sublayers_minus1 is equal to 0, the value of sps_sublayer_cpb_params_present_flag is inferred to be equal to 0.

When sps_sublayer_cpb_params_present_flag is equal to 0, the HRD parameters for the sublayer representations with TemporalId in the range of 0 to sps_max_sublayers_minus1−1, inclusive, are inferred to be the same as that for the sublayer representation with TemporalId equal to sps_max_sublayers_minus1. These include the HRD parameters starting from the fixed_pic_rate_general_flag[i] syntax element till the sublayer_hrd_parameters(i) syntax structure immediately under the condition "if(general_vcl_hrd_params_present_flag)" in the ols_timing_hrd_parameters syntax structure. sps_field_seq_flag equal to 1 indicates that the CLVS conveys pictures that represent fields. sps_field_seq_flag equal to 0 indicates that the CLVS conveys pictures that represent frames.

When sps_field_seq_flag is equal to 1, a frame-field information SEI message shall be present for every coded picture in the CLVS.

NOTE—The specified decoding process does not treat pictures that represent fields or frames differently. A sequence of pictures that represent fields would therefore be coded with the picture dimensions of an individual field. For example, pictures that represent 1080i fields would commonly have cropped output dimensions of 1920×540, while the sequence picture rate would commonly express the rate of the source fields (typically between 50 and 60 Hz), instead of the source frame rate (typically between 25 and 30 Hz).

sps_vui_parameters_present_flag equal to 1 specifies that the syntax structure vui_payload( ) is present in the SPS RBSP syntax structure. sps_vui_parameters_present_flag equal to 0 specifies that the syntax structure vui_payload( ) is not present in the SPS RBSP syntax structure.

When sps_vui_parameters_present_flag is equal to 0, the information conveyed in the vui_payload( ) syntax structure is considered unspecified or determined by the application by external means.

sps_vui_payload_size_minus1 plus 1 specifies the number of RBSP bytes in the vui_payload( ) syntax structure. The value of sps_vui_payload_size_minus1 shall be in the range of 0 to 1023, inclusive.

NOTE—The SPS NAL unit byte sequence containing the vui_payload( ) syntax structure might include one or more emulation prevention bytes (represented by emulation_prevention_three_byte syntax elements). Since the payload size of the vui_payload( ) syntax structure is specified in RBSP bytes, the quantity of emulation prevention bytes is not included in the size payloadSize of the vui_payload( ) syntax structure.

sps_vui_alignment_zero_bit shall be equal to 0.

sps_extension_flag equal to 0 specifies that no sps_extension_data_flag syntax elements are present in the SPS RBSP syntax structure. sps_extension_flag equal to 1 specifies that sps_extension_data_flag syntax elements might be present in the SPS RBSP syntax structure. sps_extension_flag shall be equal to 0 in bitstreams conforming to this version of this Specification. However, some use of sps_extension_flag equal to 1 could be specified in some future version of this Specification, and decoders conforming to this version of this Specification shall allow the value of sps_extension_flag equal to 1 to appear in the syntax.

sps_extension_data_flag could have any value. Its presence and value do not affect the decoding process specified in this version of this Specification. Decoders conforming to this version of this Specification shall ignore all sps_extension_data_flag syntax elements.

As further provided in Table 8, an SPS may contain a Profile, tier, and level (PTL) syntax structure. Further, each of a VPS and a DCI may contain a PTL syntax structure. Table 9 illustrates the Profile, tier, and level (PTL) syntax structure provided in JVET-T2001.

TABLE 9

| | Descriptor |
|---|---|
| profile_tier_level( profileTierPresentFlag, MaxNumSubLayersMinus1 ) { | |
|   if( profileTierPresentFlag ) { | |
|     general_profile_idc | u(7) |
|     general_tier_flag | u(1) |
|   } | |
|   general_level_idc | u(8) |
|   ptl_frame_only_constraint_flag | u(1) |
|   ptl_multilayer_enabled_flag | u(1) |
|   if( profileTierPresentFlag ) | |
|     general_constraints_info( ) | |
|   for( i = MaxNumSubLayersMinus1 − 1; i >= 0; i−− ) | |
|     ptl_sublayer_level_present_flag[ i ] | u(1) |
|   while( !byte_aligned( ) ) | |
|     ptl_reserved_zero_bit | u(1) |
|   for( i = MaxNumSubLayersMinus1 − 1; i >= 0; i−− ) | |
|     if( ptl_sublayer_level_present_flag[ i ] ) | |
|       sublayer_level_idc[ i ] | u(8) |
|   if( profileTierPresentFlag ) { | |
|     ptl_num_sub_profiles | u(8) |
|     for( i = 0; i < ptl_num_sub_profiles; i++ ) | |
|       general_sub_profile_idc[ i ] | u(32) |
|   } | |
| } | |

With respect to Table 9, JVET-T2001 provides the following semantics:

A profile_tier_level( ) syntax structure provides level information and, optionally, profile, tier, sub-profile, and general constraints information to which the OlsInScope conforms.

When the profile_tier_level( ) syntax structure is included in a VPS, the OlsInScope is one or more OLSs specified by the VPS. When the profile_tier_level( ) syntax structure is included in an SPS, the OlsInScope is the OLS that includes only the layer that is the lowest layer among the layers that refer to the SPS, and this lowest layer is an independent layer.

general_profile_idc indicates a profile to which OlsInScope conforms as specified. Bitstreams shall not contain values of general_profile_idc other than those specified. Other values of general_profile_idc are reserved for future use by ITU-T|ISO/IEC. Decoders shall ignore OLSs associated with a reserved value of general_profile_idc.

general_tier_flag specifies the tier context for the interpretation of general_level_idc as specified.

general_level_idc indicates a level to which OlsInScope conforms as specified. Bitstreams shall not contain values of general_level_idc other than those specified. Other values of general_level_idc are reserved for future use by ITU-T|ISO/IEC.

NOTE—A greater value of general_level_idc indicates a higher level. The maximum level signalled in the DCI NAL unit for OlsInScope could be higher but not be lower than the level signalled in the SPS for a CLVS contained within OlsInScope.

NOTE—When OlsInScope conforms to multiple profiles, general_profile_idc is expected to indicate the profile that provides the preferred decoded result or the preferred bitstream identification, as determined by the encoder (in a manner not specified in this Specification).

NOTE—When the CVSs of OlsInScope conform to different profiles, multiple profile_tier_level( ) syntax structures could be included in the DCI NAL unit such that for each CVS of the OlsInScope there is at least one set of indicated profile, tier, and level for a decoder that is capable of decoding the CVS.

ptl_frame_only_constraint_flag equal to 1 specifies that sps_field_seq_flag for all pictures in OlsInScope shall be equal to 0. ptl_frame_only_constraint_flag equal to 0 does not impose such a constraint.

NOTE—Decoders could ignore the value of ptl_frame_only_constraint_flag, as there are no decoding process requirements associated with it.

ptl_multilayer_enabled_flag equal to 1 specifies that the CVSs of OlsInScope might contain more than one layer. ptl_multilayer_enabled_flag equal to 0 specifies that all slices in OlsInScope shall have the same value of nuh_layer_id, i.e., there is only one layer in the CVSs of OlsInScope.

ptl_sublayer_level_present_flag[i] equal to 1 specifies that level information is present in the profile_tier_level( ) syntax structure for the sublayer representation with TemporalId equal to i. ptl_sublayer_level_present_flag[i] equal to 0 specifies that level information is not present in the profile_tier_level( ) syntax structure for the sublayer representation with TemporalId equal to i.

ptl_reserved_zero_bit shall be equal to 0. The value 1 for ptl_reserved_zero_bit is reserved for future use by ITU T|ISO/IEC. Decoders conforming to this version of this Specification shall ignore the value of ptl_reserved_zero_bit.

The semantics of the syntax element sublayer_level_idc[i] is, apart from the specification of the inference of not present values, the same as the syntax element general_level_idc, but apply to the sublayer representation with TemporalId equal to i.

When not present, the value of sublayer_level_idc[i] is inferred as follows:

The value of sublayer_level_idc[MaxNumSubLayersMinus1] is inferred to be equal to general_level_idc of the same profile_tier_level( ) structure, For i from MaxNumSubLayersMinus1−1 to 0 (in decreasing order of values of i), inclusive, sublayer_level_idc[i] is inferred to be equal to sublayer_level_idc[i+1].

ptl_num_sub_profiles specifies the number of the general_sub_profile_idc[i] syntax elements.

general_sub_profile_idc[i] specifies the i-th interoperability indicator registered as specified by Rec. ITU-T T.35, the contents of which are not specified in this Specification As provided above, a PTL syntax structure may include a general constraints information syntax structure (general_constraints_info( )). Table 10 illustrates the general_constraints_info( ) syntax structure provided in JVET-T2001.

TABLE 10

|  | Descriptor |
| --- | --- |
| general_constraints_info( ) { |  |
|   gci_present_flag | u(1) |
|   if( gci_present_flag ) { |  |
|   /* general */ |  |
|     gci_intra_only_constraint_flag | u(1) |
|     gci_all_layers_independent_constraint_flag | u(1) |
|     gci_one_au_only_constraint_flag | u(1) |
|   /* picture format */ |  |
|     gci_sixteen_minus_max_bitdepth_constraint_idc | u(4) |
|     gci_three_minus_max_chroma_format_constraint_idc | u(2) |
|   /* NAL unit type related */ |  |
|     gci_no_mixed_nalu_types_in_pic_constraint_flag | u(1) |
|     gci_no_trail_constraint_flag | u(1) |
|     gci_no_stsa_constraint_flag | u(1) |
|     gci_no_rasl_constraint_flag | u(1) |
|     gci_no_radl_constraint_flag | u(1) |
|     gci_no_idr_constraint_flag | u(1) |
|     gci_no_cra_constraint_flag | u(1) |
|     gci_no_gdr_constraint_flag | u(1) |
|     gci_no_aps_constraint_flag | u(1) |
|     gci_no_idr_rpl_constraint_flag | u(1) |
|   /* tile, slice, subpicture partitioning */ |  |
|     gci_one_tile_per_pic_constraint_flag | u(1) |
|     gci_pic_header_in_slice_header_constraint_flag | u(1) |
|     gci_one_slice_per_pic_constraint_flag | u(1) |
|     gci_no_rectangular_slice_constraint_flag | u(1) |
|     gci_one_slice_per_subpic_constraint_flag | u(1) |
|     gci_no_subpic_info_constraint_flag | u(1) |
|   /* CTU and block partitioning */ |  |
|     gci_three_minus_max_log2_ctu_size_constraint_idc | u(2) |
|     gci_no_partition_constraints_override_constraint_flag | u(1) |

TABLE 10-continued

| | Descriptor |
|---|---|
|     gci_no_mtt_constraint_flag | u(1) |
|     gci_no_qtbtt_dual_tree_intra_constraint_flag | u(1) |
|     /* intra */ | |
|     gci_no_palette_constraint_flag | u(1) |
|     gci_no_ibc_constraint_flag | u(1) |
|     gci_no_isp_constraint_flag | u(1) |
|     gci_no_mrl_constraint_flag | u(1) |
|     gci_no_mip_constraint_flag | u(1) |
|     gci_no_cclm_constraint_flag | u(1) |
|     /* inter */ | |
|     gci_no_ref_pic_resampling_constraint_flag | u(1) |
|     gci_no_res_change_in_clvs_constraint_flag | u(1) |
|     gci_no_weighted_prediction_constraint_flag | u(1) |
|     gci_no_ref_wraparound_constraint_flag | u(1) |
|     gci_no_temporal_mvp_constraint_flag | u(1) |
|     gci_no_sbtmvp_constraint_flag | u(1) |
|     gci_no_amvr_constraint_flag | u(1) |
|     gci_no_bdof_constraint_flag | u(1) |
|     gci_no_smvd_constraint_flag | u(1) |
|     gci_no_dmvr_constraint_flag | u(1) |
|     gci_no_mmvd_constraint_flag | u(1) |
|     gci_no_affine_motion_constraint_flag | u(1) |
|     gci_no_prof_constraint_flag | u(1) |
|     gci_no_bcw_constraint_flag | u(1) |
|     gci_no_ciip_constraint_flag | u(1) |
|     gci_no_gpm_constraint_flag | u(1) |
|     /* transform, quantization, residual */ | |
|     gci_no_luma_transform_size_64_constraint_flag | u(1) |
|     gci_no_transform_skip_constraint_flag | u(1) |
|     gci_no_bdpcm_constraint_flag | u(1) |
|     gci_no_mts_constraint_flag | u(1) |
|     gci_no_lfnst_constraint_flag | u(1) |
|     gci_no_joint_cbcr_constraint_flag | u(1) |
|     gci_no_sbt_constraint_flag | u(1) |
|     gci_no_act_constraint_flag | u(1) |
|     gci_no_explicit_scaling_list_constraint_flag | u(1) |
|     gci_no_dep_quant_constraint_flag | u(1) |
|     gci_no_sign_data_hiding_constraint_flag | u(1) |
|     gci_no_cu_qp_delta_constraint_flag | u(1) |
|     gci_no_chroma_qp_offset_constraint_flag | u(1) |
|     /* loop filter */ | |
|     gci_no_sao_constraint_flag | u(1) |
|     gci_no_alf_constraint_flag | u(1) |
|     gci_no_ccalf_constraint_flag | u(1) |
|     gci_no_lmcs_constraint_flag | u(1) |
|     gci_no_ladf_constraint_flag | u(1) |
|     gci_no_virtual_boundaries_constraint_flag | u(1) |
|     gci_num_reserved_bits | u(8) |
|     for( i = 0; i < gci_num_reserved_bits; i++ ) | |
|        gci_reserved_zero_bit[ i ] | u(1) |
| } | |
| while( !byte_aligned( ) ) | |
|     gci_alignment_zero_bit | f(1) |
| } | |

With respect to Table 10, JVET-T2001 provides the following semantics:

gci_present_flag equal to 1 specifies that GCI syntax elements are present in the general_constraints_info( ) syntax structure. gci_present_flag equal to 0 specifies that GCI fields are not present in the general_constraints_info( ) syntax structure.

The semantics of the GCI syntax elements specified in this clause apply when gci_present_flag is equal to 1. When gci_present_flag is equal to 0, the general_constraint_info( ) syntax structure does not impose any constraint.

gci_intra_only_constraint_flag equal to 1 specifies that sh_slice_type for all slices in OlsInScope shall be equal to 2. gci_intra_only_constraint_flag equal to 0 does not impose such a constraint.

gci_all_layers_independent_constraint_flag equal to 1 specifies that vps_all_independent_layers_flag for all pictures in OlsInScope shall be equal to 1. gci_all_layers_independent_constraint_flag equal to 0 does not impose such a constraint.

gci_one_au_only_constraint_flag equal to 1 specifies that there is only one AU in OlsInScope. gci_one_au_only_constraint_flag equal to 0 does not impose such a constraint.

gci_sixteen_minus_max_bitdepth_constraint_idc greater than 0 specifies that sps_bitdepth_minus8 plus 8 for all pictures in OlsInScope shall be in the range of 0 to 16—gci_sixteen_minus_max_bitdepth_constraint_idc, inclusive. gci_sixteen_minus_max_bitdepth_constraint_idc equal to 0 does not impose a constraint. The value of gci_sixteen_minus_max_bitdepth_constraint_idc shall be in the range of 0 to 8, inclusive.

gci_three_minus_max_chroma_format_constraint_idc greater than 0 specifies that sps_chroma_format_idc for all pictures in OlsInScope shall be in the range of 0 to 3—gci_three_minus_max_chroma_format_constraint_idc, inclusive. gci_three_minus_max_chroma_format_constraint_idc equal to 0 does not impose a constraint.

gci_no_mixed_nalu_types_in_pic_constraint_flag equal to 1 specifies that pps_mixed_nalu_types_in_pic_flag for all pictures in OlsInScope shall be equal to 0. gci_no_mixed_nalu_types_in_pic_constraint_flag equal to 0 does not impose such a constraint.

gci_no_trail_constraint_flag equal to 1 specifies that there shall be no NAL unit with nuh_unit_type equal to TRAIL_NUT present in OlsInScope. gci_no_trail_constraint_flag equal to 0 does not impose such a constraint.

gci_no_stsa_constraint_flag equal to 1 specifies that there shall be no NAL unit with nuh_unit_type equal to STSA_NUT present in OlsInScope. gci_no_stsa_constraint_ flag equal to 0 does not impose such a constraint.

gci_no_rasl_constraint_flag equal to 1 specifies that there shall be no NAL unit with nuh_unit_type equal to RASL_NUT present in OlsInScope. gci_no_rasl_constraint_flag equal to 0 does not impose such a constraint.

gci_no_radl_constraint_flag equal to 1 specifies that there shall be no NAL unit with nuh_unit_type equal to RADL_NUT present in OlsInScope. gci_no_radl_constraint_flag equal to 0 does not impose such a constraint.

gci_no_idr_constraint_flag equal to 1 specifies that there shall be no NAL unit with nuh_unit_type equal to IDR_W_RADL or IDR_N_LP present in OlsInScope. gci_no_idr_constraint_flag equal to 0 does not impose such a constraint.

gci_no_cra_constraint_flag equal to 1 specifies that there shall be no NAL unit with nuh_unit_type equal to CRA_NUT present in OlsInScope. gci_no_cra_constraint_flag equal to 0 does not impose such a constraint.

gci_no_gdr_constraint_flag equal to 1 specifies that sps_gdr_enabled_flag for all pictures in OlsInScope shall be equal to 0. gci_no_gdr_constraint_flag equal to 0 does not impose such a constraint.

gci_no_aps_constraint_flag equal to 1 specifies that there shall be no NAL unit with nuh_unit_type equal to PREFIX_APS_NUT or SUFFIX_APS_NUT present in OlsInScope, sps_ccalf_enabled_flag, sps_lmcs_enabled_flag, sps_explicit_scaling_list_enabled_flag, ph_num_alf_aps_ids_luma, ph_alf_cb_enabled_flag, and ph_alf_cr_enabled_flag for all pictures in OlsInScope shall all be equal to 0, and sh_num_alf_aps_ids_luma, sh_alf_cb_enabled_flag, sh_alf_cr_enabled_flag for all slices in OlsInScope shall be equal to 0. gci_no_aps_constraint_flag equal to 0 does not impose such a constraint.

NOTE—When no APS is referenced, it is still possible to set sps_alf_enabled_flag equal to 1 and use ALF. Therefore, when gci_no_aps_constraint_flag is equal to 1, sps_alf_enabled_flag is not required to be equal to 0.

gci_no_idr_rpl_constraint_flag equal to 1 specifies that sps_idr_rpl_present_flag for all pictures in OlsInScope shall be equal to 0. gci_no_idr_rpl_constraint_flag equal to 0 does not impose such a constraint.

gci_one_tile_per_pic_constraint_flag equal to 1 specifies that each picture in OlsInScope shall contain only one tile, i.e., the value of NumTilesInPic for each picture shall be equal to 1. gci_one_tile_per_pic_constraint_flag equal to 0 does not impose such a constraint.

gci_pic_header_in_slice_header_constraint_flag equal to 1 specifies that each picture in OlsInScope shall contain only one slice and the value of sh_picture_header_in_slice_header_flag in each slice in OlsInScope shall be equal to 1. gci_pic_header_in_slice_header_constraint_flag equal to 0 does not impose such a constraint.

gci_one_slice_per_pic_constraint_flag equal to 1 specifies that each picture in OlsInScope shall contain only one slice, i.e., if pps_rect_slice_flag is equal to 1, the value of num_slices_in_pic_minus1 for each picture in OlsInScope shall be equal to 0, otherwise, the value of num_tiles_in_slice_minus1 present in each slice header in OlsInScope shall be equal to NumTilesInPic−1. gci_one_slice_per_pic_constraint_flag equal to 0 does not impose such a constraint.

gci_no_rectangular_slice_constraint_flag equal to 1 specifies that pps_rect_slice_flag for all pictures in OlsInScope shall be equal to 0. gci_no_rectangular_slice_constraint_flag equal to 0 does not impose such a constraint.

gci_one_slice_per_subpic_constraint_flag equal to 1 specifies that the value of pps_single_slice_per_subpic_flag for all pictures in OlsInScope shall be equal to 1, gci_one_slice_per_subpic_constraint_flag equal to 0 does not impose such a constraint.

gci_no_subpic_info_constraint_flag equal to 1 specifies that sps_subpic_info_present_flag for all pictures in OlsInScope shall be equal to 0. gci_no_subpic_info_constraint_flag equal to 0 does not impose such a constraint.

gci_three_minus_max_log 2_ctu_size_constraint_idc greater than 0 specifies that sps_log 2_ctu_size_minus5 for all pictures in OlsInScope shall be in the range of 0 to 3—gci_three_minus_max_log 2_ctu_size_constraint_idc, inclusive. gci_three_minus_max_log 2_ctu_size_constraint_idc equal to 0 does not impose such a constraint.

gci_no_partition_constraints_override_constraint_flag equal to 1 specifies that sps_partition_constraints_override_enabled_flag for all pictures in OlsInScope shall be equal to 0. gci_no_partition_constraints_override_constraint_flag equal to 0 does not impose such a constraint.

gci_no_mtt_constraint_flag equal to 1 specifies that sps_max_mtt_hierarchy_depth_intra_slice_luma, sps_max_mtt_hierarchy_depth_inter_slice, and sps_max_mtt_hierarchy_depth_intra_slice_chroma for all pictures in OlsInScope shall be equal to 0. gci_no_mtt_constraint_flag equal to 0 does not impose such a constraint.

gci_no_qtbtt_dual_tree_intra_constraint_flag equal to 1 specifies that sps_qtbtt_dual_tree_intra_flag for all pictures in OlsInScope shall be equal to 0. gci_no_qtbtt_dual_tree_intra_constraint_flag equal to 0 does not impose such a constraint.

gci_no_palette_constraint_flag equal to 1 specifies that sps_palette_enabled_flag for all pictures in OlsInScope shall be equal to 0. gci_no_palette_constraint_flag equal to 0 does not impose such a constraint.

gci_no_ibc_constraint_flag equal to 1 specifies that sps_ibc_enabled_flag for all pictures in OlsInScope shall be equal to 0. gci_no_ibc_constraint_flag equal to 0 does not impose such a constraint.

gci_no_isp_constraint_flag equal to 1 specifies that sps_isp_enabled_flag for all pictures in OlsInScope shall be equal to 0. gci_no_isp_constraint_flag equal to 0 does not impose such a constraint.

gci_no_mrl_constraint_flag equal to 1 specifies that sps_mrl_enabled_flag for all pictures in OlsInScope shall be equal to 0. gci_no_mrl_constraint_flag equal to 0 does not impose such a constraint.

gci_no_mip_constraint_flag equal to 1 specifies that sps_mip_enabled_flag for all pictures in OlsInScope shall be equal to 0. gci_no_mip_constraint_flag equal to 0 does not impose such a constraint.

gci_no_cclm_constraint_flag equal to 1 specifies that sps_cclm_enabled_flag for all pictures in OlsInScope shall be equal to 0. gci_no_cclm_constraint_flag equal to 0 does not impose such a constraint.

gci_no_ref_pic_resampling_constraint_flag equal to 1 specifies that sps_ref_pic_resampling_enabled_flag for all pictures in OlsInScope shall be equal to 0. gci_no_ref_pic_resampling_constraint_flag equal to 0 does not impose such a constraint.

gci_no_res_change_in_clvs_constraint_flag equal to 1 specifies that aps_res_change_in_clvs_allowed_flag for all pictures in OlsInScope shall be equal to 0. gci_no_res_change_in_clvs_constraint_flag equal to 0 does not impose such a constraint.

gci_no_weighted_prediction_constraint_flag equal to 1 specifies that sps_weighted_pred_flag and sps_weighted_bipred_flag for all pictures in OlsInScope shall both be equal to 0. gci_no_weighted_prediction_constraint_flag equal to 0 does not impose such a constraint.

gci_no_ref_wraparound_constraint_flag equal to 1 specifies that sps_ref_wraparound_enabled_flag for all pictures in OlsInScope shall be equal to 0. gci_no_ref_wrapaound_constraint_flag equal to 0 does not impose such a constraint.

gci_no_temporal_mvp_constraint_flag equal to 1 specifies that sps_temporal_mvp_enabled_flag for all pictures in OlsInScope shall be equal to 0. gci_no_temporal_mvp_constraint_flag equal to 0 does not impose such a constraint.

gci_no_sbtmvp_constraint_flag equal to 1 specifies that sps_sbtmvp_enabled_flag for all pictures in OlsInScope shall be equal to 0. gci_no_sbtmvp_constraint_flag equal to 0 does not impose such a constraint.

gci_no_amvr_constraint_flag equal to 1 specifies that sps_amvr_enabled_flag for all pictures in OlsInScope shall be equal to 0. gci_no_amvr_constraint_flag equal to 0 does not impose such a constraint.

gci_no_bdof_constraint_flag equal to 1 specifies that sps_bdof_enabled_flag for all pictures in OlsInScope shall be equal to 0. gci_no_bdof_constraint_flag equal to 0 does not impose such a constraint.

gci_no_smvd_constraint_flag equal to 1 specifies that sps_smvd_enabled_flag for all pictures in OlsInScope shall be equal to 0. gci_no_smvd_constraint_flag equal to 0 does not impose such a constraint.

gci_no_dmvr_constraint_flag equal to 1 specifies that sps_dmvr_enabled_flag for all pictures in OlsInScope shall be equal to 0. gci_no_dmvr_constraint_flag equal to 0 does not impose such a constraint.

gci_no_mmvd_constraint_flag equal to 1 specifies that sps_mmvd_enabled_flag for all pictures in OlsInScope shall be equal to 0. gci_no_mmvd_constraint_flag equal to 0 does not impose such a constraint.

gci_no_affine_motion_constraint_flag equal to 1 specifies that sps_affine_enabled_flag for all pictures in OlsInScope shall be equal to 0. gci_no_affine_motion_constraint_flag equal to 0 does not impose such a constraint.

gci_no_prof_constraint_flag equal to 1 specifies that sps_affine_prof_enabled_flag for all pictures in OlsInScope shall be equal to 0. gci_no_prof_constraint_flag equal to 0 does not impose such a constraint.

gci_no_bcw_constraint_flag equal to 1 specifies that sps_bcw_enabled_flag for all pictures in OlsInScope shall be equal to 0. gci_no_bcw_constraint_flag equal to 0 does not impose such a constraint.

gci_no_ciip_constraint_flag equal to 1 specifies that sps_ciip_enabled_flag for all pictures in OlsInScope shall be equal to 0. gci_no_ciip_constraint_flag equal to 0 does not impose such a constraint.

gci_no_gpm_constraint_flag equal to 1 specifies that sps_gpm_enabled_flag for all pictures in OlsInScope shall be equal to 0. gci_no_gpm_constraint_flag equal to 0 does not impose such a constraint.

gci_no_luma_transform_size_64_constraint_flag equal to 1 specifies that sps_max_luma_transform_size_64_flag for all pictures in OlsInScope shall be equal to 0. gci_no_luma_transform_size_64_constraint_flag equal to 0 does not impose such a constraint.

gci_no_transform_skip_constraint_flag equal to 1 specifies that sps_transform_skip_enabled_flag for all pictures in OlsInScope shall be equal to 0. gci_no_transform_skip_constraint_flag equal to 0 does not impose such a constraint.

gci_no_bdpcm_constraint_flag equal to 1 specifies that sps_bdpcm_enabled_flag for all pictures in OlsInScope shall be equal to 0. gci_no_bdpcm_constraint_flag equal to 0 does not impose such a constraint.

gci_no_mts_constraint_flag equal to 1 specifies that sps_mts_enabled_flag for all pictures in OlsInScope shall be equal to 0. gci_no_mts_constraint_flag equal to 0 does not impose such a constraint.

gci_no_lfnst_constraint_flag equal to 1 specifies that sps_lfnst_enabled_flag for all pictures in OlsInScope shall be equal to 0. gci_no_lfnst_constraint_flag equal to 0 does not impose such a constraint.

gci_no_joint_cbcr_constraint_flag equal to 1 specifies that sps_joint_cbcr_enabled_flag for all pictures in OlsInScope shall be equal to 0. gci_no_joint_cbcr_constraint_flag equal to 0 does not impose such a constraint.

gci_no_sbt_constraint_flag equal to 1 specifies that sps_sbt_enabled_flag for all pictures in OlsInScope shall be equal to 0. gci_no_sbt_constraint_flag equal to 0 does not impose such a constraint.

gci_no_act_constraint_flag equal to 1 specifies that sps_act_enabled_flag for all pictures in OlsInScope shall be equal to 0. gci_no_act_constraint_flag equal to 0 does not impose such a constraint.

gci_no_explicit_scaling_list_constraint_flag equal to 1 specifies that sps_explicit_scaling_list_enabled_flag for all pictures in OlsInScope shall be equal to 0. gci_no_explicit_scaling_list_constraint_flag equal to 0 does not impose such a constraint.

gci_no_dep_quant_constraint_flag equal to 1 specifies that sps_dep_quant_enabled_flag for all pictures in OlsInScope shall be equal to 0. gci_no_dep_quant_constraint_flag equal to 0 does not impose such a constraint.

gci_no_sign_data_hiding_constraint_flag equal to 1 specifies that sps_sign_data_hiding_enabled_flag for all pictures in OlsInScope shall be equal to 0. gci_no_sign_data_hiding_constraint_flag equal to 0 does not impose such a constraint.

gci_no_cu_qp_delta_constraint_flag equal to 1 specifies that pps_cu_qp_delta_enabled_flag for all pictures in OlsInScope shall be equal to 0. gci_no_cu_qp_delta_constraint_flag equal to 0 does not impose such a constraint.

gci_no_chroma_qp_offset_constraint_flag equal to 1 specifies that pps_cu_chroma_qp_offset_list_enabled_flag for all pictures in OlsInScope shall be equal to 0. gci_no_chroma_qp_offset_constraint_flag equal to 0 does not impose such a constraint.

gci_no_sao_constraint_flag equal to 1 specifies that sps_sao_enabled_flag for all pictures in OlsInScope shall be equal to 0. gci_no_sao_constraint_flag equal to 0 does not impose such a constraint.

gci_no_alf_constraint_flag equal to 1 specifies that sps_alf_enabled_flag for all pictures in OlsInScope shall be equal to 0. gci_no_alf_constraint_flag equal to 0 does not impose such a constraint.

gd_no_ccalf_constraint_flag equal to 1 specifies that sps_ccalf_enabled_flag for all pictures in OlsInScope shall be equal to 0. gci_no_ccalf_constraint_flag equal to 0 does not impose such a constraint.

gci_no_lmcs_constraint_flag equal to 1 specifies that sps_lmcs_enabled_flag for all pictures in OlsInScope shall be equal to 0. gci_no_lmcs_constraint_flag equal to 0 does not impose such a constraint.

gci_no_ladf_constraint_flag equal to 1 specifies that sps_ladf_enabled_flag for all pictures in OlsInScope shall be equal to 0. gci_no_ladf_constraint_flag equal to 0 does not impose such a constraint.

gci_no_virtual_boundaries_constraint_flag equal to 1 specifies that sps_virtual_boundaries_enabled_flag for all pictures in OlsInScope shall be equal to 0. gci_no_virtual_boundaries_constraint_flag equal to 0 does not impose such a constraint.

gci_num_reserved_bits specifies the number of the reserved GCI bits. The value of gci_num_reserved_bits shall be equal to 0 in bitstreams conforming to this version of this Specification. Other values of gci_num_reserved_bits are reserved for future use by ITU-T|ISO/IEC. Although the value of gci_num_reserved_bits is required to be equal to 0 in this version of this Specification, decoders conforming to this version of this Specification shall allow the value of gci_num_reserved_bits greater than 0 to appear in the syntax and shall ignore the values of all the gci_reserved_zero_bit [i] syntax elements when gci_num_reserved_bits is greater than 0.

gci_reserved_zero_bit[i] could have any value. Its presence and value do not affect the decoding process specified in this version of this Specification. Decoders conforming to this version of this Specification shall ignore the values of all the gci_reserved_zero_bit[i] syntax elements.

gci_alignment_zero_bit shall be equal to 0.

Thus, according to JVET-T2001, profiles, tiers and levels specify restrictions on bitstreams and hence limits on the capabilities needed to decode the bitstreams. Profiles, tiers and levels are also used to indicate the capability of individual decoder implementations and interoperability points between encoders and decoders. With respect to profiles, tiers, and levels, JVET-T2001 provides the following in Annex A:

General Tier and Level Limits

For purposes of comparison of tier capabilities, the tier with general_tier_flag equal to 0 (i.e., the Main tier) is considered to be a lower tier than the tier with general_tier_flag equal to 1 (i.e., the High tier).

For purposes of comparison of level capabilities, a particular level of a specific tier is considered to be a lower level than some other level of the same tier when the value of the general_level_idc or sublayer_level_idc[i] of the particular level is less than that of the other level.

The following is specified for expressing the constraints in this annex:

Let AU n be the n-th AU in decoding order, with the first AU being AU 0 (i.e., the 0-th AU).

For an OLS with OLS index TargetOlsIdx, the variables PicWidthMaxInSamplesY, PicHeightMaxInSamplesY, and PicSizeMaxInSamplesY, and the applicable dpb_parameters( ) syntax structure are derived as follows:

IfNumLayersInOls[TargetOlsIdx] is equal to 1, PicWidthMaxInSamplesY is set equal to sps_pic_width_max_in_luma_samples, PicHeightMaxInSamplesY is set equal to sps_pic_height_max_in_luma_samples, and PicSizeMaxInSamplesY is set equal to PicWidthMaxInSamplesY*PicHeightMaxInSamplesY, where sps_pic_width_max_in_luma_samples and sps_pic_height_max_in_luma_samples are found in the SPS referred to by the layer in the OLS, and the applicable dpb_parameters( ) syntax structure is also found in that SPS.

Otherwise (NumLayersInOls[TargetOlsIdx] is greater than 1), PicWidthMaxInSamplesY is set equal to vps_ols_dpb_pic_width[MultiLayerOlsIdx[TargetOlsIdx]], PicHeightMaxInSamplesY is set equal to vps_ols_dpb_pic_height[MultiLayerOlsIdx[TargetOlsIdx]], PicSizeMaxInSamplesY is set equal to PicWidthMaxInSamplesY*PicHeightMaxInSamplesY, and the applicable dpb_parameters( ) syntax structure is identified by vps_ols_dpb_params_idx[MultiLayerOlsIdx[TargetOlsIdx]] found in the VPS.

Table 11 specifies the limits for each level of each tier for levels other than level 15.5.

When the specified level is not level 15.5, bitstreams conforming to a profile at a specified tier and level shall obey the following constraints for each bitstream conformance test as specified:

a) PicSizeMaxInSamplesY shall be less than or equal to MaxLumaPs, where MaxLumaPs is specified in Table 11.

b) The value of PicWidthMaxInSamplesY shall be less than or equal to Sqrt(MaxLumaPs*8).

c) The value of PicHeightMaxInSamplesY shall be less than or equal to Sqrt(MaxLumaPs*8).

d) For each referenced PPS, the value of NumTileColumns shall be less than or equal to MaxTileCols and the value of NumTilesInPic shall be less than or equal to MaxTilesPerAu, where MaxTileCols and MaxTilesPerAu are specified in Table 11.

e) For each referenced PPS, the value of ColWidthVal[i]* CtbSizeY, for each i in the range of 0 to NumTileColumns−1, inclusive, shall be less than or equal to 0.5*Sqrt(Max(level4Val, MaxLumaPs)*8), where MaxLumaPs is specified in Table 7 and level4Val is equal to 2 228 224.

NOTE—The maximum tile width in luma samples is also less than or equal to the picture width, which is less than or equal to Sqrt(MaxLumaPs*8).

f) For the VCL HRD parameters, CpbSize[Htid][i] shall be less than or equal to CpbVclFactor*MaxCPB for at least one value of i in the range of 0 to hrd_cpb_cnt_minus1, inclusive, where CpbSize[Htid][i] is specified based on parameters selected, CpbVclFactor is specified in Table 13 and MaxCPB is specified in Table 11 in units of CpbVclFactor bits.

g) For the NAL HRD parameters, CpbSize[Htid][i] shall be less than or equal to CpbNalFactor*MaxCPB for at least one value of i in the range of 0 to hrd_cpb_cnt_minus1, inclusive, where CpbSize[Htid][i] is specified based on parameters selected, CpbNalFactor is specified in Table 13, and MaxCPB is specified in Table 11 in units of CpbNalFactor bits.

A tier and level to which a bitstream conforms are indicated by the syntax cements general_tier_flag and general_level_idc, and a level to which a sublayer representation conforms are indicated by the syntax element sublayer_level_idc[i], as follows:

If the specified level is not level 15.5, general_tier_flag equal to 0 indicates conformance to the Main tier, general_tier_flag equal to 1 indicates conformance to the High tier, according to the tier constraints specified in Table 11 and general_tier_flag shall be equal to 0 for levels below level 4 (corresponding to the entries in Table 8 marked with "–"). Otherwise (the specified level is level 15.5), it is a requirement of bitstream conformance that general_tier_flag shall be equal to 1 and the value 0 for general_tier_flag is reserved for future use by TTU-T|ISO/IEC and decoders shall ignore the value of general_tier_flag.

general_level_idc and sublayer_level_idc[i] shall be set equal to a value of general_level_idc for the level number specified in Table 11.

Bitstreams conforming to the Main 10, Main 10 4:4:4, Multilayer Main 10, or Multilayer Main 10 4:4:4 profile at a specified tier and level shall obey the following constraints for each bitstream conformance test:

a) The nominal removal time of AU n (with n greater than 0) from the CPB, as specified, shall satisfy the constraint that AuNominalRemovalTime[n]−AuCpbRemovalTime[n−1] is greater than or equal to Max (AuSizeMaxInSamplesY[n−1]÷MaxLumaSr, FrVal), where MaxLumaSr is the value specified in Table 12 that applies to AU n−1.

TABLE 11

| Level | general_level_idc value* | Max luma picture size MaxLumaPs (samples) | Max CPB size MaxCPB (CpbVclFactor or CpbNalFactor bits) Main tier | Max CPB size MaxCPB (CpbVclFactor or CpbNalFactor bits) High tier | Max slices per AU MaxSlicesPerAu | Max # of tile MaxTilesPerAu | Max # of tile columns MaxTileCols |
|---|---|---|---|---|---|---|---|
| 1.0 | 16 | 36 864 | 350 | — | 16 | 1 | 1 |
| 2.0 | 32 | 122 880 | 1 500 | — | 16 | 1 | 1 |
| 2.1 | 35 | 245 760 | 3 000 | — | 20 | 1 | 1 |
| 3.0 | 48 | 552 960 | 6 000 | — | 30 | 4 | 2 |
| 3.1 | 51 | 983 040 | 10 000 | — | 40 | 9 | 3 |
| 4.0 | 64 | 2 228 224 | 12 000 | 30 000 | 75 | 25 | 5 |
| 4.1 | 67 | 2 228 224 | 20 000 | 50 000 | 75 | 25 | 5 |
| 5.0 | 80 | 8 912 896 | 25 000 | 100 000 | 200 | 110 | 10 |
| 5.1 | 83 | 8 912 896 | 40 000 | 160 000 | 200 | 110 | 10 |
| 5.2 | 86 | 8 912 896 | 60 000 | 240 000 | 200 | 110 | 10 |
| 6.0 | 96 | 35 651 584 | 60 000 | 240 000 | 600 | 440 | 20 |
| 6.1 | 99 | 35 651 584 | 120 000 | 480 000 | 600 | 440 | 20 |
| 6.2 | 102 | 35 651 584 | 180 000 | 800 000 | 600 | 440 | 20 |

*The level numbers in this table are in the form of "majorNum.minorNum", and the value of general_level_idc for each of the levels is equal to majorNum * 16 + minorNum * 3.

Profile-Specific Level Limits

The following is specified for expressing the constraints in this annex:

Let the variable FrVal be set equal to 1÷300 if general_tier_flag is equal to 0 and set equal to 1÷960 otherwise.

The variable HbrFactor is defined as follows:

If the bitstream is indicated to conform to the Main 10, Main 10 4:4:4, Multilayer Main 10, or Multilayer Main 10 4:4:4 profile, HbrFactor is set equal to 1.

The variable BrVclFactor, which represents the VCL bit rate scale factor, is set equal to CpbVclFactor*HbrFactor.

The variable BrNalFactor, which represents the NAL bit rate scale factor, is set equal to CpbNalFactor*HbrFactor.

The variable MinCr is set equal to MinCrBase*MinCrScaleFactor÷HbrFactor.

When the specified level is not level 15.5, the value of dpb_max_dec_pic_buffering_minus1[Htid]+1 shall be less than or equal to MaxDpbSize, which is derived as follows:

```
if( 2 * PicSizeMaxInSamplesY <= MaxLumaPs )
    MaxDpbSize = 2 * maxDpbPicBuf
else if( 3 * PicSizeMaxInSamplesY <= 2 * MaxLumaPs )
    MaxDpbSize = 3 * maxDpbPicBuf / 2
else
    MaxDpbSize = maxDpbPicBuf
``` where MaxLumaPs is specified in Table 11, maxDpbPicBuf is equal to 8, and dpb_max_dec_pic_buffering_minus1[Htid] is found in or derived from the applicable dpb_parameters( ) syntax structure.

Let numDecPics be the number of pictures in AU n. The variable AuSizeMaxInSamplesY[n] is set equal to PicSizeMaxInSamplesY*numDecPics.

b) The difference between consecutive output times of pictures of different AUs from the DPB, as specified, shall satisfy the constraint that DpbOutputInterval[n] is greater than or equal to Max(AuSizeMaxInSamplesY [n]÷MaxLumaSr, FrVal), where MaxLumaSr is the value specified in Table 12 for AU n, provided that AU n has a picture that is output and AU n is not the last AU of the bitstream that has a picture that is output.

c) The removal time of AU 0 shall satisfy the constraint that the number of slices in AU 0 is less than or equal to Min(Max(1, MaxSlicesPerAu*MaxLumaSr/MaxLumaPs*(AuCpbRemovalTime[0]−AuNominalRemovalTime[0])+MaxSlicesPerAu*AuSizeMaxInSamplesY [0]/MaxLumaPs), MaxSlicesPerAu), where MaxSlicesPerAu, MaxLumaPs and MaxLumaSr are the values specified in Table 11 and Table 12, respectively, that apply to AU 0.

d) The difference between consecutive CPB removal times of AUs n and n−1 (with n greater than 0) shall satisfy the constraint that the number of slices in AU n is less than or equal to Min((Max(1, MaxSlicesPerAu*MaxLumaSr/MaxLumaPs*(AuCpbRemovalTime[n]−AuCpbRemovalTime[n−1])), MaxSlicesPerAu), where MaxSlicesPerAu, MaxLumaPs, and MaxLumaSr are the values specified in Table 11 and Table 12 that apply to AU n.

e) For the VCL HRD parameters, BitRate[Htid][i] shall be less than or equal to BrVclFactor*MaxBR for at least one value of i in the range of 0 to hrd_cpb_cnt_minus1, inclusive, where BitRate[Htid][i] is specified based on parameters selected as specified and MaxBR is specified in Table 12 in units of BrVclFactor bits/s.

f) For the NAL HRD parameters, BitRate[Htid][i] shall be less than or equal to BrNalFactor*MaxBR for at least one value of i in the range of 0 to hrd_cpb_cnt_minus1, inclusive, where BitRate[Htid][i] is specified based on parameters selected as specified and MaxBR is specified in Table 12 in units of BrNalFactor bits/s.

g) The sum of the NumBytesInNalUnit variables for AU 0 shall be less than or equal to FormatCapabilityFactor*(Max(AuSizeMaxInSamplesY[0], FrVal*MaxLumaSr)+MaxLumaSr*(AuCpbRemovalTime[0]−AuNominalRemovalTime[0]))÷MinCr, where MaxLumaSr and FormatCapabilityFactor are the values specified in Table 12 and Table 13, respectively, that apply to AU 0.

h) The sum of the NumBytesInNalUnit variables for AU n (with n greater than 0) shall be less than or equal to FormatCapabilityFactor MaxLumaSr*(AuCpbRemovalTime[n]−AuCpbRemovalTime[n−1])÷MinCr, where MaxLumaSr and FormatCapabilityFactor are the values specified in Table 12 and Table 13 respectively, that apply to AU n.

i) The removal time of AU 0 shall satisfy the constraint that the number of tiles in AU 0 is less than or equal to Min(Max(1, MaxTilesPerAu*120*(AuCpbRemovalTime[0]−AuNominalRemovalTime[0])+ MaxTilesPerAu*AuSizeMaxInSamplesY[0]/MaxLumaPs), MaxTilesPerAu), where MaxTilesPerAu is the value specified in Table 11 that applies to AU 0.

j) The difference between consecutive CPB removal times of AUs n and n−1 (with n greater than 0) shall satisfy the constraint that the number of tiles in AU n is less than or equal to Min(Max(1, MaxTilesPerAu*120* (AuCpbRemovalTime[n]−AuCpbRemovalTime[n−1])), MaxTilesPerAu), where MaxTilesPerAu is the value specified in Table 11 that apply to AU n.

According to Annex A of JVET-T2001, the maximum value for NumBytesInNalUnit in bits may be derived using:

$$8 * FormatCapabilityFactor * MaxLumaSr / frameRate / MinCr$$

Thus, for example, for Main 10, Main Tier, Level 5.1 and a frame rate equal to 24 fps, the maximum value for NumBytesInNalUnit in bits shall be less than or equal to 41,779,200 bits and for Main 10, Main Tier, Level 6.1 and a frame rate equal to 24 fps, the maximum value for NumBytesInNalUnit in bits shall be less than or equal to 167,116,800 bits. However, the maximum value for NumBytesInNalUnit is also limited according to a MaxCPB size, that is, a CPB is not allowed to overflow, so a NAL unit may not be greater than a CPB. As provided in Table 11, for Main 10, Main Tier, Level 5.1, MaxCPB size is 40,000,000 bits and for Main 10, Main Tier, Level 6.1, MaxCPB size 120,000,000 bits. It should be noted that software entropy decoding may be expected to achieve a throughput of 40 Mbps. Thus, for the worst case scenarios for software entropy decoding (where entropy decoding is performed in serial for the entire maximum size NAL unit) of Main 10, Main Tier, Level 5.1 and Main 10, Main Tier, Level 6.1, the expected times to entropy decode the NAL units would respectively be 1 second and 3 seconds. Such decoding latency times may be less than ideal for numerous applications.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and

TABLE 12

| Level | Max luma sample rate MaxLumaSr (samples/sec) | Max bit rate MaxBR (BrVclFactor or BrNalFactor bits/s) | | Min compression ratio MinCrBase | |
|---|---|---|---|---|---|
| | | Main tier | High tier | Main tier | High tier |
| 1.0 | 552 960 | 128 | — | 2 | 2 |
| 2.0 | 3 686 400 | 1 500 | — | 2 | 2 |
| 2.1 | 7 372 800 | 3 000 | — | 2 | 2 |
| 3.0 | 16 588 800 | 6 000 | — | 2 | 2 |
| 3.1 | 33 177 600 | 10 000 | — | 2 | 2 |
| 4.0 | 66 846 720 | 12 000 | 30 000 | 4 | 4 |
| 4.1 | 133 693 440 | 20 000 | 50 000 | 4 | 4 |
| 5.0 | 267 386 880 | 25 000 | 100 000 | 6 | 4 |
| 5.1 | 534 773 760 | 40 000 | 160 000 | 8 | 4 |
| 5.2 | 1 069 547 520 | 60 000 | 240 000 | 8 | 4 |
| 6.0 | 1 069 547 520 | 60 000 | 240 000 | 8 | 4 |
| 6.1 | 2 139 095 040 | 120 000 | 480 000 | 8 | 4 |
| 6.2 | 4 278 190 080 | 240 000 | 800 000 | 8 | 4 |

TABLE 13

| Profile | CpbVclFactor | CpbNalFactor | FormatCapabilityFactor | MinCrScaleFactor |
|---|---|---|---|---|
| Main 10, Main 10 Still Picture, Multilayer Main 10 | 1 000 | 1 100 | 1.875 | 1.0 |
| Main 10 4:4:4, Main 10 4:4:4 Still Picture, Multilayer Main 10 4:4:4 | 2 500 | 2 750 | 3.750 | 0.75 | sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 4:
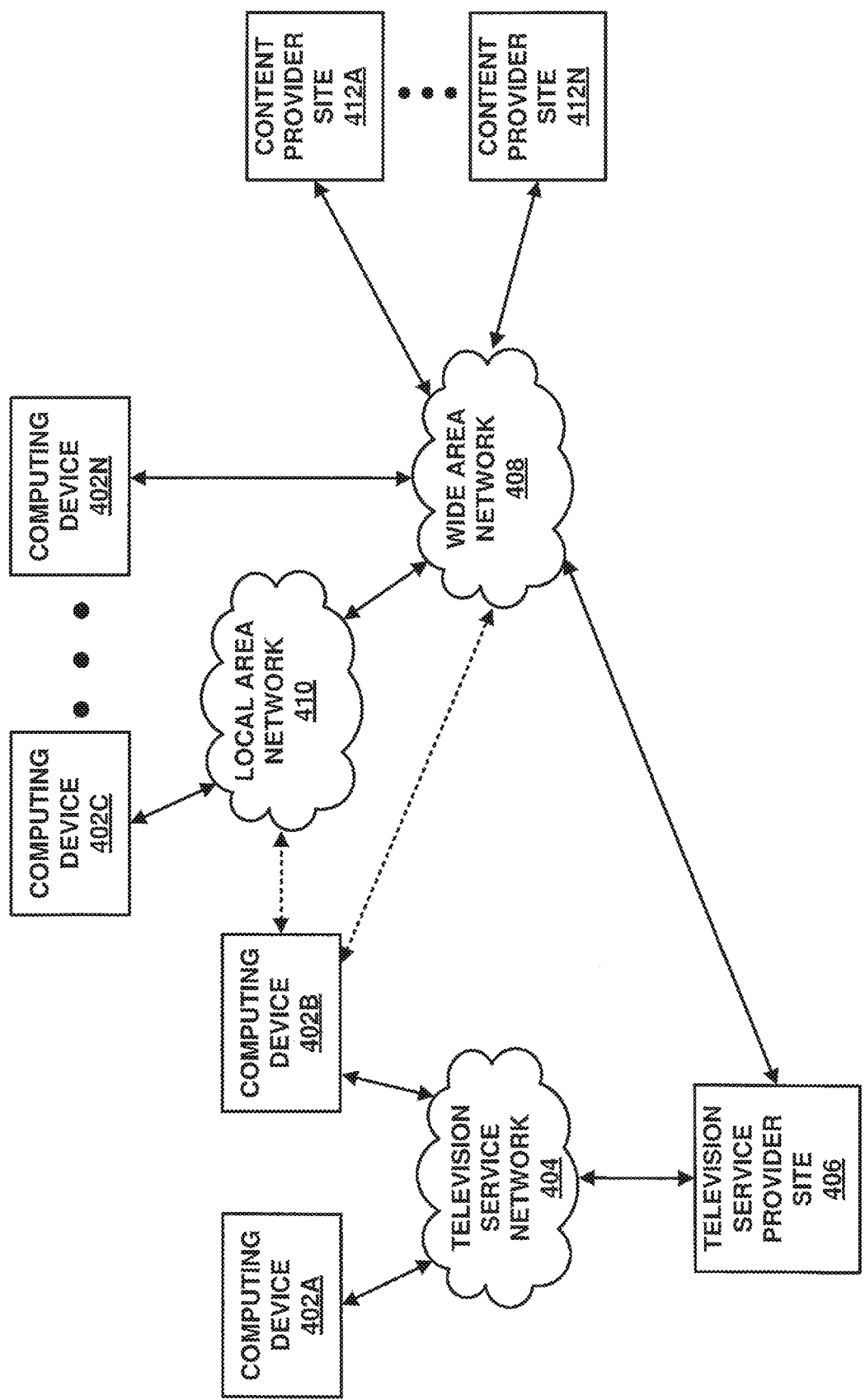
FIG. 4 is a conceptual drawing illustrating an example of components that may be included in an implementation of a system that may be configured to encode and decode video data according to one or more techniques of this disclosure.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, $3^{rd}$ Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more receiver devices computing devices 402A-402N and/or television service provider site 406 through wide area network 408. Content provider sites 412A-412N may include one or more web servers. Data provided by data provider site 412A-412N may be defined according to data formats.

Figure 5:
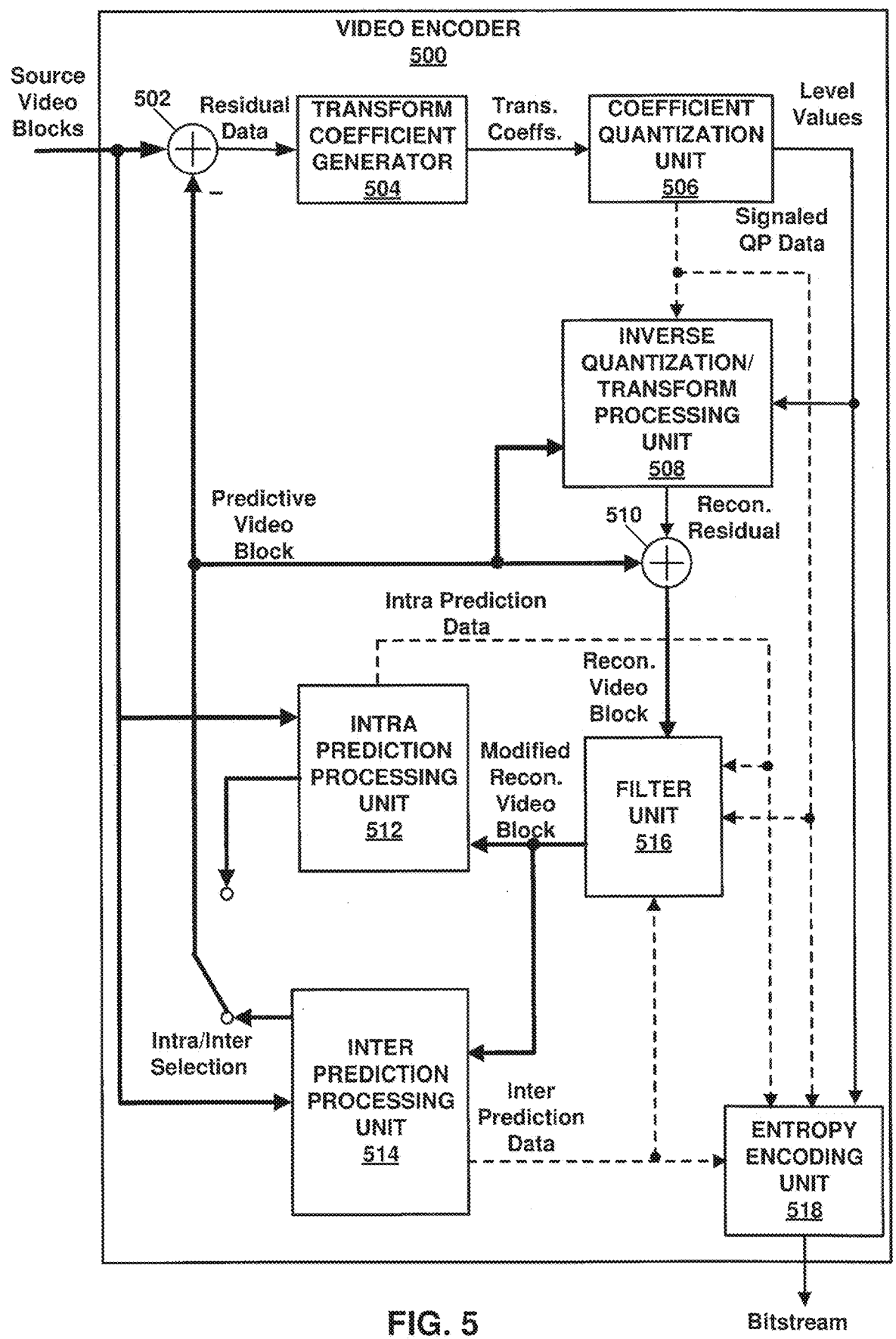
FIG. 5 is a block diagram illustrating an example of a video encoder that may be configured to encode video data according to one or more techniques of this disclosure.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 5 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 5, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional sub-divisions of source video blocks. It should be noted that the techniques described herein are generally applicable to video coding, regardless of how source video data is partitioned prior to and/or during encoding. In the example illustrated in FIG. 5, video encoder 500 includes summer 502, transform coefficient generator 504, coefficient quantization unit 506, inverse quantization and transform coefficient processing unit 508, summer 510, intra prediction processing unit 512, inter prediction processing unit 514, filter unit 516, and entropy encoding unit 518. As illustrated in FIG. 5, video encoder 500 receives source video blocks and outputs a bitstream.

In the example illustrated in FIG. 5, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 5, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization. Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 5, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 5, intra prediction processing unit 512 outputs intra prediction data (e.g., syntax elements) to entropy encoding unit 518 and transform coefficient generator 504. As described above, a transform performed on residual data may be mode dependent (e.g., a secondary transform matrix may be determined based on a prediction mode).

Referring again to FIG. 5, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a prediction unit of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 5). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 518.

Referring again to FIG. 5, filter unit 516 receives reconstructed video blocks and coding parameters and outputs modified reconstructed video data. Filter unit 516 may be configured to perform deblocking and/or Sample Adaptive Offset (SAO) filtering. SAO filtering is a non-linear amplitude mapping that may be used to improve reconstruction by adding an offset to reconstructed video data. It should be noted that as illustrated in FIG. 5, intra prediction processing unit 512 and inter prediction processing unit 514 may receive modified reconstructed video block via filter unit 216. Entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclosure.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving a compliant bitstream forms a new compliant bitstream by discarding and/or modifying data in the received bitstream. It should be noted that the term conforming bitstream may be used in place of the term compliant bitstream. In one example, data encapsulator 107 may be configured to generate syntax according to one or more techniques described herein. It should be noted that data encapsulator 107 need not necessary be located in the same physical device as video encoder 106. For example, functions described as being performed by video encoder 106 and data encapsulator 107 may be distributed among devices illustrated in FIG. 4.

As described above, the maximum NAL unit sizes provided in JVET-T2001, may result in unacceptable decoding latency. According to the techniques described herein, decoding latency may be reduced. As described above, tiles within a slice and entry points of a slice may provide subsets of CTUs within a slice that may be entropy coded independently. Independently entropy decoding a subset may correspond to a thread and each thread may execute in parallel, i.e., concurrently. For example, each core of a multicore CPU may execute a thread and the entropy decoding throughput of each thread may be expected to be 40 Mbps. According to the techniques herein, additional constraints may be applied such that NAL unit sizes include a maximum chunk size in order to reduce expected decoding latency. For example, for a maximum NAL unit size of 40,000,000 bits, according to the techniques herein, a maximum chunk size may be 5,000,000 bits. In this case, if each core concurrently executes a thread for entropy decoding each chunk and the expected throughput 40 Mbps, decoding latency is expected to be 0.125 seconds (i.e., 1 second/8).

In one example, according to the techniques herein, a maximum chunk size may be specified as a maximum number of bits, B. In this case, in one example according to the techniques herein, the following constraints may be imposed:

For coded slice NAL units where entry points are signaled, i.e., NumEntryPoints>0:
8*(sh_entry_point_offset_minus1+1) is smaller than or equal to B for every sh_entry_point_offset_minus1
Size of NAL unit in bits (8*NumBytesInNalUnit) minus sum of 8*(sh_entry_point_offset_minus1+1) is smaller than or equal to B For other coded slice NAL units
Size of NAL unit in bits (8*NumBytesInNalUnit) is smaller than or equal to B It should be noted that the value NumBytesInNalUnit includes bytes representing nal_unit_header( ) and emulation_prevention_three_byte. Alternatively, such bytes may be ignored and constraints may also be expressed in terms of NumBytesInRBSP instead of NumBytesInNalUnit.

In one example, according to the techniques herein, the value of B may be signaled as a syntax element included in a general_constraints_info( ) syntax structure. For example, in the /*NAL unit type related*/ portion of the general_constraints_info( ) syntax structure. In one example, the syntax element be an 8-bit value coded as u(8) and based on the following semantics:

gci_subset_size_constraint_idc specifies constraints that are applied to NumBytesInNalUnit. When the value of gci_subset_size_contraint_idc is equal to 0 no additional constraint applies to NumBytesInNalUnit. When the value of gci_subset_size_contraint_idc is greater than 0, the following applies:
  For coded slice NAL units where entry points are signaled, i.e., NumEntryPoints>0:
    8*(sh_entry_point_offset_minus1+1) is smaller than or equal to B for every sh_entry_point_offset_minus1
    Size of NAL unit in bits (8*NumBytesInNalUnit) minus sum of 8*(sh_entry_point_offset_minus1+1) is smaller than or equal to B
  For other coded slice NAL units
    Size of NAL unit in bits (8*NumBytesInNalUnit) is smaller than or equal to B
  Where,
  B is derived as CbpVclFactor*(256−gci_subset_size_contraint_idc)*MaxCPB/256
  When not present, the value of gci_subset_size_contraint_idc is inferred to be 0.
It should be noted that in the semantics above, MaxCPB is used as a base, since it is frame-rate invariant.
  In one example, gci_subset_size_contraint_idc may be based on the following semantics:
  gci_subset_size_constraint_idc specifies constraints that are applied to NumBytesInNalUnit. When the value of gci_subset_size_contraint_idc is equal to 0 no additional constraint applies to NumBytesInNalUnit. When the value of gci_subset_size_contraint_idc is greater than 0, the following applies:
  For coded slice NAL units where entry points are signaled, i.e., NumEntryPoints>0:
    8*(sh_entry_point_offset_minus1+1) is smaller than or equal to B for every sh_entry_point_offset_minus1
    Size of NAL unit in bits (8*NumBytesInNalUnit) minus sum of 8*(sh_entry_point_offset_minus1+1) is smaller than or equal to B
  For other coded slice NAL units
    Size of NAL unit in bits (8*NumBytesInNalUnit) is smaller than or equal to B
  Where,
  B is derived as CbpVclFactor*MaxCPB/$2^{gci\_subset\_size\_constraint\_idc+16}$
  When not present, the value of gci_subset_size_contraint_idc is inferred to be 0.
  In one example, according to the techniques herein, the value of B may be indicated using a syntax element included in an SEI message. For example, the syntax element may be included in an SEI message defined according to JVET-T2001 or a new SEI message. In one example, the syntax element may be an 8-bit value coded as u(8) and based on the following semantics:
  subset_size_constraint_idc specifies constraints that are applied to NumBytesInNalUnit. Where the following applies:
  For coded slice NAL units where entry points are signaled, i.e., NumEntryPoints>0:
    8*(sh_entry_point_offset_minus1+1) is smaller than or equal to B for every sh_entry_point_offset_minus1
    Size of NAL unit in bits (8*NumBytesInNalUnit) minus sum of 8*(sh_entry_point_offset_minus1+1) is smaller than or equal to B
  For other coded slice NAL units
    Size of NAL unit in bits (8*NumBytesInNalUnit) is smaller than or equal to B
  Where,
  B is derived as $2^{subset\_size\_constraint\_idc+8}$
  OR
  In one example,
  B is derived as (8+subset_size_constraint_idc %8)*$2^{subset\_size\_constraint\_idc/8}$ In one example, a 32-bit syntax element subset_size_constraint coded as u(32) may be based on the following semantics:
  subset_size_constraint specifies constraints that are applied to NumBytesInNalUnit. Where the following applies:
  For coded slice NAL units where entry points are signaled, i.e., NumEntryPoints>0:
    8*(sh_entry_point_offset_minus1+1) is smaller than or equal to B for every sh_entry_point_offset_minus1
    Size of NAL unit in bits (8*NumBytesInNalUnit) minus sum of 8*(sh_entry_point_offset_minus1+1) is smaller than or equal to B
  For other coded slice NAL units
    Size of NAL unit in bits (8*NumBytesInNalUnit) is smaller than or equal to B
  Where,
  B is derived as 8*subset_size_constraint
It should be noted that by deriving a value for B, a video decoder may estimate an expected decoding latency for each subset and determine how to assign resources (e.g., cores) such that subsets may be entropy decoded concurrently thereby reducing decoding latency. A video decoder may also determine how soon to start displaying decoded video frames to allow smooth playback of a video sequence, i.e., without having to pause displaying of frames to wait for the completion of entropy decoding of a NAL unit containing a large number of bits to at any time.
  In this manner, source device 102 represents an example of a device configured to signal a syntax element indicating a size constraint for subsets of a network abstraction unit including a slice of video data.
  As described above, constraining NAL unit sizes and/or including entry points in a NAL units (i.e., including subsets of CTU rows within a tile) may reduce decoding latency. JVET-T2001 provides tile and slice partitioning and wavefront parallel processing (WPP) techniques which enable NAL unit size constraints to be met. With respect to entropy coding, JVET-T2001 provides where the initialization process for a CABAC parsing process for slice data is invoked when starting the parsing of CTU syntax (i.e., before parsing the first syntax element in a CTU) based on whether one or more conditions are met. That is, JVET-T2001 provides the following CABAC parsing process for slice data:
  Inputs to this process are a request for a value of a syntax element and values of prior parsed syntax elements. Output of this process is the value of the syntax element.
  The initialization process as specified is invoked when starting the parsing of the CTU syntax and one or more of the following conditions are true:
    The CTU is the first CTU in a slice.
    The CTU is the first CTU in a tile.
    The value of sps_entropy_coding_sync_enabled_flag is equal to 1 and the CTU is the first CTU in a CTU row of a tile.
  The parsing of syntax elements proceeds as follows:
    For each requested value of a syntax element a binarization is derived as specified.
    The binarization for the syntax element and the sequence of parsed bins determines the decoding process flow as described.
    The storage process for context variables is applied as follows:
      When ending the parsing of the CTU syntax, sps_entropy_coding_sync_enabled_flag is equal to 1, and CtbAddrX is equal to CtbToTileColBd[CtbAddrX], the storage process for context variables as specified is invoked with TableStateIdx0Wpp and TableStateIdx1Wpp as outputs.

When sps_palette_enabled_flag is equal to 1, the storage process for palette predictor is applied as follows:
  When ending the parsing of the CTU syntax and the decoding process of the last CU in the CTU, sps_entropy_coding_sync_enabled_flag is equal to 1 and CtbAddrX is equal to CtbToTileColBdf[CtbAddrX] the storage process for palette predictor as specified is invoked.

With respect to the initialization process JVET-T2001 provides the following:
The context variables of the arithmetic decoding engine are initialized as follows:
  If the CTU is the first CTU in a slice or tile, the initialization process for context variables is invoked as specified and the array PredictorPaletteSize[chType], with chType=0, 1, is initialized to 0.
  Otherwise, if sps_entropy_coding_sync_enabled_flag is equal to 1 and CtbAddrX is equal to CtbToTileColBd[CtbAddrX], the following applies:
    The location (xNbT, yNbT) of the top-left luma sample of the spatial neighbouring block T is derived using the location (x0, y0) of the top-left luma sample of the current CTB as follows:

$$(xNbT, yNbT) = (x0, y0 - CtbSizeY)$$

The derivation process for neighbouring block availability as specified is invoked with the location (xCurr, yCurr) set equal to (x0, y0), the neighbouring location (xNbY, yNbY) set equal to (xNbT, yNbT), checkPredModeY set equal to FALSE, and cIdx set equal to 0 as inputs, and the output is assigned to availableFlagT.
    The synchronization process for context variables is invoked as follows:
      If availableFlagT is equal to 1, the following applies:
      The synchronization process for context variables as specified is invoked with TableStateIdx0Wpp and TableStateIdx1Wpp as inputs.
      When sps_palette_enabled_flag is equal to 1, the synchronization process for palette predictor as specified is invoked.
      Otherwise, the initialization process for context variables is invoked as specified and the array PredictorPaletteSize[chType], with chType=0, 1, is initialized to 0.
  Otherwise, the initialization process for context variables is invoked as specified and the array PredictorPaletteSize[chType], with chType=0, 1, is initialized to 0.

The decoding engine registers ivlCurrRange and ivlOffset both in 16 bit register precision are initialized by invoking the initialization process for the arithmetic decoding engine as specified.

It should be noted that when the initialization process is not invoked, context variables are synchronized with a previous coding state. That is, for CTUs in a tile row, the state is synchronized to the state following the parsing of the last syntax element in the previous CTU. That is, CTUs in a tile row are essentially entropy coded left-to-right in a dependent manner. Wavefront parallel processing allows a first CTU in a tile row to be synchronized to the state following the parsing of the last syntax element in the above CTU (i.e., the first CTU in the immediately preceding row).

It should be noted that constraining NAL unit sizes and/or including entry points in a NAL units, i.e., increasing the number of NAL units and entry points may impact overhead in a bitstream. For example, implementing WPP provides an overhead of approximately 1.33% on average for class A (4K UHD) video under JVET common test conditions. In another example, it was found that by sending single PPS with 3 tiles and enabling entry points, overhead may be reduced to approximately 0.59% on average for class A video. In another example, it was found that by sending multiple PPSs (one with three tiles for pictures with TemporalId equal 0 or 1, and one with no partitioning for pictures with other values of TemporalId) and enabling entry points, overhead may be reduced to approximately 0.18% on average for class A video. According to the techniques herein, overhead may be further reduced compared to implementing WPP or tiles. In one example, according to the techniques herein, it was found that by adaptively selecting a number of entropy columns for each picture, overhead may be reduced to approximately 0.00% on average for class A video.

Figure 7:
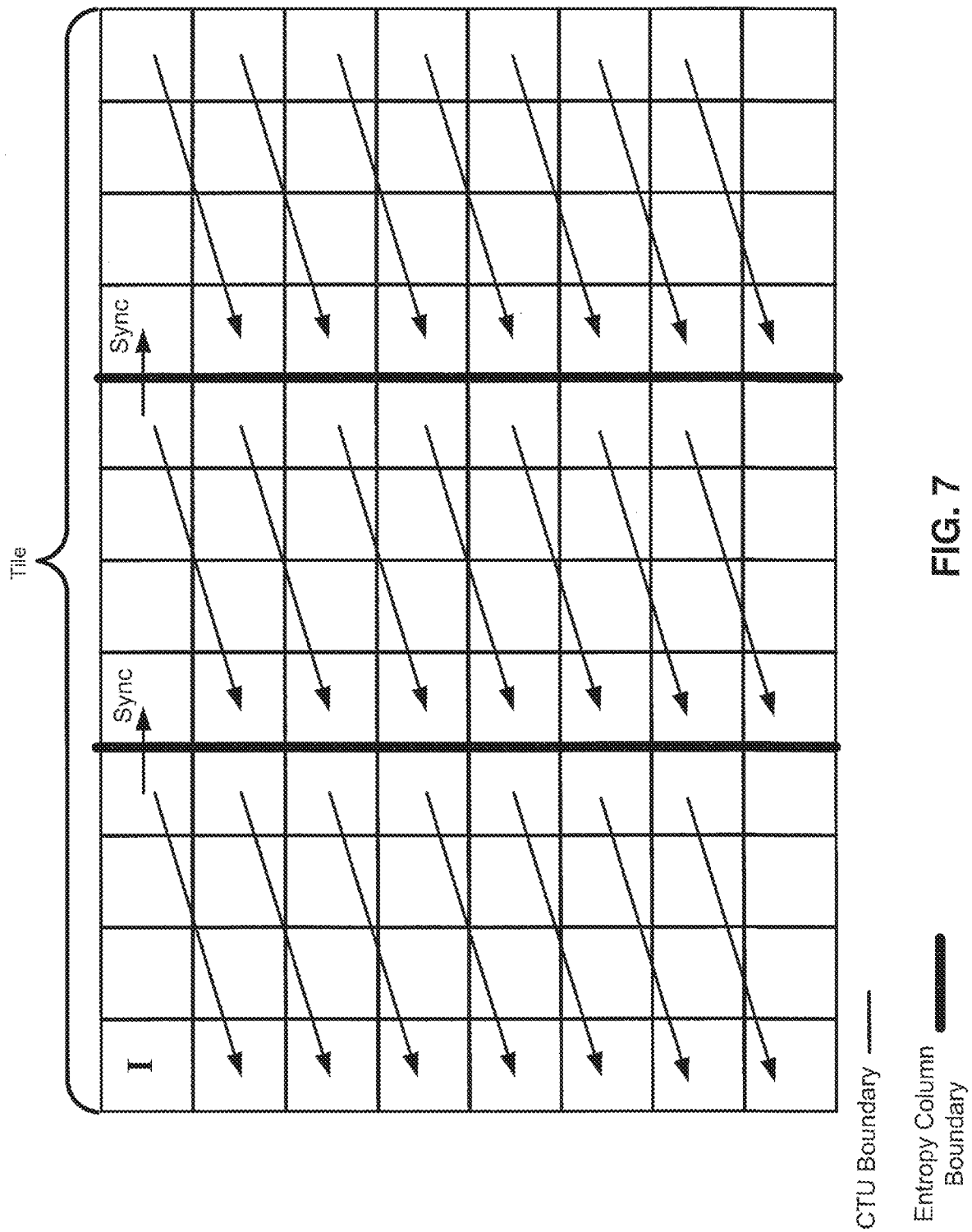
FIG. 7 is a conceptual drawing illustrating an example of entropy coding video data according to one or more techniques of this disclosure.

In one example, according to the techniques herein, alternative techniques to WPP may be used. For example, according to the herein, so-called entropy column processing may be utilized. Entropy columns may be used to split a picture into N columns, where N may be signaled, e.g., in picture header and the width of the entropy column may correspond to a number of CTU columns in a tile and each entropy column may be coded as a subset. Entropy coding dependencies may be specified for each row of an entropy column. In one example, according to the techniques herein, the CABAC state management for entropy column processing may be as follows:
  First CTU row, first CTU column: traditional initialization
  First CTU row, subsequent CTU columns: reuse state from previous CTU column
  Subsequent CTU rows, first CTU in entropy column: reuse state from same entropy column, previous CTU row, last CTU in entropy column FIG. 7 is a conceptual drawing illustrating entropy columns and the CABAC state management for entropy column processing as described above. As described above, entropy column processing may be utilized as an alternative to WPP provided in JVET-T2001. In one example, entropy column processing may be activated at the SPS level. Table 14 illustrates an example of SPS syntax that may be used to enable entropy column processing.

TABLE 14

| | Descriptor |
|---|---|
| seq_parameter_set_rbsp( ) { | |
| ... | |
| sps_bitdepth_minus8 | ue(v) |
| sps_entropy_coding_sync_enabled_flag | u(1) |
| sps_entry_point_offsets_present_flag | u(1) |
| if(sps_entry_point_offsets_present_flag && !sps_entropy_coding_sync_enabled_flag) | u(1) |
| sps_entropy_columns_enabled_flag | |
| sps_log2_max_pic_order_cnt_lsb_minus4 | u(4) |
| ... | |
| rbsp_trailing_bits( ) | |
| } | |

With respect to Table 14, the semantics may be based on semantics provided above with respect to Table 8 and the following:

sps_entropy_columns_enabled_flag specifies that entropy columns are enabled. When not present, sps_entropy_columns_enabled_flag is inferred to be 0.

Further, a syntax element, ph_num_entropy_columns_minus1 (coded as ue(v)), may be added to the picture header syntax. The presence of ph_num_entropy_columns_minus1 may be conditioned on sps_entropy_columns_enabled_flag and pps_no_pic_partitioning_flag i.e., if(sps_entropy_columns_enabled_flag && pps_no_pic_partitioning_flag) and based on the following semantics:

ph_num_entropy_columns_minus1 plus 1 specifies the number of entropy columns in a picture. When not present, ph_num_entropy_columns_minus1 is inferred to be 0. ph_num_entropy_columns_minus1 shall be in the range 0 to Min(PicWidthInCtbsY, 32)−1, inclusive.

Entropy columns split a picture into multiple columns of similar width (the rightmost column may be narrower if the picture width in CTBs is not a multiple of the number of entropy columns). Let EntropyColumnWidth= (PicWidthInCtbs−1)/(ph_num_entropy_columns_minus1+ 1)+1 be width in CTBs of an entropy column. The i-th entropy column spans CTB columns EntropyColumnWidth*i to Min(EntropyColumnWidth*(i+ 1), PicWidthInCtbsY)−1, inclusive. For the i-th CTU in a slice, the associated entropy column index is (CtbAddrInCurrSlice[i] % PicWidthInCtbsY)/EntropyColumnWidth.

Further, in order to enable entropy column processing, the derivation of variable NumEntryPoints may be as follows:

```
NumEntryPoints = 0
if( ph_num_entropy_columns_minus1 > 0 )
   NumEntryPoints = ph_num_entropy_columns_minus1
else if( sps_entry_point_offsets_present_flag )
   for( i = 1; i < NumCtusInCurrSlice; i++ ) {
      ctbAddrX = CtbAddrInCurrSlice[ i ] % PicWidthInCtbsY
      ctbAddrY = CtbAddrInCurrSlice[ i ] / PicWidthInCtbsY
      prevCtbAddrY = CtbAddrInCurrSlice[ i − 1 ] /
      PicWidthInCtbsY
      if( CtbToTileRowBd[ ctbAddrY ] !=
      CtbToTileRowBd[ prevCtbAddrY ] | |
         CtbToTileColBd[ ctbAddrX ] !=
         CtbToTileColBd[ prevCtbAddrX ] | |
         ( ctbAddrY != prevCtbAddrY &&
         sps_entropy_coding_sync_enabled_flag ) )
         NumEntryPoints++
   }
```

With the semantics of sh_entry_point_offset_minus1[i] based on the following:

sh_entry_point_offset_minus1[i] plus 1 specifies the i-th entry point offset in bytes, and is represented by sh_entry_offset_len_minus1 plus 1 bits. The slice data that follow the slice header consists of NumEntryPoints+1 subsets, with subset index values ranging from 0 to NumEntryPoints, inclusive. The first byte of the slice data is considered byte 0. When present, emulation prevention bytes that appear in the slice data portion of the coded slice NAL unit are counted as part of the slice data for purposes of subset identification. Subset 0 consists of bytes 0 to sh_entry_point_offset_minus1[0], inclusive, of the coded slice data, subset k, with k in the range of 1 to NumEntryPoints−1, inclusive, consists of bytes firstByte[k] to lastByte[k], inclusive, of the coded slice data with firstByte[k] and lastByte[k] derived as follows:

$$firstByte[k] = \sum_{n=1}^{k} (sh\_entry\_point\_offset\_minus1[n-1]+1)$$

$$lastByte[k] = firstByte[k] + sh\_entry\_point\_offset\_minus1[k]$$

The last subset (with subset index equal to NumEntryPoints) consists of the remaining bytes of the coded slice data.

When sps_entropy_coding_sync_enabled_flag is equal to 0, sps_entropy_columns_enabled_flag is equal to 0, and the slice contains one or more complete tiles, each subset shall consist of all coded bits of all CTUs in the slice that arm within the same tile, and the number of subsets (i.e., the value of NumEntryPoints+1) shall be equal to the number of tiles in the slice.

When sps_entropy_coding_sync_enabled_flag is equal to 0, sps_entropy_columns_enabled_flag is equal to 0, and the slice contains a subset of CTU rows from a single tile, the NumEntryPoints shall be 0, and the number of subsets shall be 1. The subset shall consist of all coded bits of all CTUs in the slice.

When sps_entropy_coding_sync_enabled_flag is equal to 1, each subset k with k in the range of 0 to NumEntryPoints, inclusive, shall consist of all coded bits of all CTUs in a CTU row within a tile, and the number of subsets (i.e., the value of NumEntryPoints+1) shall be equal to the total number of tile-specific CTU rows in the slice.

When sps_entropy_columns_enabled_flag is equal to 1, each subset k with k in the range 0 to NumEntryPoints, inclusive, shall consist of all coded bits of all CTUs in an entropy column, and the number of subsets shall be equal to the number of entropy columns in the slice.

It should be noted that JVET-T2001 provides the following definition a read_bits( ) function:

read_bits(n) reads the next n bits from the bitstream and advances the bitstream pointer by n bit positions. When n is equal to 0, read_bits(n) is specified to return a value equal to 0 and to not advance the bitstream pointer.

In order to enable entropy column processing, the definition of read_bits( ) may be as follows:

read_bits(n) reads the next n bits from the bitstream and advances the bitstream pointer by n bit positions. When n is equal to 0, read_bits(n) is specified to return a value equal to 0 and to not advance the bitstream pointer. When ph_num_entropy_columns_minus1 is larger than 0, each entropy column has a unique bitstream pointer for parsing CABAC data. The bitstream pointers for entropy columns are initialized based on the values of entry points (see derivation of firstByte[k]).

Further, in order to enable entropy column processing, the CABAC parsing process for slice data may be as follows:

Inputs to this process are a request for a value of a syntax element and values of prior parsed syntax elements. Output of this process is the value of the syntax element.

The initialization process as specified is invoked when starting the parsing of the CTU syntax and one or more of the following conditions are true:

The CTU is the first CTU in a slice.
The CTU is the first CTU in a tile.
The value of sps_entropy_coding_sync_enabled_flag is equal to 1 and the CTU is the first CTU in a CTU row of a tile.
The value of ph_num_entry_points_minus1 is larger than 0, CtbAddrY is equal to 0, and CtbAddrX % EntropyColumnWidth is equal to 0

The parsing of syntax elements proceeds as follows:

For each requested value of a syntax element a binarization is derived as specified.

The binarization for the syntax element and the sequence of parsed bins determines the decoding process flow as described.

The storage process for context variables is applied as follows:

When ending the parsing of the CTU syntax, sps_entropy_coding_sync_enabled_flag is equal to 1, and CtbAddrX is equal to CtbToTileColBd[CtbAddrX], the storage process for context variables as specified is invoked with TableStateIdx0Wpp and TableStateIdx1Wpp as outputs.

When ending the parsing of the CTU syntax, ph_num_entropy_columns_minus1 is larger than 0, CtbAddrY is equal to 0, and CtbAddrX % EntropyColumnWidth is equal to EntropyColumnWidth−1, the storage process for context variables as specified is invoked with TableStateIdx0Wpp and TableStateIdx1Wpp as outputs.

When sps_palette_enabled_flag is equal to 1, the storage process for palette predictor is applied as follows:

When ending the parsing of the CTU syntax and the decoding process of the last CU in the CTU, sps_entropy_coding_sync_enabled_flag is equal to 1 and CtbAddrX is equal to CtbToTileColBd[CtbAddrX], the storage process for palette predictor as specified is invoked.

When ending the parsing of the CTU syntax and the decoding process of the last CU in the CTU, ph_num_entropy_columns_minus1 is larger than 0, CtbAddrY is equal to 0, and CtbAddrX % EntropyColumnWidth is equal to EntropyColumnWidth−1, the storage process for palette predictor as specified is invoked.

When ph_num_entropy_columns_minus1 is larger than 0, each entropy column has its own set of context variables. For each CTU, its entropy column index CtbAddrX/EntropyColumnWidth determines which set of context variables to use.

When ph_num_entropy_columns_minus1 is larger than 0 and sps_palette_enabled_flag is equal to 1, each entropy column has its own palette predictor. For each CTU, its entropy column index CtbAddrX/EntropyColumnWidth determines which palette predictor to use.

The context variables of the arithmetic decoding engine are initialized as follows:

If the CTU is the first CTU in a slice or tile, the initialization process for context variables is invoked as specified and the array PredictorPaletteSize[chType], with chType=0, 1, is initialized to 0.

Otherwise, if sps_entropy_coding_sync_enabled_flag is equal to 1 and CtbAddrX is equal to CtbToTileColBd[CtbAddrX], the following applies:

The location (xNbT, yNbT) of the top-left luma sample of the spatial neighbouring block T is derived using the location (x0, y0) of the top-left luma sample of the current CTB as follows:

$$(xNbT, yNbT) = (x0, y0 - CtbSizeY)$$

The derivation process for neighbouring block availability as specified is invoked with the location (xCurr, yCurr) set equal to (x0, y0), the neighbouring location (xNbY, yNbY) set equal to (xNbT, yNbT), checkPredModeY set equal to FALSE, and cIdx set equal to 0 as inputs, and the output is assigned to availableFlagT.

The synchronization process for context variables is invoked as follows:

If availableFlagT is equal to 1, the following applies:

The synchronization process for context variables as specified is invoked with TableStateIdx0Wpp and TableStateIdx1Wpp as inputs.

When sps_palette_enabled_flag is equal to 1, the synchronization process for palette predictor as specified is invoked.

Otherwise, the initialization process for context variables is invoked as specified and the array PredictorPaletteSize[chType], with chType=0, 1, is initialized to 0.

Otherwise, if ph_num_entry_points points_minus1 is larger than 0, the following applies:

The synchronization process for context variables as specified is invoked with TableStateIdx0Wpp and TableStatcIdx1Wpp as inputs.

When sps_palette_enabled_flag is equal to 1, the synchronization process for palette predictor as specified is invoked.

Otherwise, the initialization process for context variables is invoked as specified and the array PredictorPaletteSize[chType], with chType=0, 1, is initialized to 0.

The decoding engine registers ivlCurrRange and ivlOffset both in 16 bit register precision are initialized by invoking the initialization process for the arithmetic decoding engine as specified.

It should be noted that palette state save/restore rules mirror CABAC state rules. Further, it should be noted that an encoder can decide number of entropy columns a posteriori. That is, for example, first, make all mode decisions and second, entropy encode multiple copies using various number of columns and select most the appropriate one. Finally, it should be noted that QP prediction for CTUs in a first CTU column, in some cases, may use a QP value from above CTU instead of a QP value from rightmost CTU in above CTU row.

As illustrated in FIG. 7, entropy columns enable parsing to be done in raster-scan order when switching between subsets. With respect to the example illustrated in FIG. 7, entropy coding may be performed using three threads i.e., one for each entropy column. Further, entropy columns allow a single-threaded decoder to operate in each of the following two ways when entropy decoding a picture: (1) entropy decode an entire first entropy column, then an entire second entropy column, etc.; and (2) entropy decode CTUs in raster scan order, which may involve switching from one entropy column to another from time to time.

It should be noted that JVET-T2001 provides the following line buffers for entropy decoding: alf_flags, cu_log_width, quadtree_depth, mip_flag, skip_flag, intra_flag, affine_flag, and ibc_flag. None of these use top-right reference. Thus, entropy decoding per entropy column is possible. It should be noted that in cases where there is a parsing dependency on an above-right CTU, entropy decoding of entropy columns may be done using synchronized threads. That is, for example, with respect to the example illustrated in FIG. 7, entropy coding may be performed using two threads that are synchronized to account for a parsing dependency on an above-right CTU.

In one example, referencing data from a subsequently coded entropy column for entropy decoding purposes may be disallowed. This does not effect MV prediction and sample reconstruction. In one example, entropy decoding can follow bitstream order, but reconstruction follows raster-scan order. In one example, referencing of top-right CTU for entropy decoding purposes for all CTUs may be disabled. It should be noted that this is similar to WPP, although WPP does so for sample reconstruction as well.

In one example, there may be no sharing of data between entropy columns for entropy decoding. In this case, MV prediction and sample reconstruction across entropy columns are still possible. In one example, tile rules may be modified to enable parallel entropy decoding without breaking prediction chains for MV prediction and sample reconstruction, instead of introducing specific entropy column processing. For example, rules for tiles may be modified such that MV prediction and sample reconstruction can happen across tile boundaries. In one example, a flag may be added in the PPS to signal this modification (i.e., similar to a flag used to enable/disable loop filter across tiles). It should be noted that intra prediction enhancements may be needed to deal with nonrectangular slices. In one example, when tile rules are modified, rules for subpictures may be such that MV prediction and sample reconstruction cannot happen across subpicture boundaries.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, PC, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, PC, or any other logical and physical structure that may be used to interconnect peer devices. Data decapsulator 123 may be configured to receive and parse any of the example syntax structures described herein.

Video decoder 124 may include any device configured to receive a bitstream (e.g., a sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
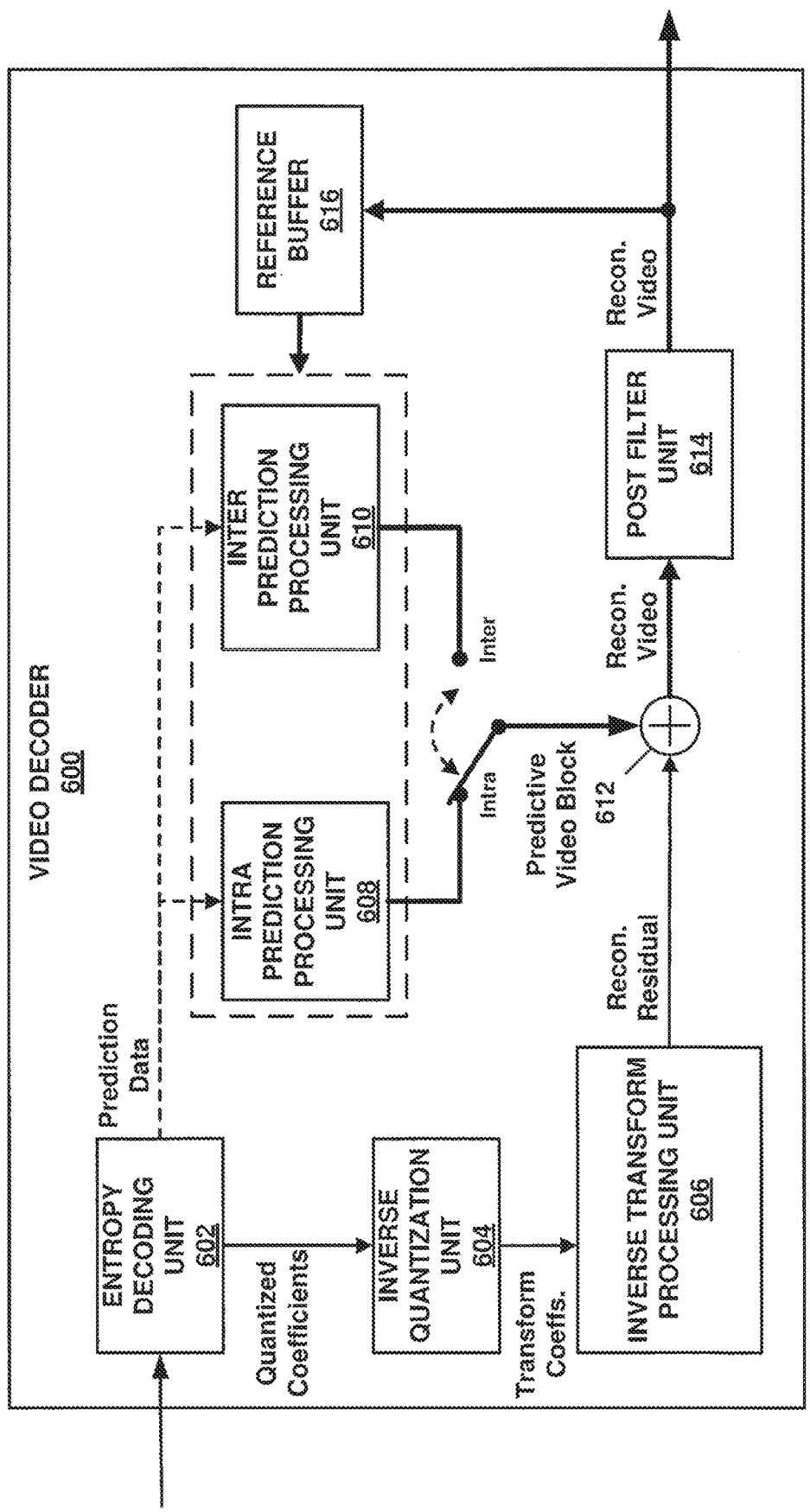
FIG. 6 is a block diagram illustrating an example of a video decoder that may be configured to decode video data according to one or more techniques of this disclosure.

FIG. 6 is a block diagram illustrating an example of a video decoder that may be configured to decode video data according to one or more techniques of this disclosure (e.g., the decoding process for reference-picture list construction described above). In one example, video decoder 600 may be configured to decode transform data and reconstruct residual data from transform coefficients based on decoded transform data. Video decoder 600 may be configured to perform intra prediction decoding and inter prediction decoding and, as such, may be referred to as a hybrid decoder. Video decoder 600 may be configured to parse any combination of the syntax elements described above including gci_subset_size_constraint_idc, subset_size_contraint_idc, and subset_size_constraint. Video decoder 600 may decode a picture based on or according to the processes described above.

In the example illustrated in FIG. 6, video decoder 600 includes an entropy decoding unit 602, inverse quantization unit 604, transform coefficient processing unit 606, intra prediction processing unit 608, inter prediction processing unit 610, summer 612, post filter unit 614, and reference buffer 616. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 6, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 6, entropy decoding unit 602 may determine a quantization parameter, quantized coefficient values, transform data, and prediction data from a bitstream. In the example, illustrated in FIG. 6, inverse quantization unit 604 and inverse transform coefficient processing unit 606 receive quantized coefficient values from entropy decoding unit 602 and output reconstructed residual data.

Referring again to FIG. 6, reconstructed residual data may be provided to summer 612. Summer 612 may add reconstructed residual data to a predictive video block and generate reconstructed video data. A predictive video block may be determined according to a predictive video technique (i.e., intra prediction and inter frame prediction). Intra prediction processing unit 608 may be configured to receive intra prediction syntax elements and retrieve a predictive video block from reference buffer 616. Reference buffer 616 may include a memory device configured to store one or more frames of video data. Intra prediction syntax elements may identify an intra prediction mode, such as the intra prediction modes described above. Inter prediction processing unit 610 may receive inter prediction syntax elements and generate motion vectors to identify a prediction block in one or more reference frames stored in reference buffer 616. Inter prediction processing unit 610 may produce motion compensated blocks, possibly performing interpolation based on interpolation filters. Identifiers for interpolation filters to be used for motion estimation with sub-pixel precision may be included in the syntax elements. Inter prediction processing unit 610 may use interpolation filters to calculate interpolated values for sub-integer pixels of a reference block. Post filter unit 614 may be configured to perform filtering on reconstructed video data. For example, post filter unit 614 may be configured to perform deblocking and/or Sample Adaptive Offset (SAO) filtering, e.g., based on parameters specified in a bitstream. Further, it should be noted that in some examples, post filter unit 614 may be configured to perform proprietary discretionary filtering (e.g., visual enhancements, such as, mosquito noise reduction). As illustrated in FIG. 6, a reconstructed video block may be output by video decoder 600. In this manner, video decoder 600 represents an example of a device configured to receive a general constraint information syntax structure, parse a syntax element from the general constraint information syntax structure indicating a size constraint for subsets of a network abstraction unit including a slice of video data and perform video decoding based on the size constraint.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

What is claimed is:

1. A method of signaling parameters for video data, the method comprising:
    signaling a syntax element indicating a size constraint for subsets of a network abstraction unit including a slice of video data.

2. A method of decoding video data, the method comprising:
    receiving a general constraint information syntax structure;

parsing a syntax element from the general constraint information syntax structure indicating a size constraint for subsets of a network abstraction unit including a slice of video data; and performing video decoding based on the size constraint.

3. The method of claim 2, wherein performing video decoding based on the size constraints includes allocating computing resources based on the size constraint.

4. The method of claim 1, wherein the syntax element is an 8-bit value.

5. The method of claim 1, wherein the syntax element is a 32-bit value.

6. A device comprising one or more processors configured to perform any and all combinations of the steps of claim 1.

7. The device of claim 6, wherein the device includes a video encoder.

8. The device of claim 6, wherein the device includes a video decoder.

9. A non-transitory computer-readable storage medium comprising instructions stored thereon that, when executed, cause one or more processors of a device to perform any and all combinations of the steps of claim 1.

* * * * *